(12) United States Patent
Taylor et al.

(10) Patent No.: US 7,420,294 B2
(45) Date of Patent: Sep. 2, 2008

(54) SMART POWER SWITCH FOR BROADBAND COMMUNICATIONS NETWORK

(75) Inventors: George F. Taylor, Winter Garden, FL (US); Ofer Raviv, Kfar Veradim (IL)

(73) Assignee: MAYA Industries Limited, Nicosia (CY)

( * ) Notice: Subject to any disclaimer, the term of this patent is extended or adjusted under 35 U.S.C. 154(b) by 366 days.

(21) Appl. No.: 11/315,625

(22) Filed: Dec. 23, 2005

(65) Prior Publication Data

US 2007/0145828 A1 Jun. 28, 2007

(51) Int. Cl.
*H02J 7/00* (2006.01)
*H02J 9/00* (2006.01)

(52) U.S. Cl. .............................. 307/64; 307/21; 307/22; 307/23; 307/29; 307/43; 307/65; 713/340

(58) Field of Classification Search .................... 307/21, 307/22, 23, 29, 65, 126, 43, 64; 713/340
See application file for complete search history.

(56) References Cited

U.S. PATENT DOCUMENTS

| 3,869,564 | A | 3/1975 | Colodny |
| 3,943,447 | A | 3/1976 | Shomo, III |
| 4,016,458 | A | 4/1977 | Everhart |
| 4,176,320 | A | 11/1979 | Leshkowitz |
| 4,349,795 | A | 9/1982 | Kwok |
| 5,664,002 | A | 9/1997 | Skinner, Sr. |
| 5,739,595 | A | 4/1998 | Mekanik et al. |

(Continued)

FOREIGN PATENT DOCUMENTS

JP 61-148985 7/1986

(Continued)

OTHER PUBLICATIONS

English-language Abstract of Japanese Patent Publication No. JP 10-95634, data supplied by ep.espacenet.com, 2 pages (Apr. 13, 1989—Date of publication of application).

(Continued)

*Primary Examiner*—Stephen W Jackson
*Assistant Examiner*—Carlos Amaya
(74) *Attorney, Agent, or Firm*—Sterne, Kessler, Goldstein & Fox P.L.L.C.

(57) ABSTRACT

A power switching module provides power to a line amplifier in a broadband telecommunications network. The switch includes a first input port for connection to a first power source, a second input port for connection to a second power source, an input/output port for connection to a cable connecting the line amplifier with a remote amplifier, and an output port for connection to the line amplifier. A controller controls selection of the power source and provides power to the line amplifier from one the input ports and can provide power to, or receive power from, a power supply associated with the remote amplifier via the input/output port. A switch allows selection of a primary mode of operation or a secondary mode of operation. Another switch allows selection of a first operating voltage range or a second voltage operating range. A monitoring circuit communicates status information about the switching module to a remote location. Monitored parameters include, for example, power supply status, module humidity and temperature.

8 Claims, 33 Drawing Sheets

Smart Power Switch + Monitoring Two-Way Backup Using Active Coax Cable with RF

U.S. PATENT DOCUMENTS

| | | | |
|---|---|---|---|
| 5,747,888 A | | 5/1998 | Zilberberg |
| 5,804,890 A | | 9/1998 | Kakalec et al. |
| 5,969,438 A | * | 10/1999 | Odaohara .................... 307/80 |
| 5,995,611 A | * | 11/1999 | Mowafy et al. ........ 379/215.01 |
| 6,285,856 B1 | | 9/2001 | Aguayo, Jr. et al. |
| 6,556,562 B1 | | 4/2003 | Bhagavath et al. |
| 6,662,642 B2 | * | 12/2003 | Breed et al. .................... 73/146 |
| 6,879,060 B2 | * | 4/2005 | Hohri .......................... 307/64 |
| 6,977,446 B2 | * | 12/2005 | MacKay ...................... 307/29 |
| 7,170,194 B2 | * | 1/2007 | Korcharz et al. .............. 307/21 |

FOREIGN PATENT DOCUMENTS

| | | |
|---|---|---|
| JP | 63-314984 | 12/1988 |
| JP | 10-95634 | 4/1989 |
| JP | 30-82272 | 4/1991 |
| JP | 4-355506 | 12/1992 |
| JP | 50-15085 | 1/1993 |
| JP | 5-235864 | 9/1993 |
| JP | 7-162838 | 6/1995 |

OTHER PUBLICATIONS

English-language Abstract of Japanese Patent Publication No. JP 30-82272, data supplied by ep.espacenet.com, 2 pages (Apr. 8, 1991—Date of publication of application).

English-language Abstract of Japanese Patent Publication No. JP 4-355506, data supplied by ep.espacenet.com, 2 pages (Dec. 9, 1992—Date of publication of application).

English-language Abstract of Japanese Patent Publication No. JP 50-15085, data supplied by ep.espacenet.com, 2 pages (Jan. 22, 1993—Date of publication of application).

English-language Abstract of Japanese Patent Publication No. JP 5-235864, data supplied by ep.espacenet.com, 2 pages (Sep. 10, 1993—Date of publication of application).

English-language Abstract of Japanese Patent Publication No. JP 61-148985, data supplied by ep.espacenet.com, 2 pages (Jul. 7, 1986—Date of publication of application).

English-language Abstract of Japanese Patent Publication No. JP 63-314984, data supplied by ep.espacenet.com, 2 pages (Dec. 22, 1988—Date of publication of application).

English-language Abstract of Japanese Patent Publication No. JP 7-162838, data supplied by ep.espacenet.com, 2 pages (Jun. 23, 1995—Date of publication of application).

* cited by examiner

Smart Power Switch Quad Backup Option Using Active Coax Cable with RF

SMART POWER SWITCH FOR BROADBAND COMMUNICATIONS NETWORK

BACKGROUND OF THE INVENTION

1. Field of the Invention

This invention relates generally to the field of data networks with distributed line amplifiers and, more particularly, to the field of broadband communications networks.

2. Related Art

Broadband communication networks deliver data signals to homes and businesses throughout the world. The data signals may include, for example, television signals, telephone signals, radio signals, audio and video signals, Internet service, and/or other data and communication services. A typical broadband communication network includes a head-end or central reception point where satellite and/or off-air signals are collected, and processed. Data signals are injected and combined with the audio and video signals and are rebroadcast over a network. The network is typically made-up of coaxial cable (coax), optical fiber or a combination of coax and fiber known as hybrid fiber coax (HFC). The network may also include wireless connectivity for specific types of data. At the other end of the network are end-user subscribers. These may be residential subscribers, businesses or other networks.

Amplifiers are used throughout the broadband communication network to insure sufficient signal levels exist, for example, to meet regulatory standards set by the U.S. Federal Communications Commission (FCC) and requirements of equipment manufacturers. For example, a post-amplifier may be used between an off-air antenna and the head-end to increase the received signal to a strength (i.e., amplitude) sufficient for processing by the head-end. The head-end then uses channel processors, satellite receivers, modulators, decoders, encoders and a combining network to produce the signals that will be sent over a trunk network. The combining network provides broadband signals to one or more trunk amplifiers to create the origination point of the trunk network from the head-end. The trunk network includes one or more trunk lines. Each trunk line may be split into two or more discreet trunks. These trunks may be optical or coaxial based. Splitting of the trunk network is created by installing splitters or directional couplers in the trunk network, and continues throughout the network to provide the required network connectivity.

Distribution cables are connected to an optical node, trunk amplifier, distribution trunk amplifier (with a built in distribution amplifier), or line extender amplifier to create the distribution network. The distribution network uses splitters, couplers and distribution taps (tap) to provide signal to the customer. A service drop is connected to the tap and to a customer's on-premise equipment (CPE) to provide the data signals to the customer.

Each signal transmitted in a broadband communication network is typically assigned a unique channel or frequency within the operational bandwidth of the amplifier. The frequency spectrum of the signals transmitted in the broadband communication network is typically in the range of 5 MHz to 862 MHz. The bandwidth used for the reverse path is typically found in U.S. NTSC networks in the 5-42 MHz range, while most analog signals for the forward path are in the 50-550 MHz range, and the digital signals are found in the 550 MHz to 862 MHz range.

European signals are normally in a PAL format and operate between 5 MHz and 862 MHz also. The bandwidth allocated for the reverse path is in the 5 MHz to 65 MHz band, while remaining bandwidth is in the 80 MHz to 862 MHz range. Systems may be all analog, all digital or any combinations thereof.

As these signals propagate through the cable(s), the signals will be attenuated. At some point, the attenuation will result in a loss of data. Thus, additional amplification is required between amplifiers to insure sufficient signal strength is available to provide the data as required by the FCC and by equipment manufacturers. This process of re-amplification insures that the quality of signal coming from the head-end is maintained throughout the network to the customer's premise. This additional amplification is achieved using trunk amplifiers; trunk amplifiers with built-in distribution amplifiers; and line extender amplifiers. As used herein, the term "line amplifier" refers to any amplifier used to amplify data signals in a broadband communication or other network.

To produce a useful amplified signal, each amplifier in the broadband communication system requires a viable input signal (i.e., a signal from which data is still detectable) and a power supply. The power supply provides the electrical power at the required voltage and current levels to power the electronic circuitry of the amplifier. For example, the power supplies typically output 60 Volts AC at 15 Amps. However, some power systems use variations of the 60 Volt power supply along with variations of a 90 Volt, 15 Amp or 25 Amp design. The amplifier will then use an internal power circuit to convert the AC to the required DC voltage for powering its internal circuitry.

Power failure to an amplifier will result in loss of the data signals at downstream and upstream points. To guard against such power failure, three techniques have commonly been used. First, an uninterruptible power supply (UPS) that uses backup batteries can be used. Second, backup generator systems have been used with and without UPS power supplies at specific power supply locations. Third, switching circuits have been used to provide power from a backup source upon failure of a primary source. Backup battery or backup generator systems are costly and have high-maintenance requirements.

Switching systems operate on the following principle. It is often the case that the amplifier power supplies, which are spatially separated along a broadband communication network, are powered by different service areas of the commercial power network. Thus, while one service area may fail, a neighboring service area may still be functioning properly. A common example of this phenomenon can be seen during a power outage, wherein buildings on one side of a street may have power, while buildings on the other side might not have power. In the case of a broadband communication network, in the event of a power failure at amplifier A (being supplied by grid #1), a power switch can be used to route the power from a distant power supply at amplifier B (being supplied by grid #2) along the cable to power amplifier A. To accomplish this, a power switch is associated with each power supply. Upon failure of a local power supply, the power switch will receive power from a remote power supply and provide the power to the local amplifier. The power from the remote power supply is transmitted between the power switches over the broadband communication network. Power combiners (also called, power inserters) are used to combine the power (AC) with the RF signals for transmission on the cable. U.S. Pat. No. 5,747,888 to Zilberberg is an example of a power switch.

What is needed is a power switch for use in a broadband communication network that improves upon existing power switches.

BRIEF DESCRIPTION OF THE FIGURES

These and other features of the invention are more fully described below in the detailed description and accompanying drawings.

DETAILED DESCRIPTION OF THE INVENTION

Embodiments of the present invention are now described with reference to the figures, where like reference numbers indicate identical or functionally similar elements. Also in the figures, the left-most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

Figure 1:
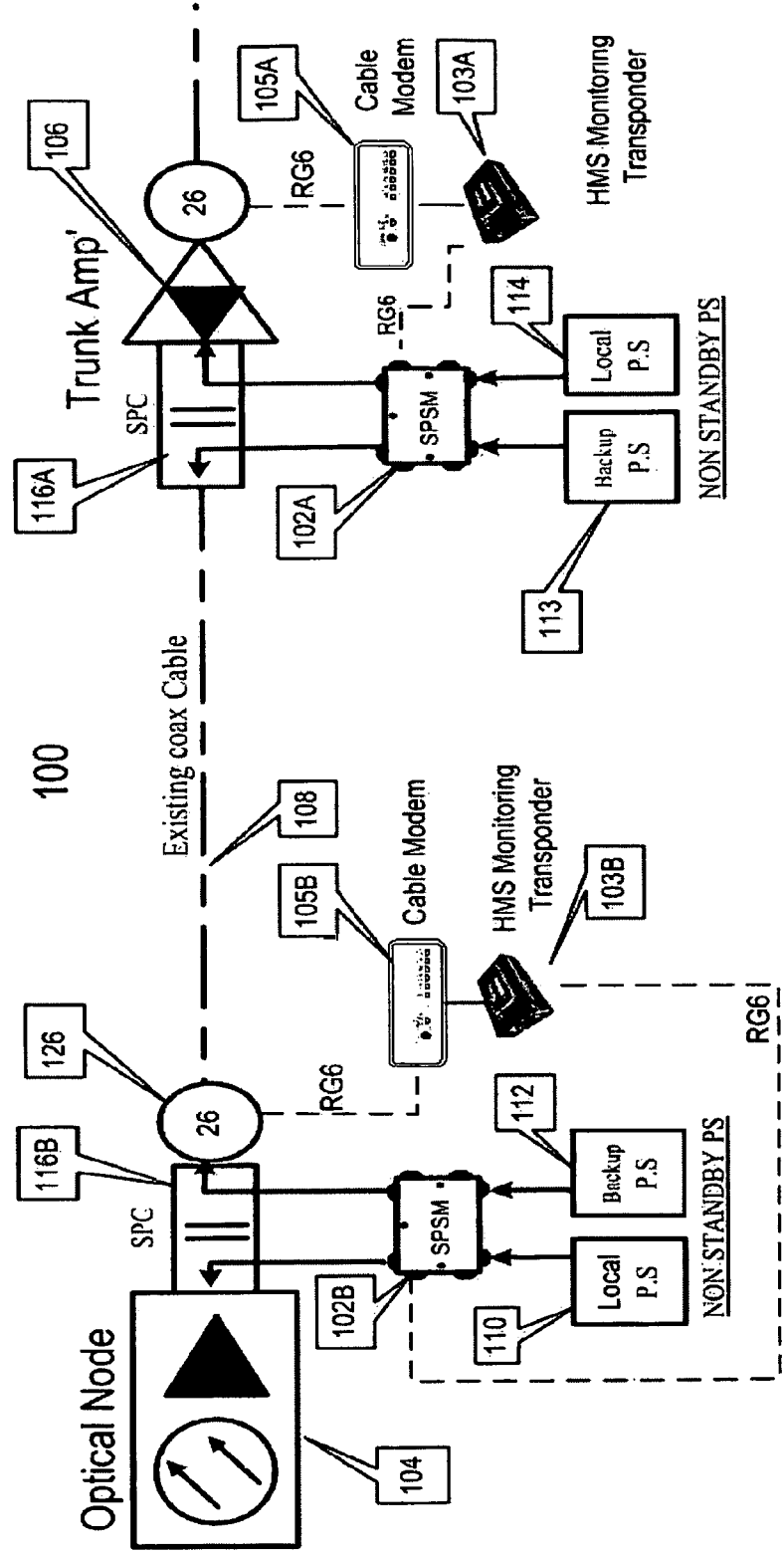
FIG. 1 is a high-level diagram illustrating use of smart power switch and monitoring modules (SPSM) in a broadband communication network.

FIG. 1 is a high-level diagram illustrating use of smart power switch and monitoring modules (SPSMs) 102 in an HFC network 100, according to an embodiment of the present invention. In this illustrative embodiment, an optical node 104 (including an amplifier) is connected to a downstream trunk amplifier 106 by a coaxial cable 108. A primary power supply 110 and a backup power supply 112 are provided to supply power to optical node 104. A primary power supply 114 and a backup power supply 113 are provided to supply power to trunk amplifier 106. SPSM 102B and power coupler (i.e., power inserter) 116B are disposed between power supplies 110, 112 and optical node 104. SPSM 102A and power coupler (i.e., power inserter) 116A are disposed between power supplies 113,114 and trunk amplifier 106. Each power supply 110, 112, 113, 114 can be, for example, a conventional ferro-resonant power supply receiving power from the local power grid, a battery-supported uninterruptible power supply, a generator, or any combination thereof.

Each power combiner 116 is configured to pass the data signals from node 104 to trunk amplifier 106 and to pass an AC power signal from an SPSM 102 over coaxial cable 108 to the other combiner 116. However, combiners 116 will isolate the AC power signal on coaxial cable 108 from node 104 and from trunk amplifier 106. An AC power signal can only be provided to node 104 through SPSM 102B. Similarly, an AC power signal can only be provided to trunk amplifier 106 through SPSM 102A. As will be apparent to a person skilled in the relevant art, it is important to avoid application of AC power signals from two sources to cable 108, node 104 or trunk amplifier 106. This function is performed by SPSMs 102 working in conjunction with power combiners 116.

Each SPSM 102 includes internal monitoring circuitry (discussed below). The monitoring circuitry produces a data (or status) signal that is provided to a monitoring transponder 103. Monitoring transponder 103 formats the data signal, extracts a power signal and provides both the data signal and the power signal to a cable modem 105. The cable modem, powered by the power signal, then modulates the data signal and transmits it (via distribution tap 126) over coaxial cable 108 to a remote monitoring station (not shown). In one embodiment, each cable modem includes a unique IP address that permits it to communicate with any remote terminal desiring to access the status information for the SPSMs connected to the cable modem. For example, a remote user can monitor the status of a particular SPSM via a Web browser-based interface over the global Internet.

In an alternate embodiment, the data/status signal produced by SPSM 102 can be provided to a wireless transmitter (e.g., a radio frequency transmitter) that modulates the data/status signal and transmits it for reception at a distant location.

FIGS. 2-18 are simplified versions of FIG. 1 used to illustrate operation of SPSMs 102. Power combiners 116 are not shown in FIGS. 2-18 for ease of explanation and because their operation will be evident to a person skilled in the relevant art. Note in these figures that each SPSM 102 includes power supply input ports 201 and 204, output port 202, and input/output (I/O) port 203. Input 201 is for a local power supply. Input 204 is for a backup power supply. Output 202 is to the local amplifier. I/O port 203 is connected via cable 108 to an I/O port 203 of another SPSM 102. Switches (within SPSMs 102, but not shown in FIGS. 2-18) may be configured to: (1) provide local power (from port 201) to output port 202, (2) provide local power (from port 201) to output port 202 and provide backup power (from port 204) to I/O port 203, (3) provide backup power (from port 204) to output port 202 and to I/O port 203, or (4) provide backup power from I/O port 203 to port 202. The circuitry and functionality that controls and enables this switching are described below.

Each SPSM 102 also includes three indicators 206, 208 and 210. In one embodiment, the indicators are light emitted diodes (LEDs). LED 206 indicates whether local power is present and will light green when local power is applied via port 201 and will light red when local power is absent. LED 208 indicates whether backup power is present and will light green when backup power is applied via port 204 and will light red when backup power is absent. LED 210 will indicate whether SPSM 102 is operating in primary mode (LED lighted green) or secondary mode (LED lighted red). Primary and secondary modes of operation are discussed below.

Figure 2:
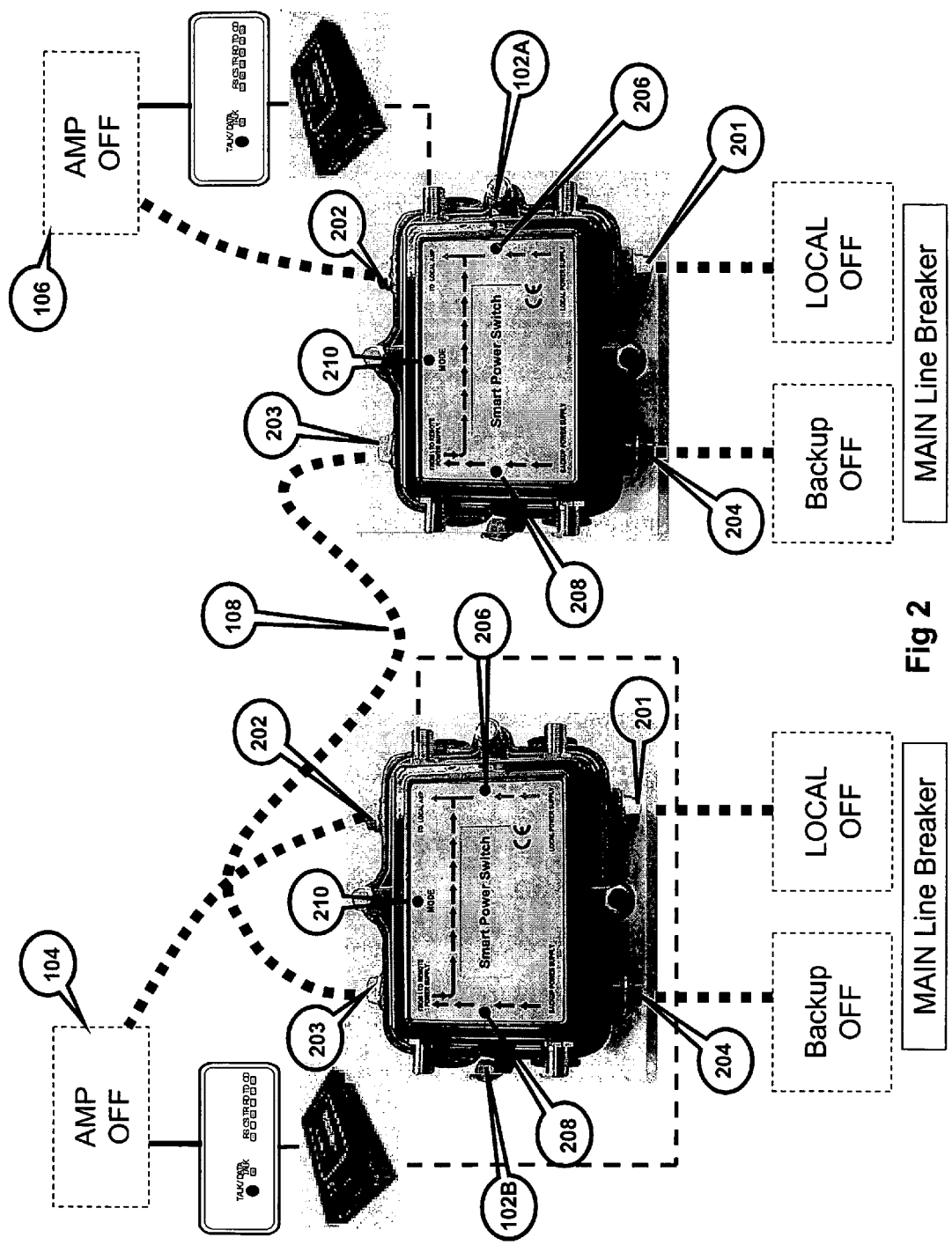
FIGS. 2-18 illustrate operation of two SPSMs in a broadband communications network under various conditions of power being supplied to each SPSM.
Figure 3:
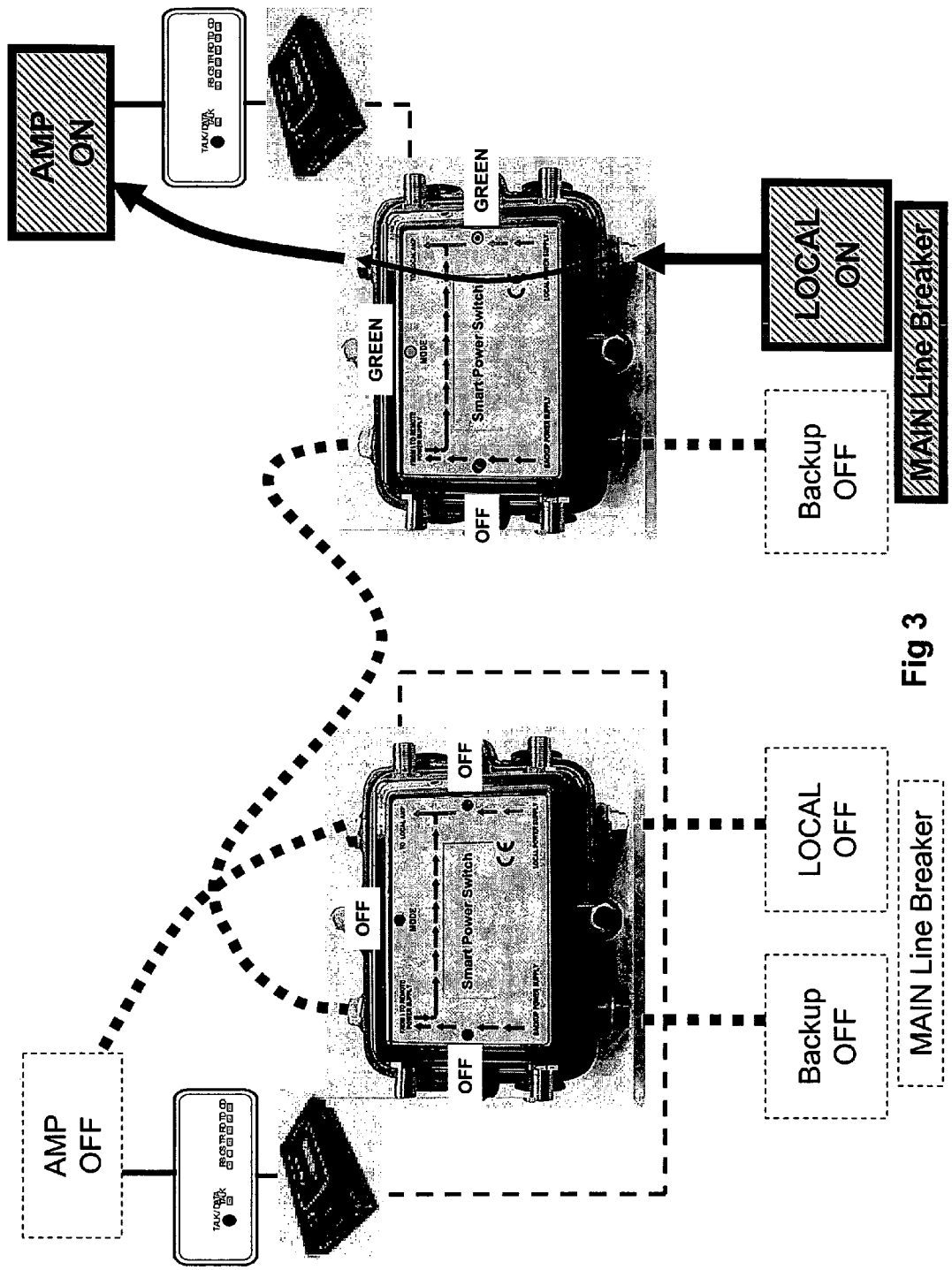
Figure 4:
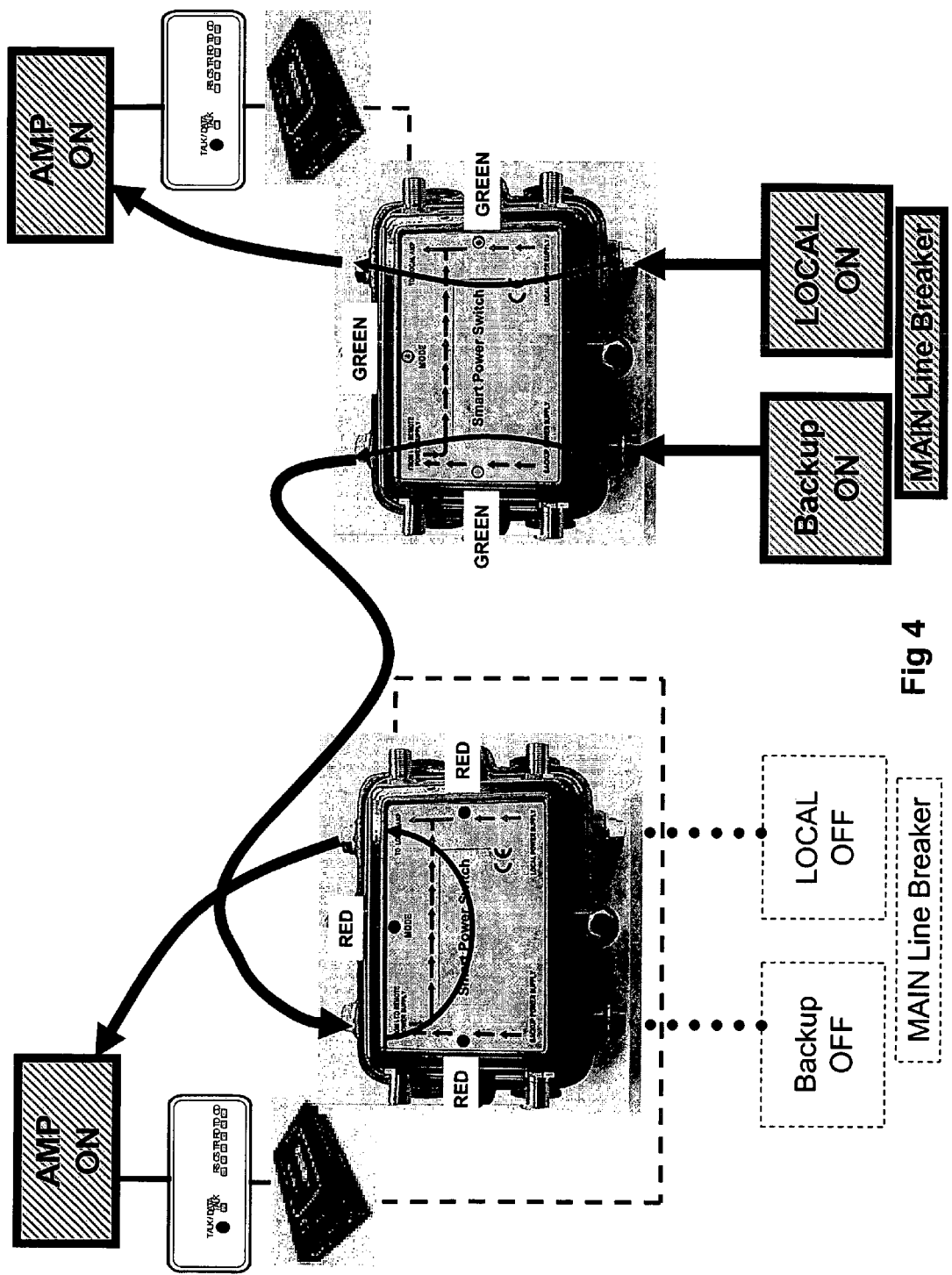

Note that FIGS. 2-18 build upon one another in sequence to illustrate how changes in power conditions cause different configurations of SPSMs 102. Referring first to FIG. 2, note that no power is applied to either SPSM 102. As a result, both amplifiers 104,106 are OFF. In FIG. 3, local power is applied to port 201 of SPSM 102A. In this case SPSM 102A will provide the local power to amplifier 106 via port 202. This will turn ON amplifier 106. Amplifier 104 remains OFF. In FIG. 4, backup power is applied to port 204 of SPSM 102A. In this case SPSM 102A will provide the backup power to SPSM 102B via I/O ports 203 and cable 108. SPSM 102B will then provide the backup power to amplifier 104 via port 202. This will turn ON amplifier 104.

Figure 5:
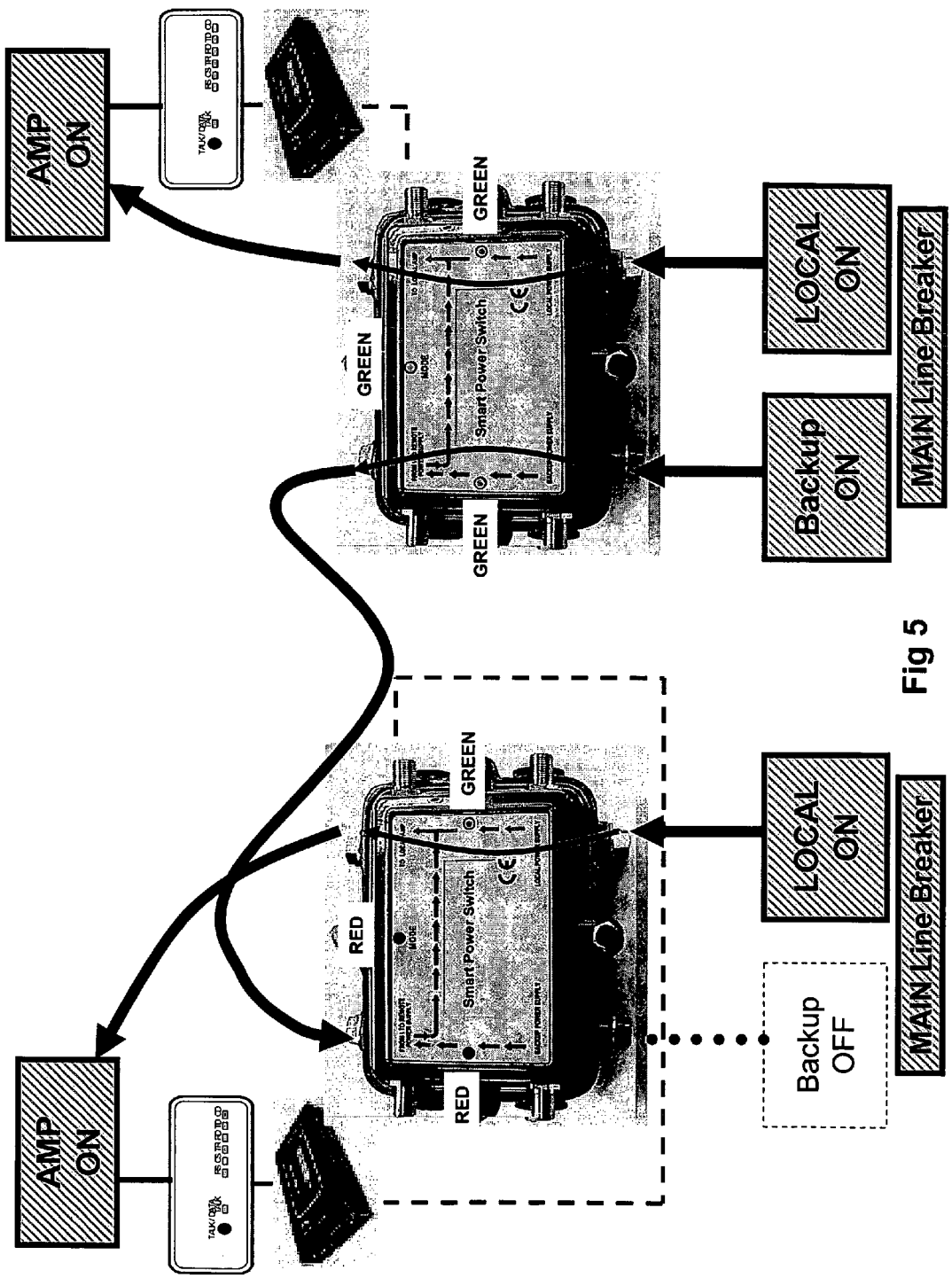
Figure 6:
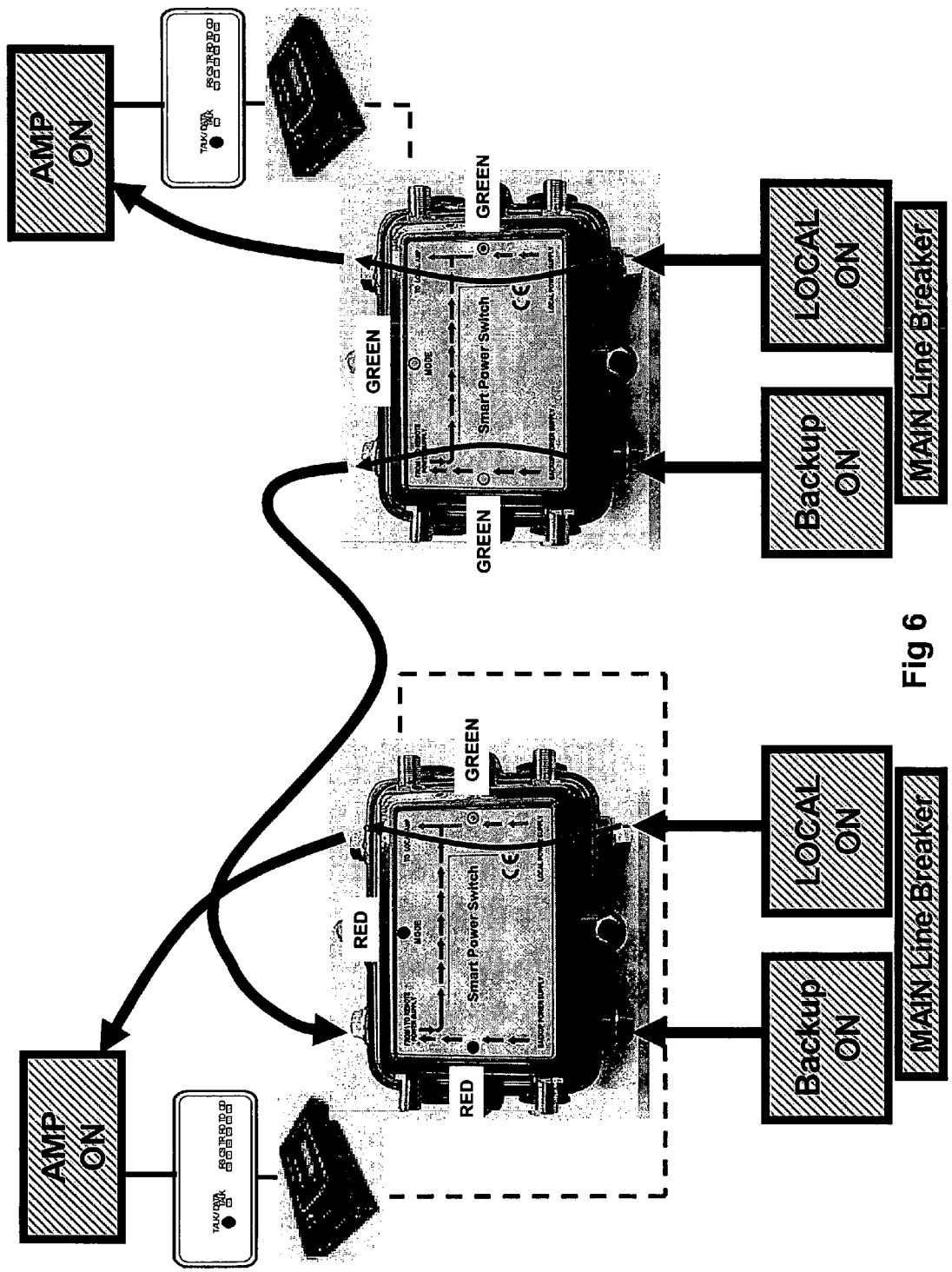

In FIG. 5, local power is applied to port 201 of SPSM 102B. This will cause SPSM 102B to switch such that it supplies power from port 201 to output port 202 rather than from I/O port 203. Cable 108 will still be provided with power from SPSM 102A, but SPSM 102B will select not to use that power. In FIG. 6, backup power is applied to port 204 of SPSM 102B. Power is now applied to ports 201,204 of both SPSMs 102. This, however, will cause no configuration change, as power is already being provided to the amplifiers from the primary local supplies.

Figure 7:
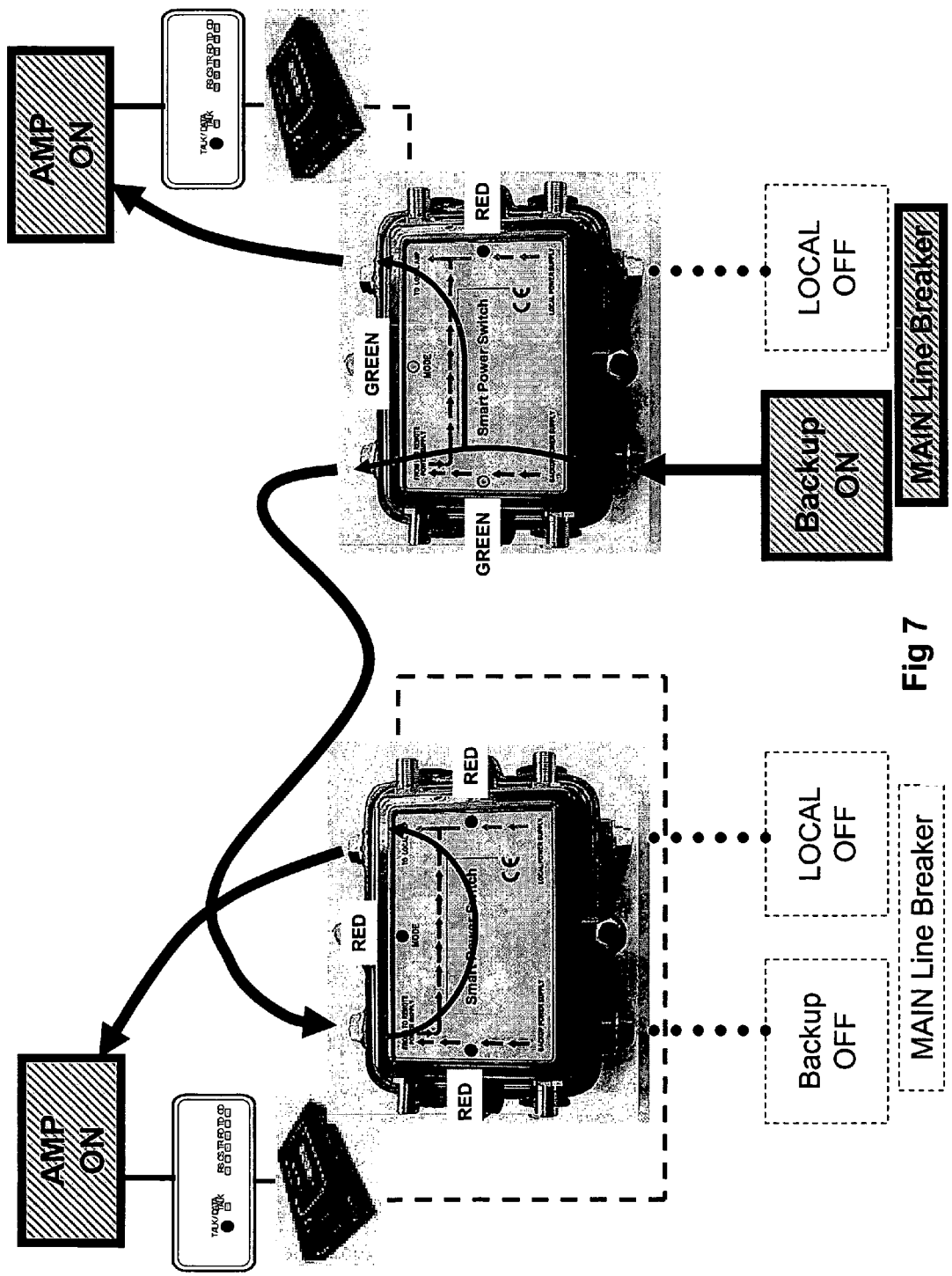
Figure 8:
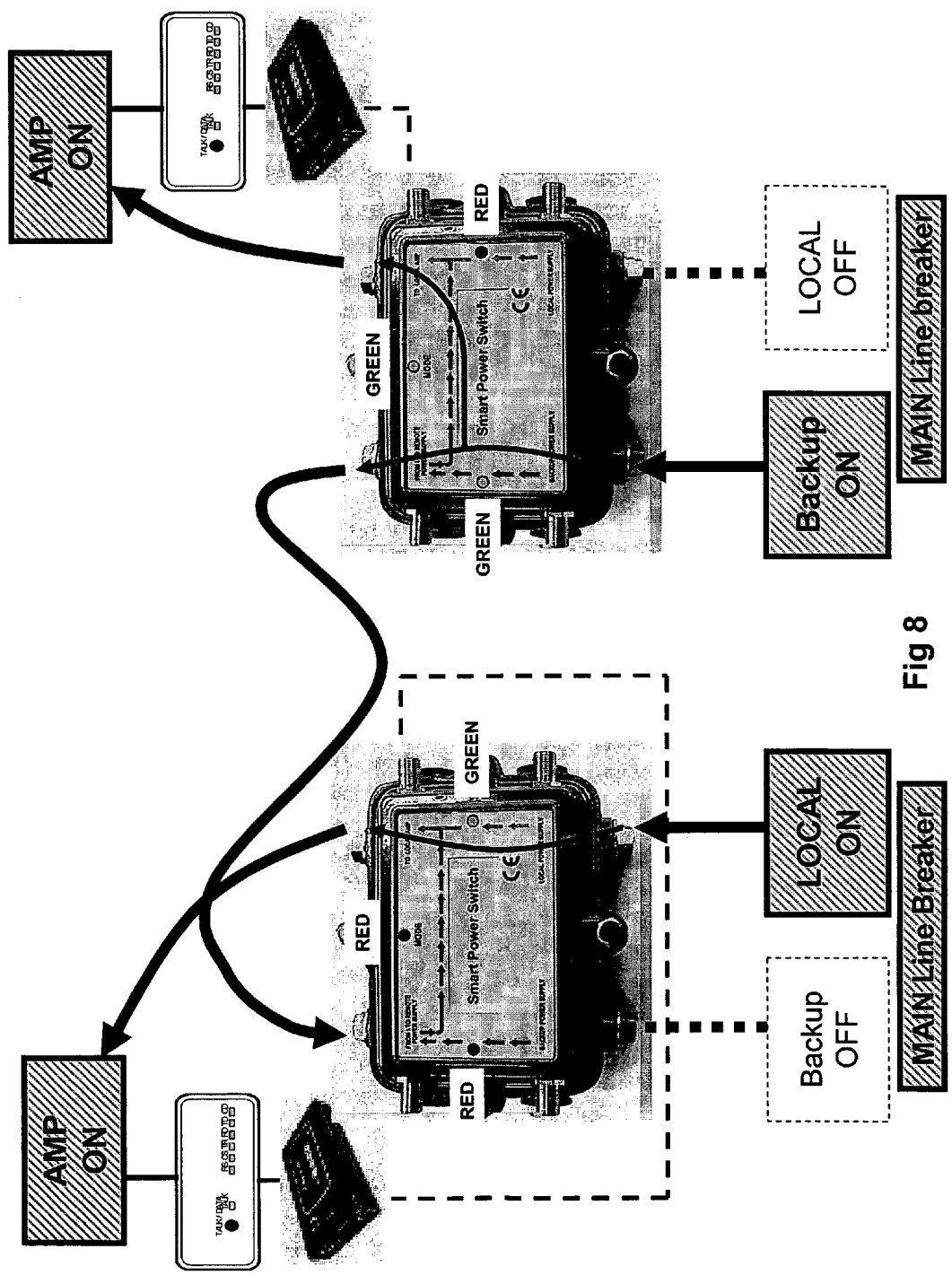

In FIG. 7, all power supplies are turned OFF except backup power on port 204 of SPSM 102A. This causes a reconfiguration of both SPSMs that results in backup power from port 204 of SPSM 102A being supplied to amplifier 106 and amplifier 104 as indicated by the arrows. In FIG. 8, local power is turned ON to port 201 of SPSM 102B. This causes SPSM 102B to switch such that the local power is applied to port 202 as indicated. The configuration of SPSM 102A does not change.

Figure 9:
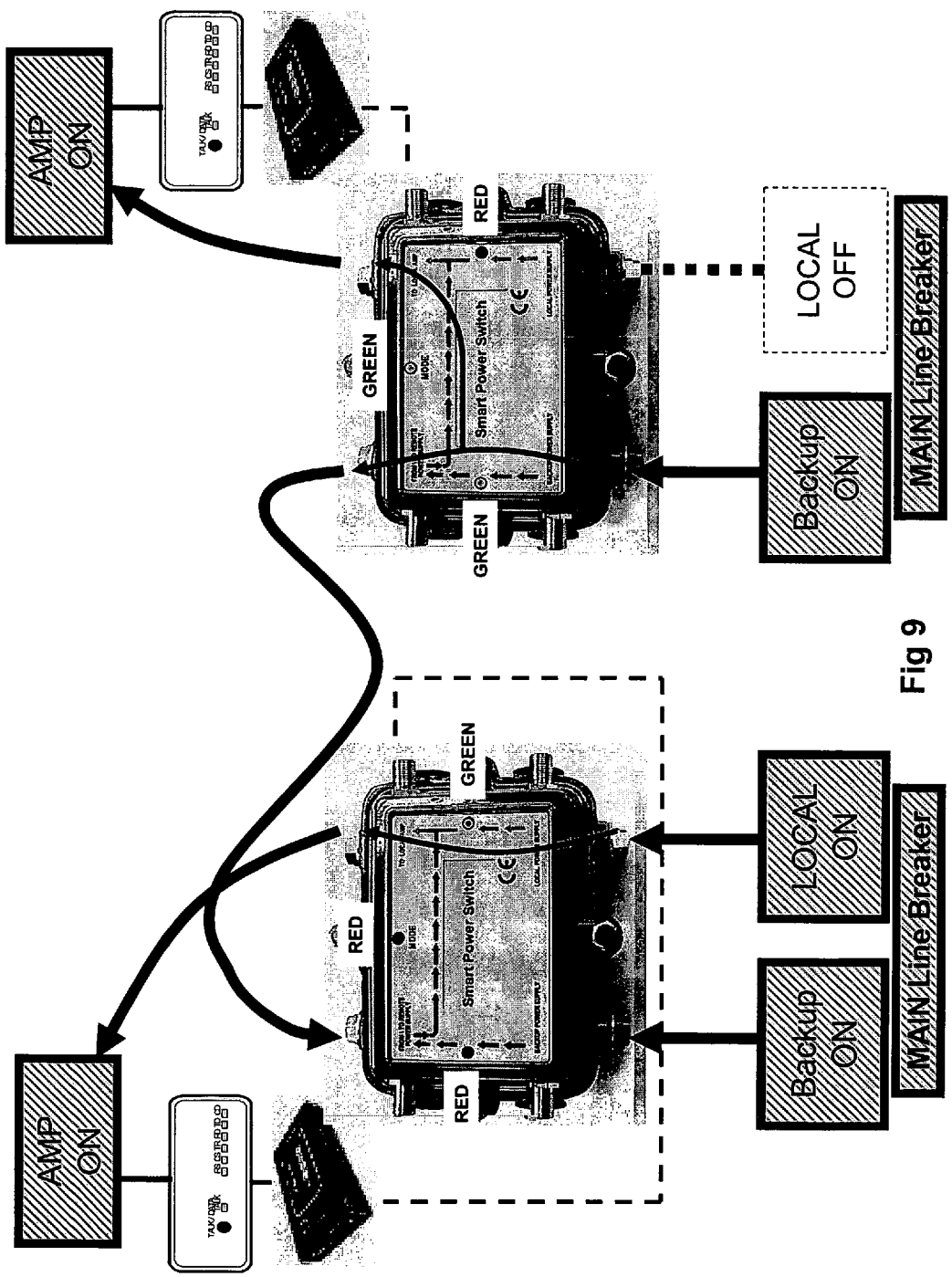

In FIG. 9, backup power is turned ON to port 204 of SPSM 102B. This will cause no switching changes because SPSM 102A is already working off of its own backup power, and SPSM 102B is already working on local power.

Figure 10:
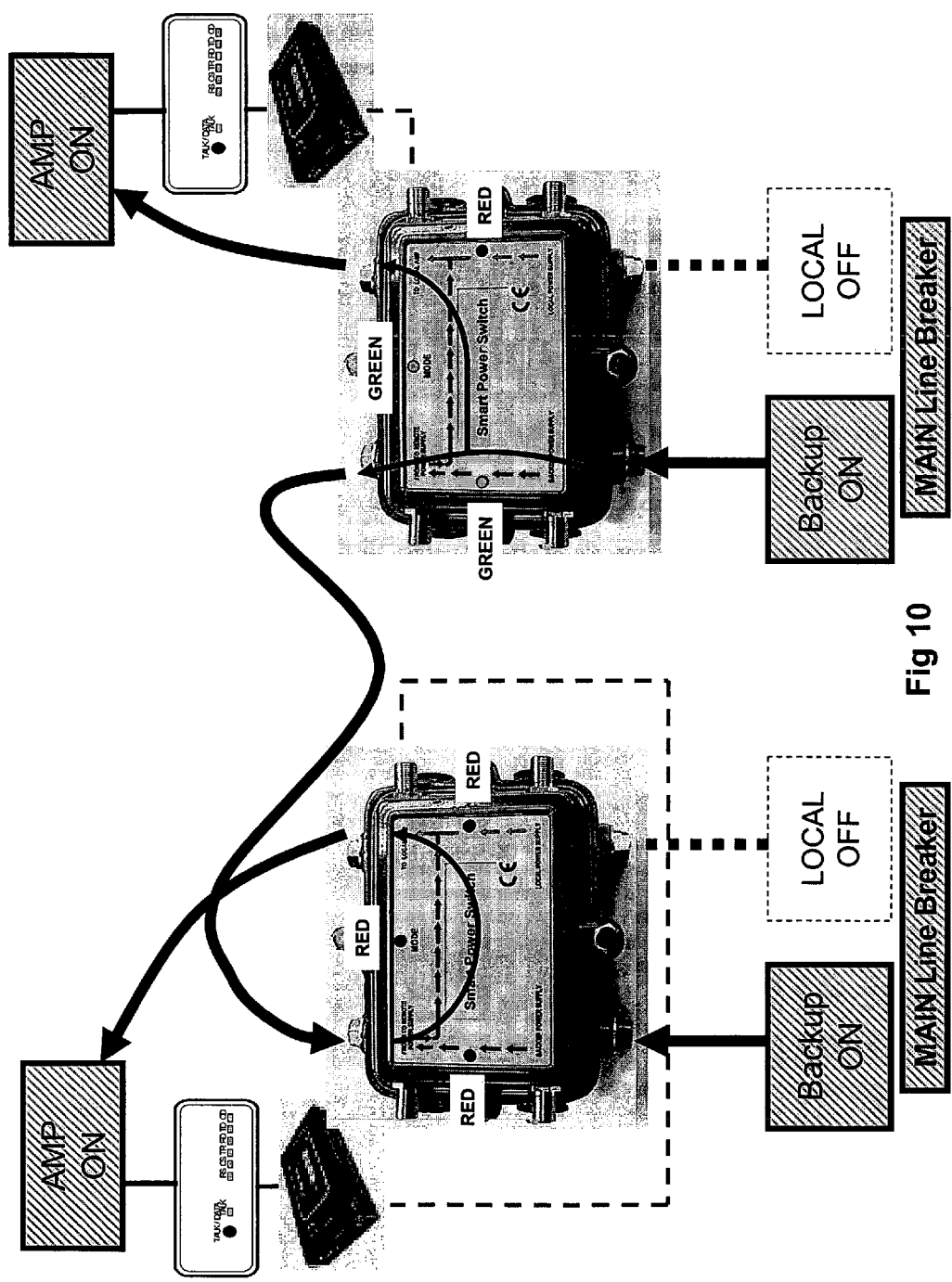

In FIG. 10, local power at port 201 is turned OFF for SPSM 102B. This causes SPSM 102B to select backup power from backup port 204 of SPSM 102A to be supplied to amplifier 104 via I/O ports 203. Note that SPSM 102B did not select local backup power from its own port 204, because backup power was already being provided to cable 108 by SPSM 102A.

Figure 11:
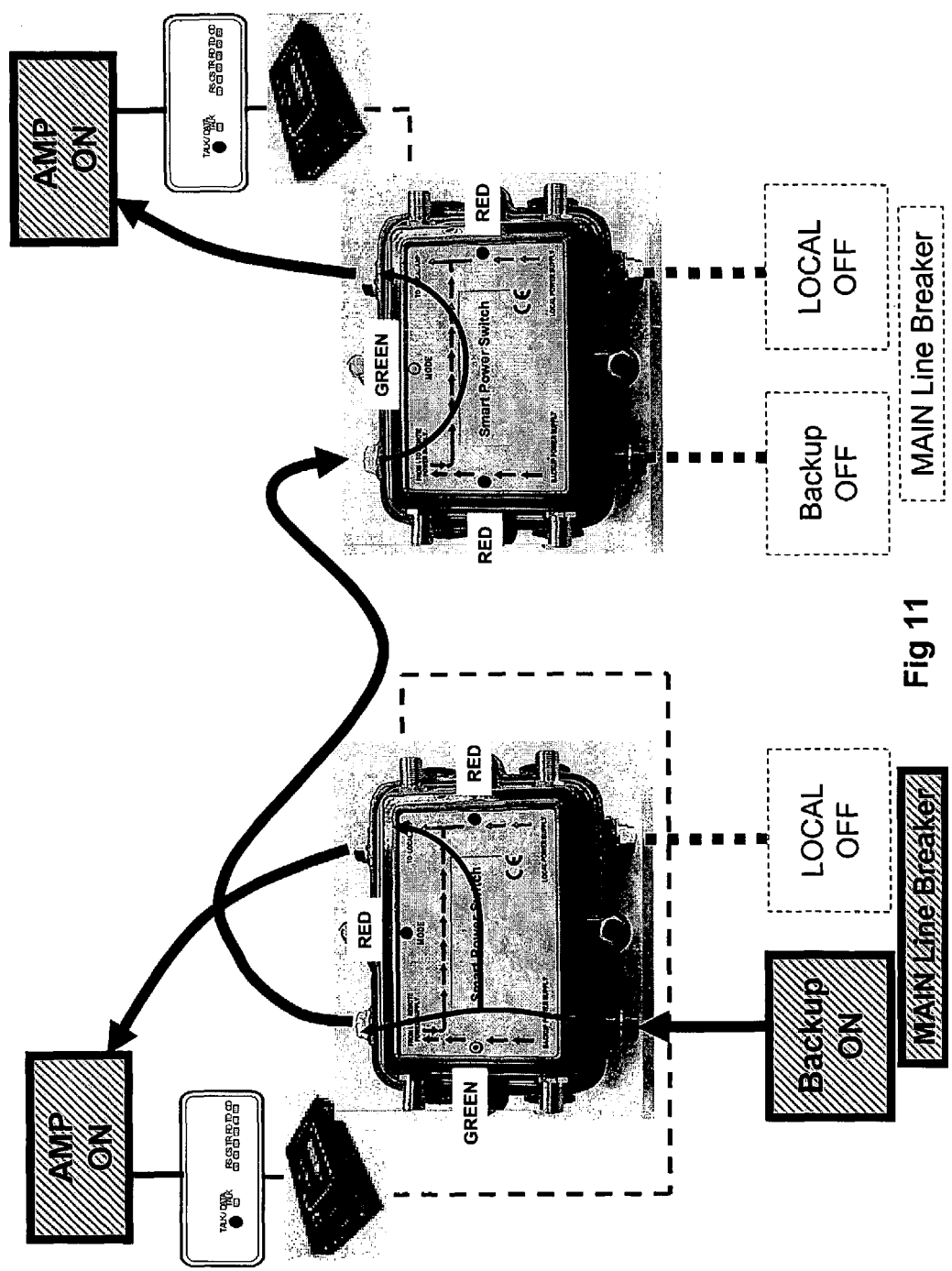

In FIG. 11, backup power at port 204 is turned OFF for SPSM 102A. This causes SPSM 102B to switch to provide backup power from backup port 204 of SPSM 102B to be supplied to both cable 108 via I/O port 203 and to amplifier 104 via output port 202. This also causes SPSM 102A to switch to receive the backup power from cable 108 and to provide that backup power to amplifier 106 via output port 202.

Figure 12:
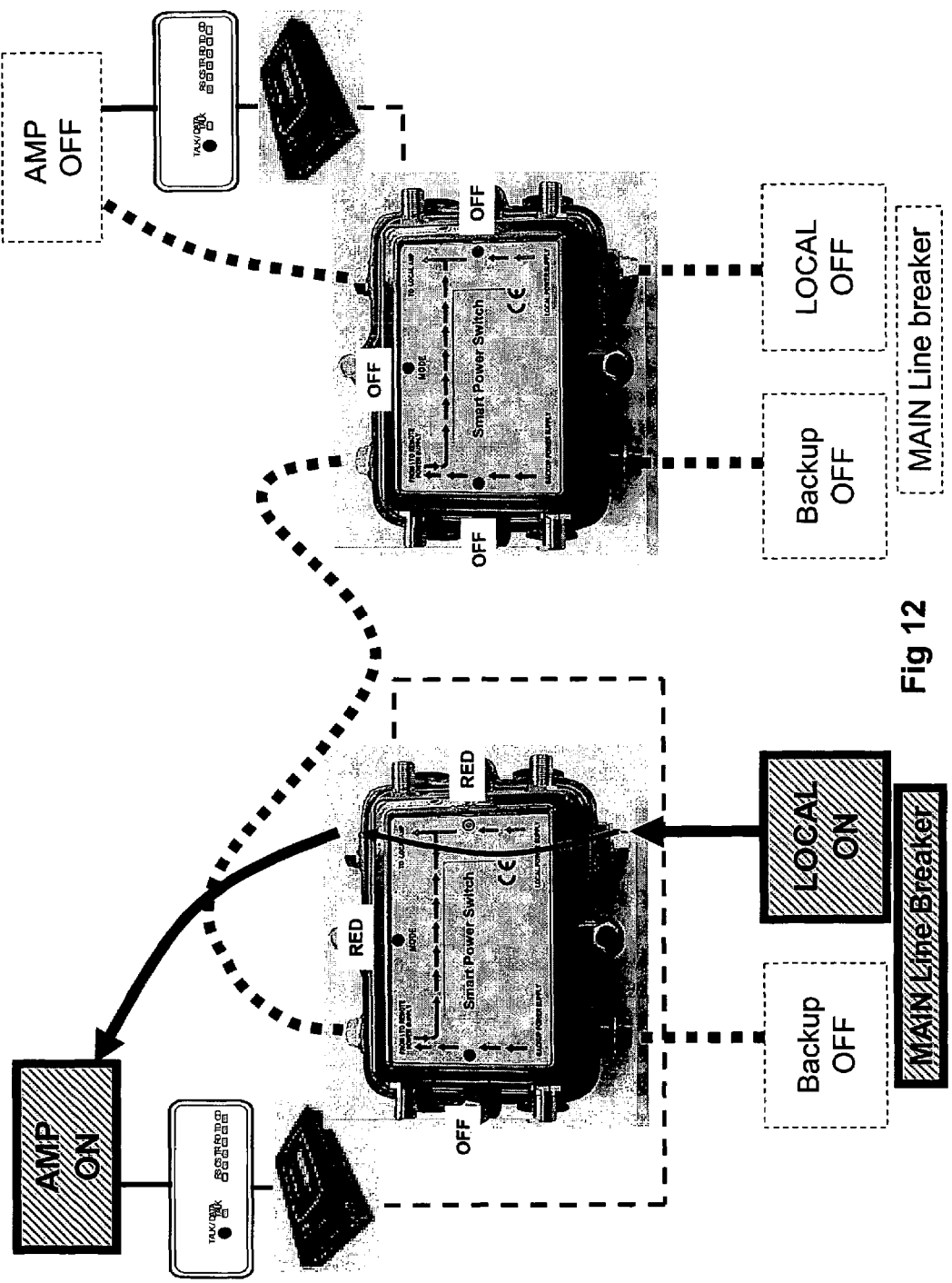

In FIG. 12, backup power on port 204 of SPSM 102B is turned OFF. In this scenario, only local power on port 201 of SPSM 102A is turned ON. This will result in no power being provided to cable 108 or to SPSM 102A. Amplifier 106 will therefore turn OFF for lack of power.

Figure 13:
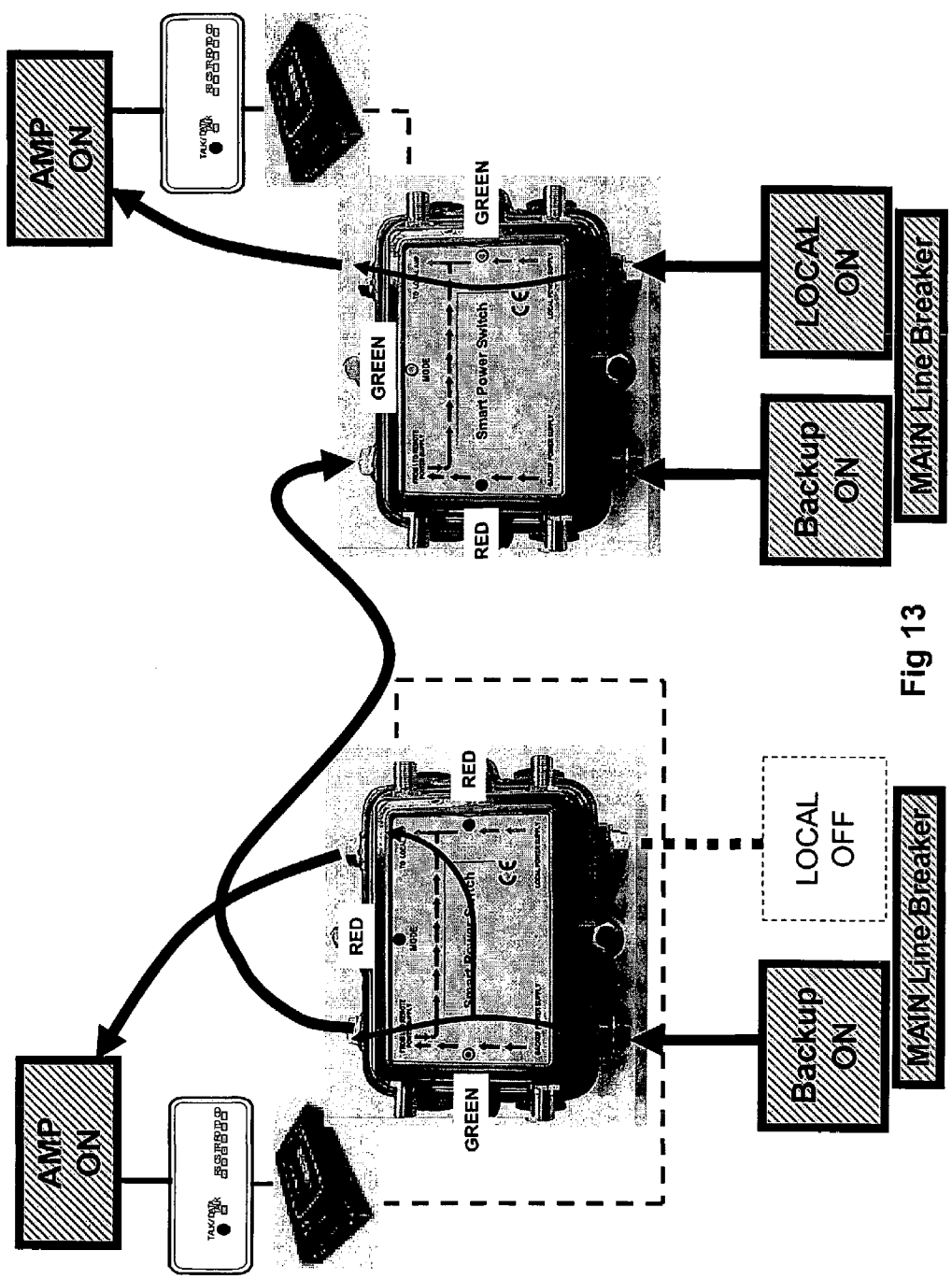

In FIG. 13, local power and backup power to SPSM 102A are turned ON. This will cause SPSM 102A to switch to provide power to amplifier 106 via output port 202. Note, however, that the configuration of SPSM 102B remains unchanged, and the power on cable 108 remains unchanged. That is, SPSM 102B continues to provide power to cable 108 from the backup power supply of SPSM 102B. Compare this scenario to FIGS. 4-10, where SPSM 102A always controls power on cable 108 via the backup power supply of SPSM 102A. The difference is that the SPSM pair implements a latching function whereby whichever SPSM 102 is providing power to cable 108 will continue to apply power to cable 108 so long as the power remains available. For example, in FIGS. 4-10, SPSM 102A was first to apply power to cable 108 and continued to do so until the backup power of SPSM 102A turned OFF. In FIG. 11, SPSM 102B applied power to cable 108. Then, in FIG. 13, backup power from SPSM 102B either (a) remained in a latched position to supply power to cable 108 or (b) backup power at port 204 of SPSM 102B "came up" before backup power at port 204 of SPSM 102A. It should also be noted that additional functionality (discussed below) is provided to guard against backup power on two SPSMs coming up simultaneously and causing simultaneous application of backup power to cable 108 by two SPSMs.

Figure 14:
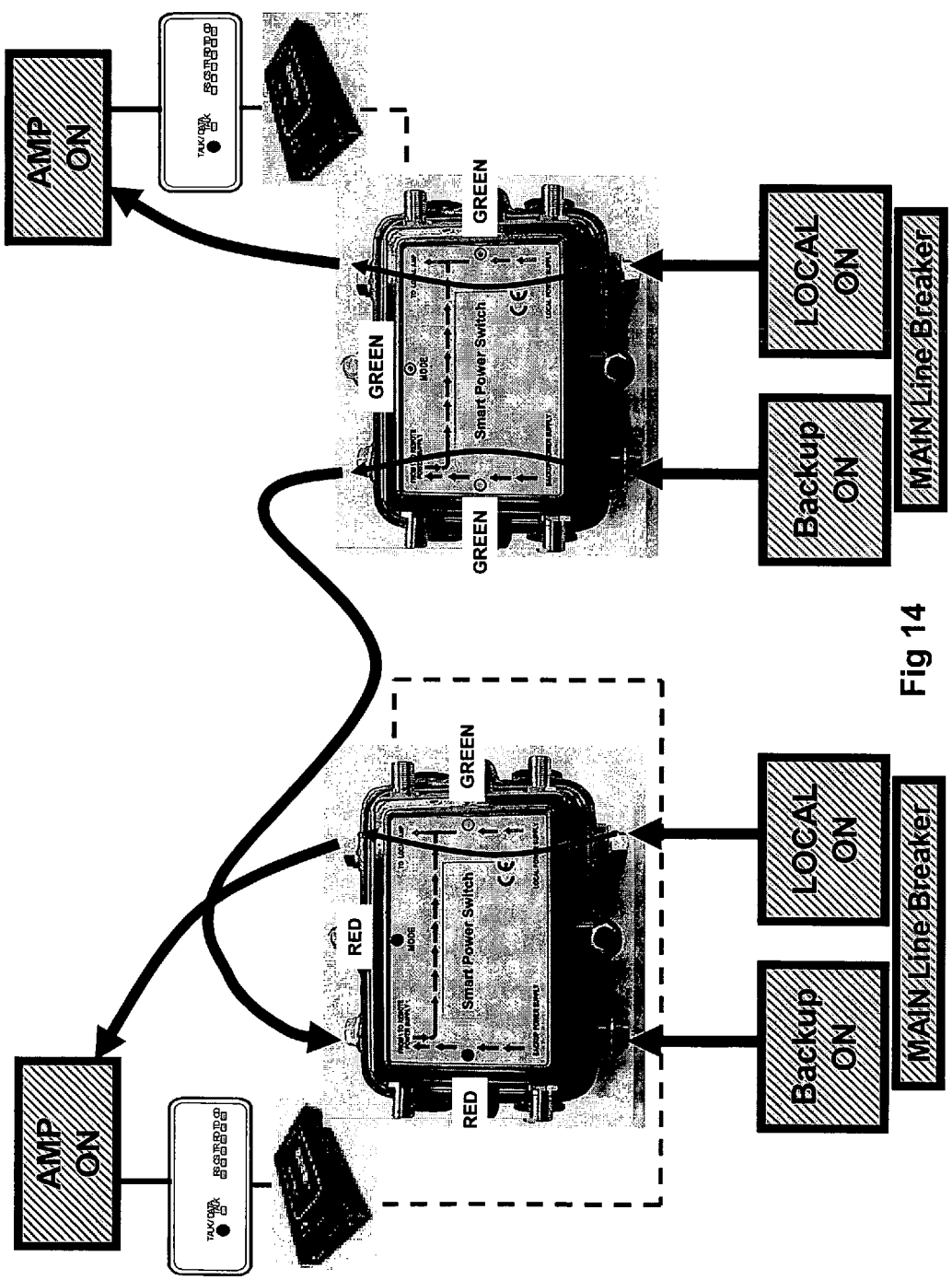

In FIG. 14, local power to SPSM 102B is turned ON. This causes SPSM 102B to switch such that power is provided from port 201 of SPSM 102B to port 202 to power amplifier 106. Backup power from SPSM 102B remains on cable 108, and the configuration of SPSM 102A remains unchanged.

Figure 15:
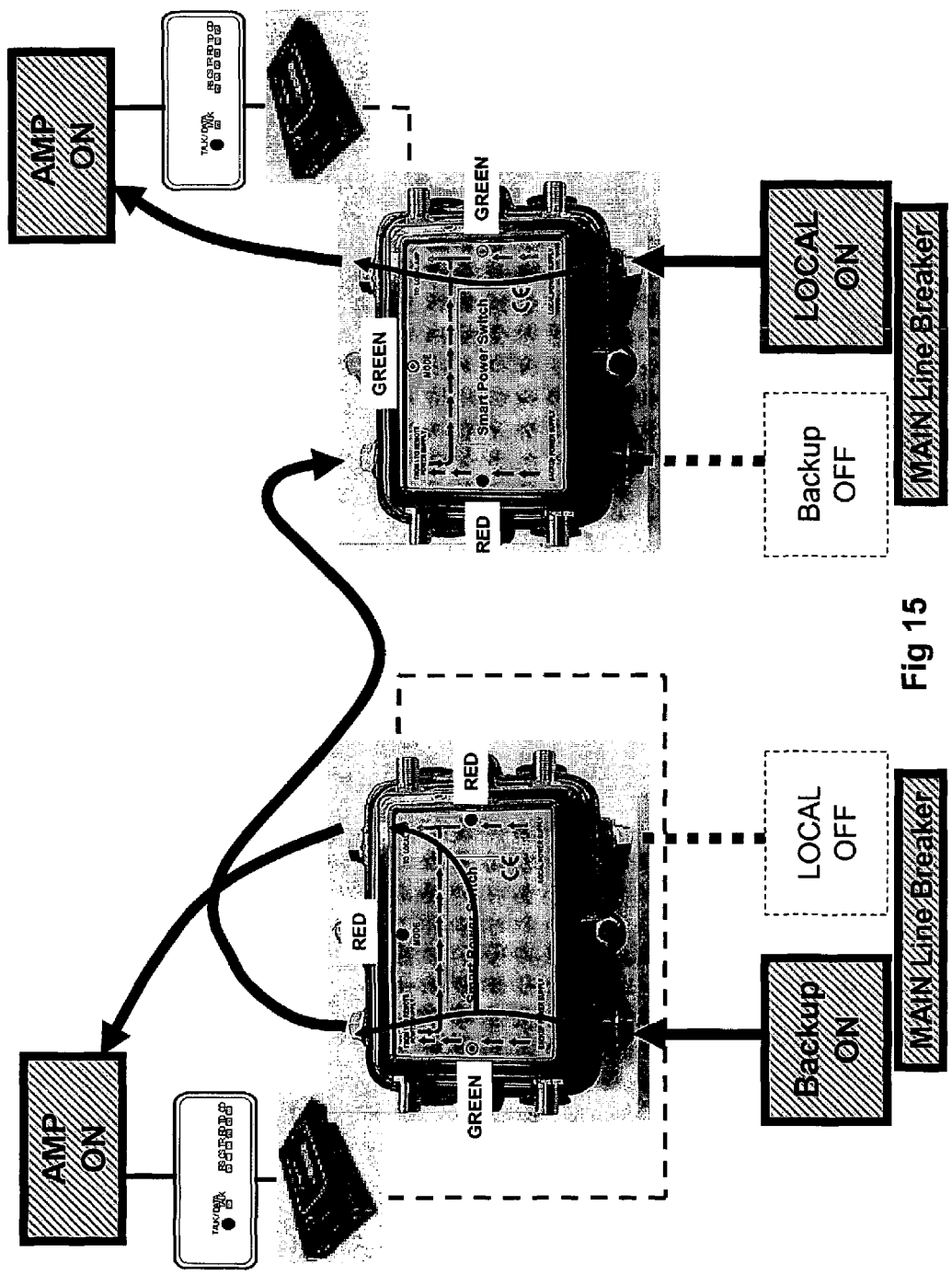

In FIG. 15, backup power to SPSM 102A is turned OFF, and local power to SPSM 102B is turned OFF. This causes SPSM 102B to switch such that backup power is provided from port 204 of SPSM 102B to port 202 to power amplifier 106. Backup power from SPSM 102B remains on cable 108, and the configuration of SPSM 102A remains unchanged.

Figure 16:
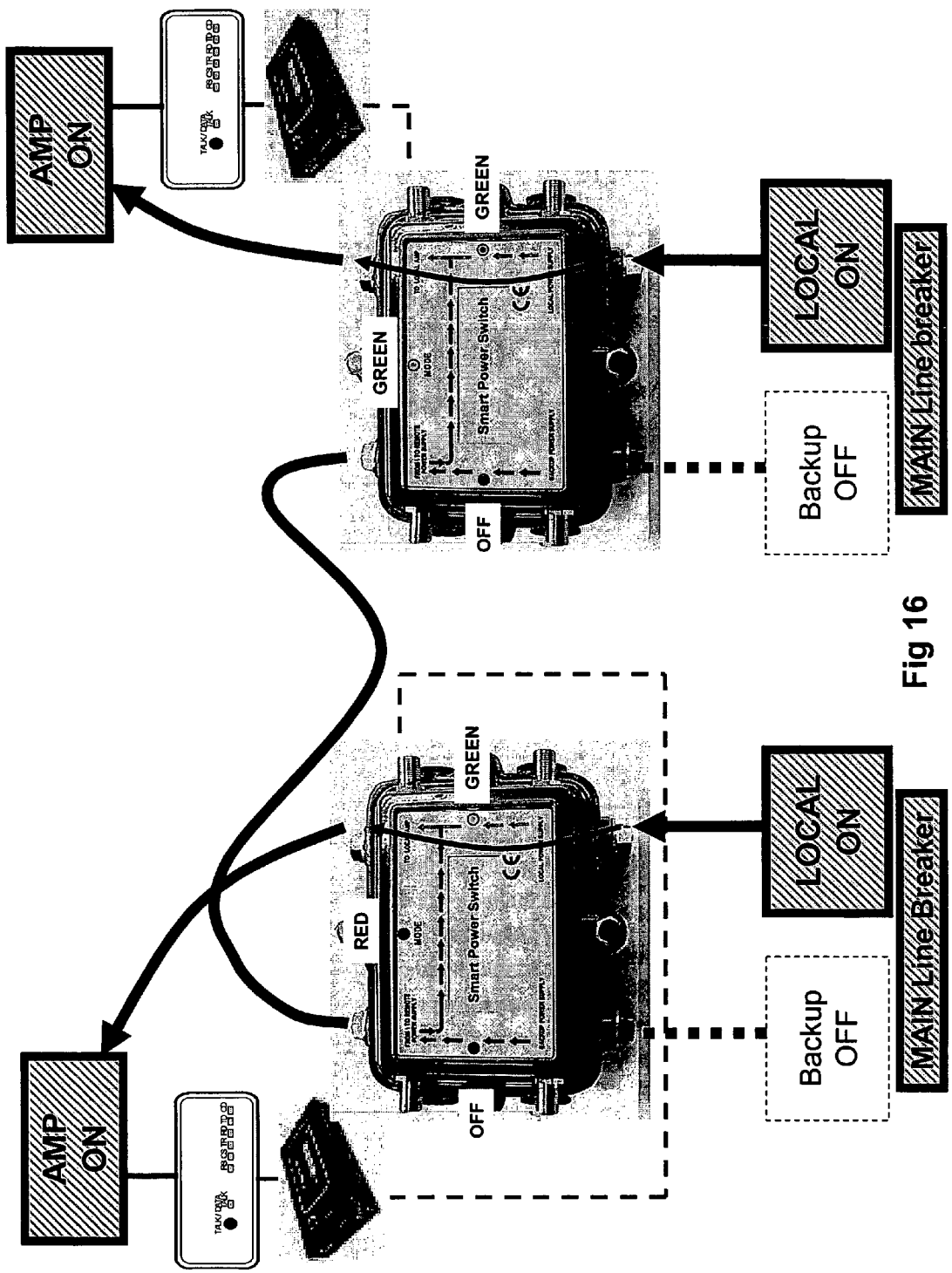

In FIG. 16, backup power to SPSM 102B is turned OFF, and local power to SPSM 102B is turned ON. This causes SPSM 102B to switch such that local power is provided from port 201 of SPSM 102B to port 202 to power amplifier 106. There is no backup power on cable 108, and the configuration of SPSM 102A remains unchanged.

Figure 17:
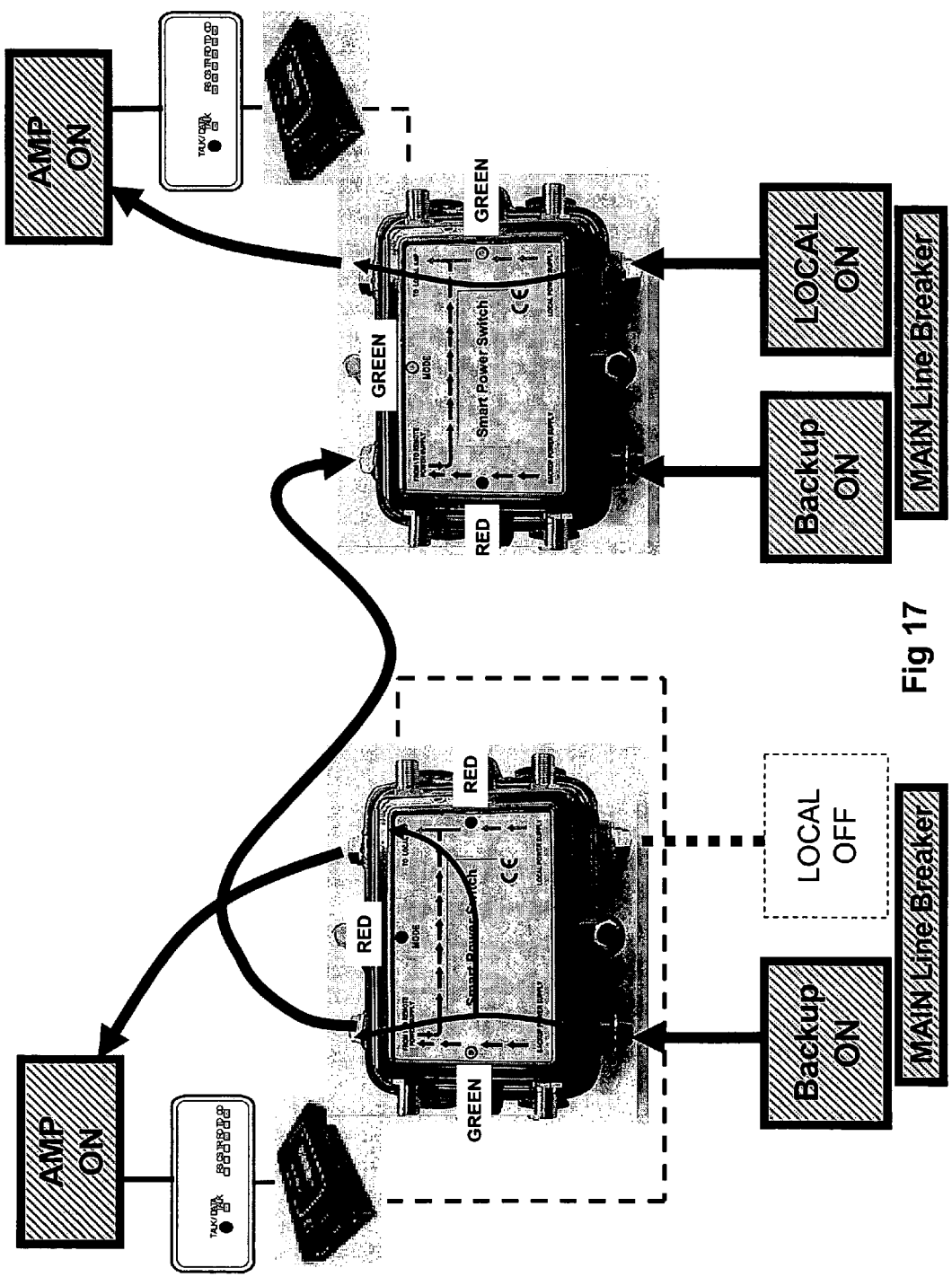
Figure 18:
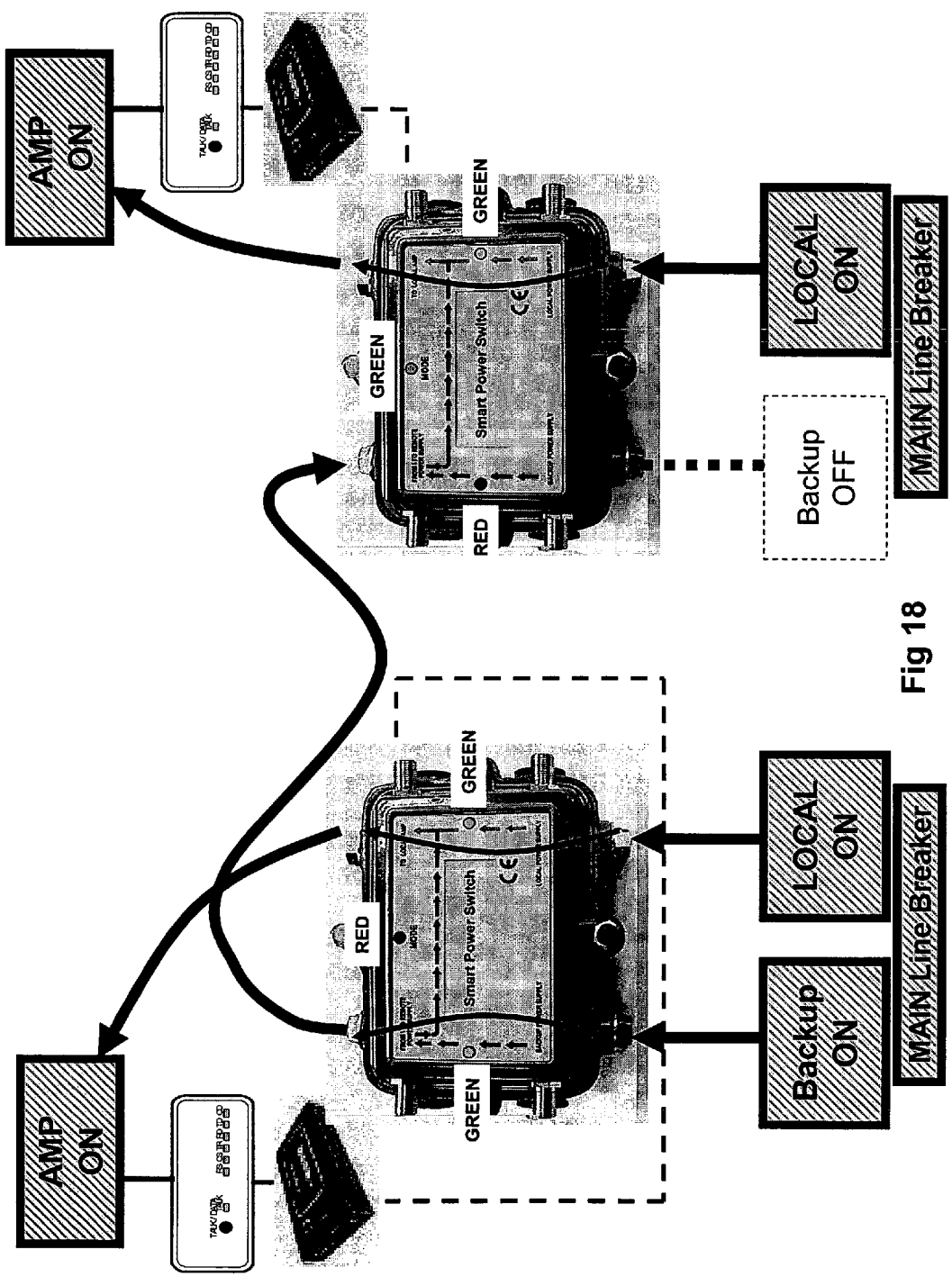

In FIG. 17, local power to SPSM 102B is turned OFF, and backup power to both SPSM 102A and SPSM 102B is turned ON. This causes SPSM 102A to switch and provide backup power to cable 108 via I/O port 203, and causes SPSM 102B to switch such that backup power is provided from I/O port 203 of SPSM 102B to port 202 to power amplifier 106. SPSM 102A controls backup power on cable 108. In FIG. 18, backup power for SPSM 102A turns OFF and local power for SPSM 102B turns ON. This causes SPSM 102B to provide backup power to cable 108 and to provide local power to amplifier 104, via port 202.

Figure 19:
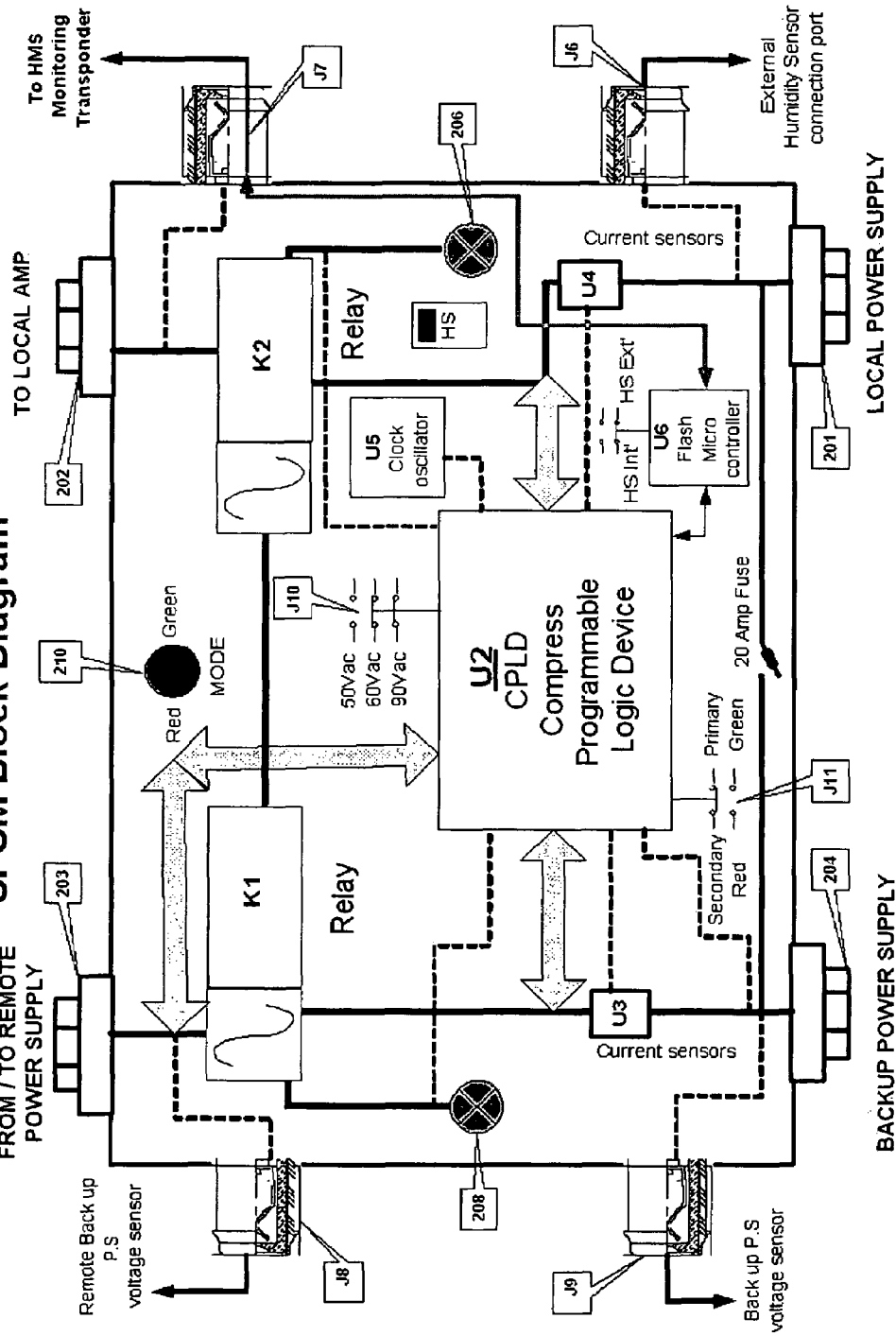
FIG. 19 is a block diagram of an example embodiment of an SPSM according to the present invention.

A block diagram of an example embodiment of SPSM 102 is shown in FIG. 19. SPSM 102 includes a microcontroller (e.g., a compressed programmable logic device or CPLD) U2 and relays K1 and K2. Controller U2 monitors the voltage on ports 201, 203 and 204 to implement the switching functionality described above. Current sensors U3 and U4 sense current flow through relays K1 and K2 for remote monitoring purposes. Monitor ports J5, J6, J7 and J8 allow external monitoring of operation of SPSM 102.

As illustrated in FIG. 19, SPSM 102 also includes a GREEN/RED mode selection switch (e.g., a toggle switch, jumper, or other selection/switching device) J11 and a voltage selection switch J10. GREEN/RED mode switch J11 allows user selection of the primary mode (indicated by LED 210 being lighted GREEN) or secondary mode (indicated by LED 210 being lighted RED). When SPSMs are used in pairs, one is designated as "primary," and the other is designated as "secondary." For example, using the example network of FIGS. 1-18, designating SPSM 102A as primary and designating SPSM 102B as secondary will assure that simultaneous application of backup power to both SPSMs will not cause simultaneous application of power to cable 108. Specifically, the SPSM designated as primary will always launch first in two situations: (a) first application of power to the system at that specific location, and (b) a situation in which both primary and secondary SPSMs simultaneously receive power (e.g. after a large scale/area power failure where both SPSMs were off). In these situations, having one SPSM designated as primary will prevent power collision on cable 108 and damage to the SPSMs. In one embodiment, the secondary SPSM will launch one second after the primary SPSM goes active.

Voltage select switch J10 allows user selection of three separate operating voltage ranges: 50 Volt, 60 Volt or 90 Volt.

Thus, switches J10 and J11 allow a single SPSM unit to be configured for a variety of operating conditions. This will permit an installation or repair technician to stock only a single device rather than multiple different devices.

Figure 20:
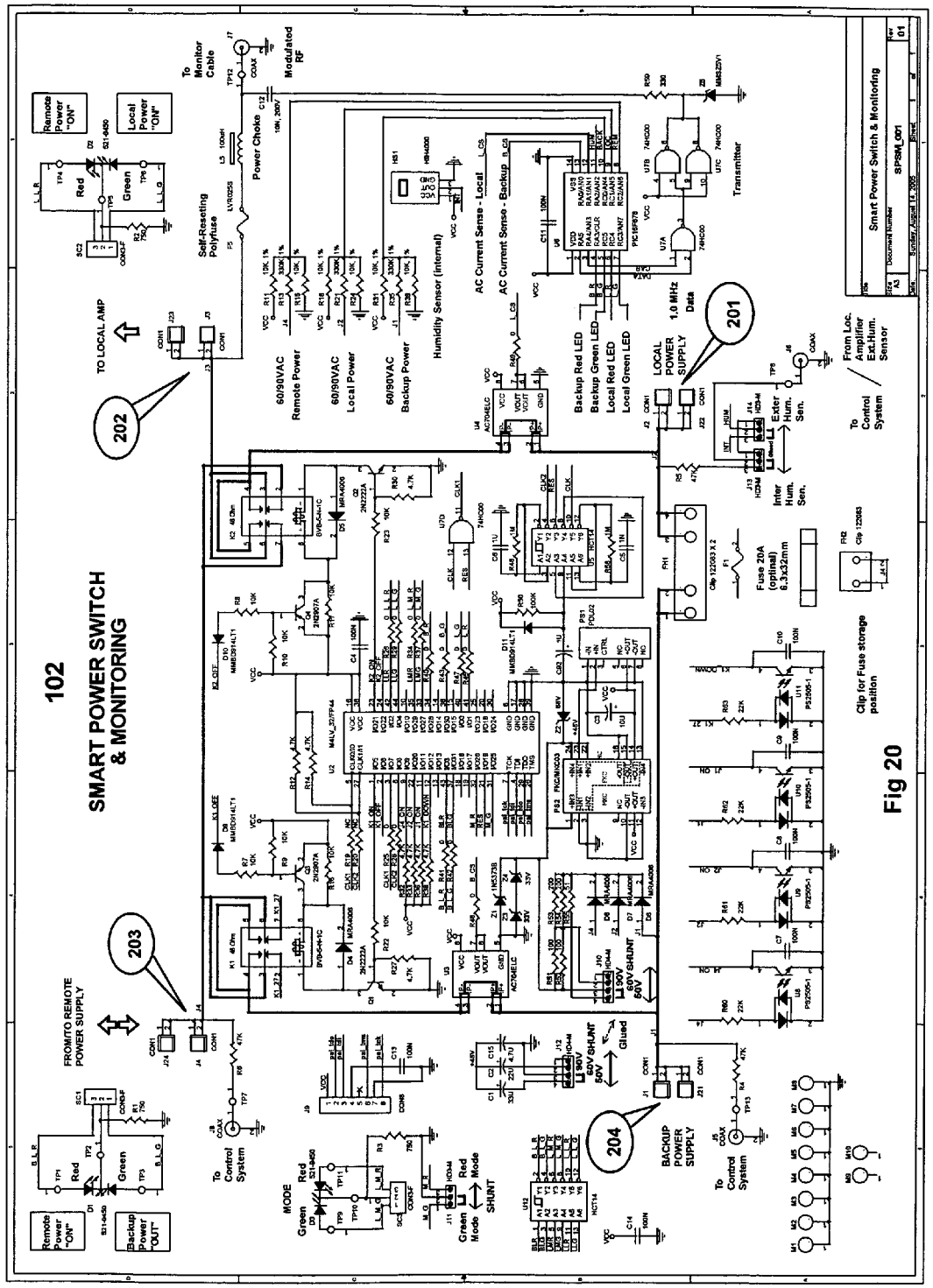
FIG. 20 is a detailed schematic diagram of an example embodiment of an SPSM according to the present invention.

FIG. 20 is a detailed schematic diagram of an example embodiment of SPSM 102. In this example implementation, the components indicated in FIG. 20 have the following specifications. Relays K1 and K2 are AC relays such as part number BVB-5-N1c, available from Bright Toward Industrial Co., Ltd., Taipei, Taiwan (see http://www.relays.com.tw/web/main/html). In an alternate embodiment, triodes, power transistors Triac's or other solid state switching devices may be substituted for relays.

Controller U2 is a part number M4A5-64/32-10VI, available from Lattice Semiconductor Corp., Hillsboro, Oreg., USA (http://www.latticesemi.com/). The logic implemented by controller U2 is depicted in the logic diagrams of FIGS. 21-28. In these figures, U2 is shown with input conditions on the left-hand side and controller output conditions on the right-hand side. Input conditions include (a) local power supply on or off, (b) backup power supply on or off, and (c) remote backup power supply on or off. Thus, there are eight different combinations of input conditions. Output conditions for U2 include relay K2 ON/OFF (i.e., open/closed), relay K1 ON/OFF, local LED red/green, backup LED red/green, and mode LED primary (green)/secondary (red). For this example, primary mode is selected, so that the mode LED will be lit green as long as some power is applied to the SPSM to power controller U2.

As shown in FIG. 20, SPSM 102 also includes:

U6—a microcontroller to provide remote monitoring functionality. For example, part number PIC16F676, available from Microchip Technology Inc., Chandler, Ariz., USA (see http://microchip.com), may be used.

U3 and U4—Hall-Effect current sensors. For example, part number A704ELC, available from Allegro Microsystems, Inc., of Worchester, Mass., USA (see http://www.allegromicro.com), may be used.

HS1—a humidity sensor. For example, part number HIH4000, available from Honeywell International, Inc., Freeport, Ill., USA (see http://honeywell.com/sites/honeywell/), may be used.

U1—wide range DC-to-DC converter. For example, part number PDL02-48S05, available from PDuke Technology, Inc., Walnut, Calif., USA (see http://www.pduke.com/), may be used.

U5—clock oscillator for CPLD timing. For example, a hex inverter chip, such as part number MC74HCT14ADR2, available from ON Semiconductor Limited, Phoenix, Ariz., USA (see http://www.onsemi.com), may be configured as an oscillator as illustrated. The U5 oscillator controls the switchover timing (e.g., 10 msec) between the two SPSMs when a power failure occurs. U5 also controls the clock timing for a self diagnostic test of U2; and The capability to do remote monitoring of SPSM 102 is an advantageous feature of one embodiment of the present invention. As indicated above, the SPSM monitoring interface is based, in one embodiment, on a PIC16F676 (U6) single-chip microcontroller. This component has a built-in calibrated RC master clock, 8-pins which can be programmed to be analog inputs or digital I/O's, three pins can be used for digital I/O and one pin that is programmable to be either a digital input or system clock output. In one embodiment of the SPSM, the latter pin is used as a system clock output, supplying an output square-wave of 1.0 MHz +/−1%.

The monitoring circuit (U6) also monitors, among other things, remote power, local power, and backup power, as shown in FIG. 20. Measurement of these voltages begins with resistor scaling networks (i.e., voltage dividers) formed by resistors R13/R15, R21/R24 and R35/R39, respectively. The scaling networks reduce AC voltages which are typically 60V or 90V square waves centered at approximately zero Volts DC, converting them to smaller signals which are typically in the range of 3-4 Volts peak-peak centered at approximately 2.5 VDC. These signals are then applied to analog inputs on the microcontroller U6. The microcontroller performs a 256 sample RMS calculation on the AC inputs to ensure that ringing and other imperfections on the square-wave power waveform do not produce erroneous voltage measurements.

For monitoring purposes, the AC outputs of the two Hall-effect current sensors, U3 and U4, are also presented to analog inputs of microcontroller U6 for RMS local and backup current measurement. Humidity sensor (HS1) will produce a signal dependent voltage (DV), which is also measured by microcontroller U6 in order to determine internal or external humidity (via jumper through J6). The digital status of each of the LEDs is produced by the microcontroller U2, which sends digital TTL signals to microcontroller U6.

In this example embodiment, SPSM 102 includes a sealed housing such as that depicted in FIGS. 2-18. Being sealed will prevent moisture from entering the housing and causing corrosion and eventual component failure. Moreover, humidity sensor HS1 (in conjunction with monitor circuit U6) will monitor the moisture within the housing. An increase in humidity will typically indicate a failed seal that may lead to eventual device failure. Thus, humidity monitoring will help prevent long-term device failure by early moisture detection. In addition to internal humidity sensing, connector J6 is configured to receive input (e.g., via port J6) from an external humidity sensor located, for example, in the local amplifier.

As indicated above, SPSM 102 includes a monitoring port J7. This port provides a modulated RF (1 MHz) output from monitoring circuit U6. This allows remote monitoring of local power supply current (via current sensor U4), backup power supply current (via current sensor U3), local LED color, backup LED color, temperature, humidity (via humidity sensor HS1), local power supply voltage, backup power supply voltage, primary/secondary mode and the like. The modulated RF output from monitoring circuit U6 is in a serial stream format. Port J7 also provides the operating voltage (e.g., 50V, 60V or 90V) to monitoring transponder 103 (see FIG. 1) that will allow monitoring transponder 103 to be ON, even when both local and backup power supplies are OFF, so that it can transmit the status of the SPSM to a head-end monitoring system.

Microcontroller U6 outputs a 1 Mhz master clock on pin 3 and 300-baud serial output data on pin 2. These two signals are applied to NAND gate U7A whose output is an ON/OFF gated 1 MHz carrier. This signal is buffered to obtain additional current sourcing capability by two additional paralleled NAND gates U7B and U7C (wired as inverters). The outputs of NAND gates U7B and U7C are protected from network voltage transients by Zener diode Z5 and series output current limiting resistor R59. This output signal, representing the monitored status data of the SPSM, is summed with the 60/90 Volt AC uninterruptible network power and is output at connector J7 to the coaxial cable that interconnects the SPSM with transponder 103. The low frequency AC component of the coax signal powers transponder 103, while the much smaller 1 MHz component is used to transmit serial data.

In one embodiment, the serial output of microcontroller U6 has the following characteristics: First, the serial output is transmit-only. Microcontroller U6 transmits a data message to transponder 103 about once every few seconds. Second, the data format is 300 baud, asynchronous, 8 data bits, 1 start bit, and 1 stop bit, no parity. Third, the overall status data message will generally be relatively short, e.g., less than about 20 bytes.

In one example embodiment, the data transmissions by transponder 103 are encrypted so that unlicensed parties cannot copy the transponder or make compatible transponders without the appropriate approvals. A variety of acceptable encryption techniques (e.g., key the encryption to a slow, random, time-variant parameter in order to make unauthorized decryption more difficult) will be apparent to a person skilled in the art.

An example transponder 103 for use with SPSM 106 includes three coaxial inputs for monitoring up to three SPSM units. Each of the coaxial inputs includes a 1 MHz data receiver that demodulates the signal to recover the 300-baud transmissions from the SPSM. A signal from one of the three coaxial inputs can be used to extract the 60/90 VAC power signal and convert it to 3.3 VDC (to power the digital circuitry of the transponder itself) and to 12 VDC (to power cable modem 105).

It should also be noted that, while SPSM 102 includes on-board monitoring capabilities, SPSM 102 can also easily be adapted to work with external status monitoring systems.

Microcontroller U2 also has logic to perform a self diagnostic test. For example, microcontroller U2 can be programmed to perform a monthly test in which U2 will first disable the backup power supply output to relay K1 to make sure that there is active remote power at port 203. U2 will then disable the local power supply output to relay K2 (and leave the backup power supply output to relay K1 disabled). SPSM will then switch to backup mode for 10 seconds, before U2 regains the local and backup power supplies to relays K1 and K2. During the 10 second self test, U2 will sense: active power at port 202 (e.g., 50V, 60V or 90V), the RED state of LED 206 and the RED state of LED 208. If all three conditions are sensed as positive (i.e., power is present at port 202, LED 206 is RED and LED 208 is RED), then U2 will send a TTL logic signal (e.g., a logical one or high) to U6 to inform the monitoring system of status OK. If one of the three conditions is not met, then U2 will send a fail signal (i.e., a logical zero or low) to U6 to inform the monitoring system.

Figure 21:
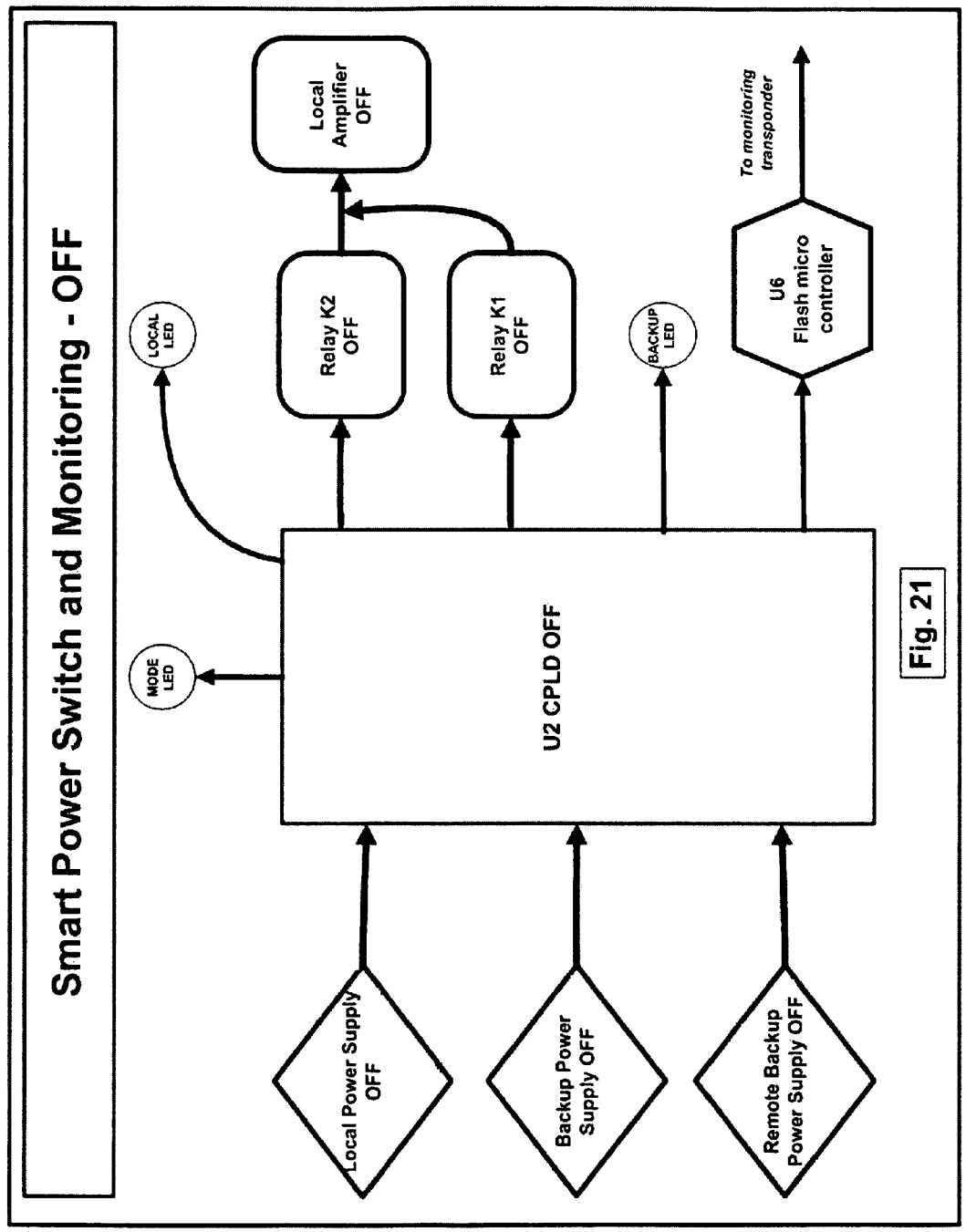
FIGS. 21-28 are diagrams illustrating the operation of a microcontroller (U2) of an SPSM under various input conditions.

FIGS. 21-28 are diagrams illustrating the operation of microcontroller U2 of an SPSM under various input conditions. FIG. 21 shows the following inputs to controller U2: local power supply OFF, backup power supply OFF, and remote backup power supply OFF. With these inputs, controller U2 is OFF, all LEDs are OFF and relays K1 and K2 are OFF.

Figure 22:
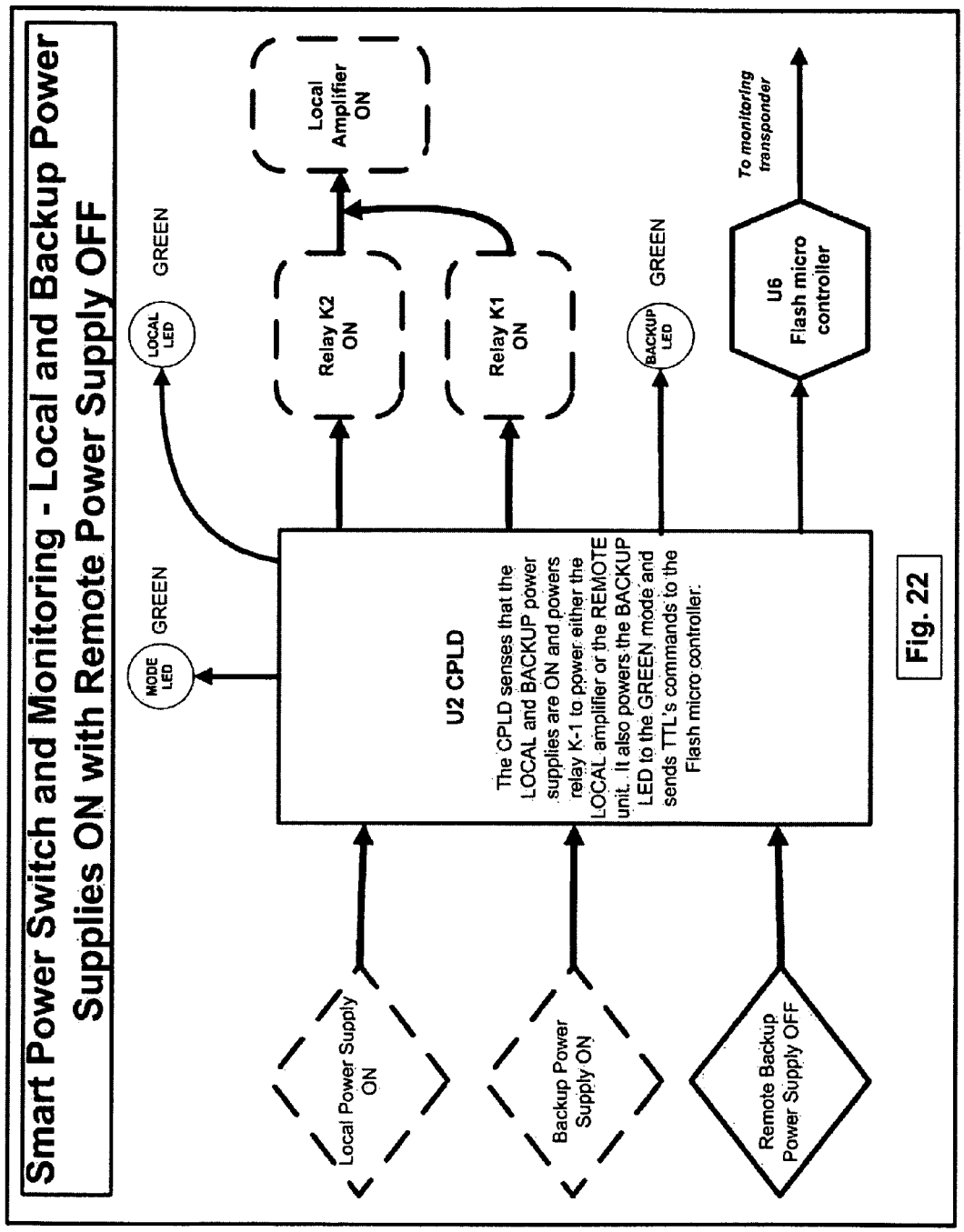

FIG. 22 shows the following inputs to controller U2: local power supply ON, backup power supply OFF, and remote backup power supply OFF. With these inputs, controller U2 is ON and its outputs include: relay K2 is ON, relay K1 is OFF, local LED is green, and backup LED is red. In addition, monitoring commands are sent to monitor circuit U6.

Figure 23:
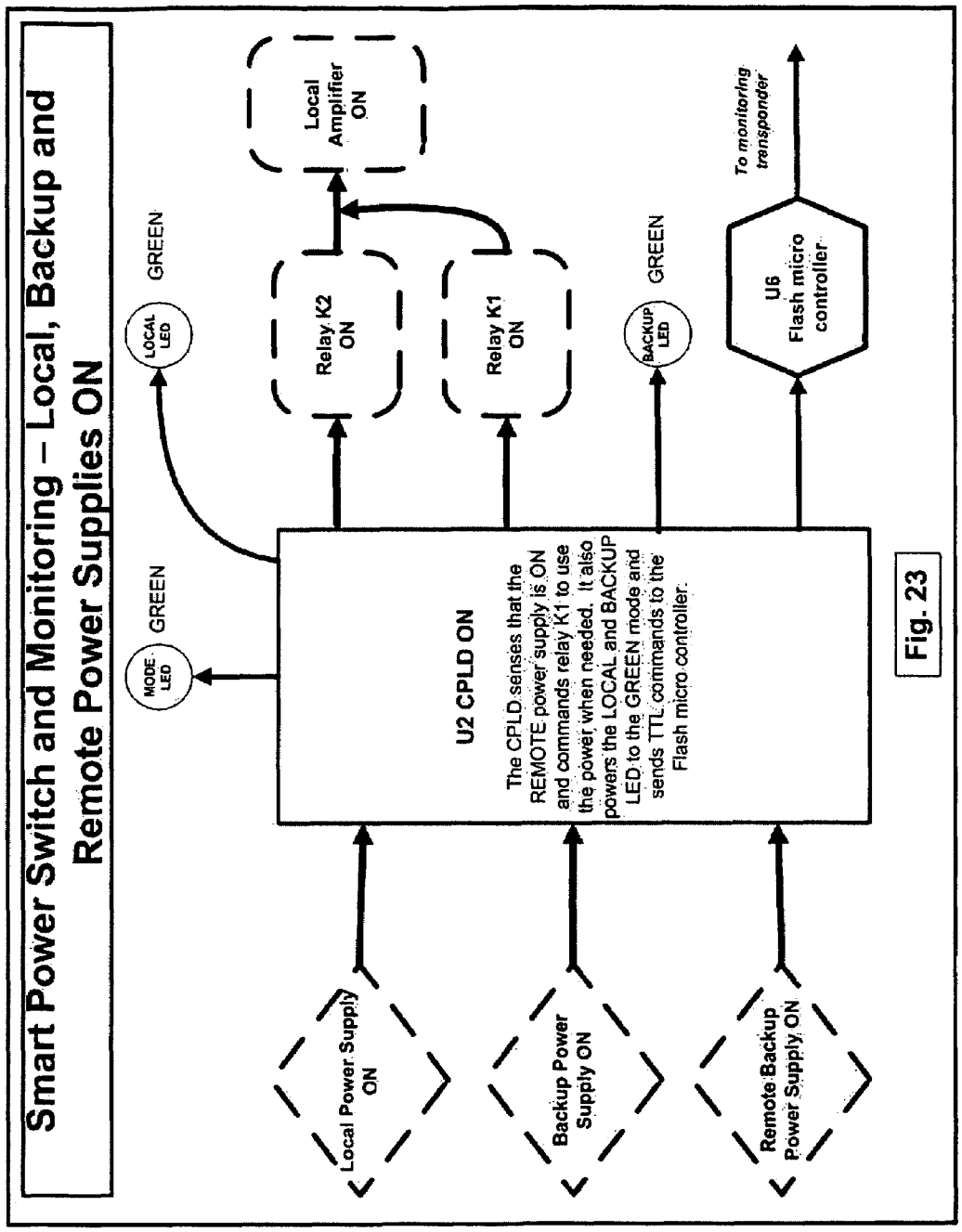

FIG. 23 shows the following inputs to controller U2: local power supply ON, backup power supply ON, and remote backup power supply OFF. With these inputs, controller U2 is ON and its outputs include: relay K2 is ON, relay K1 is ON, local LED is green, and backup LED is green. In addition, monitoring commands are sent to monitor circuit U6.

Figure 24:
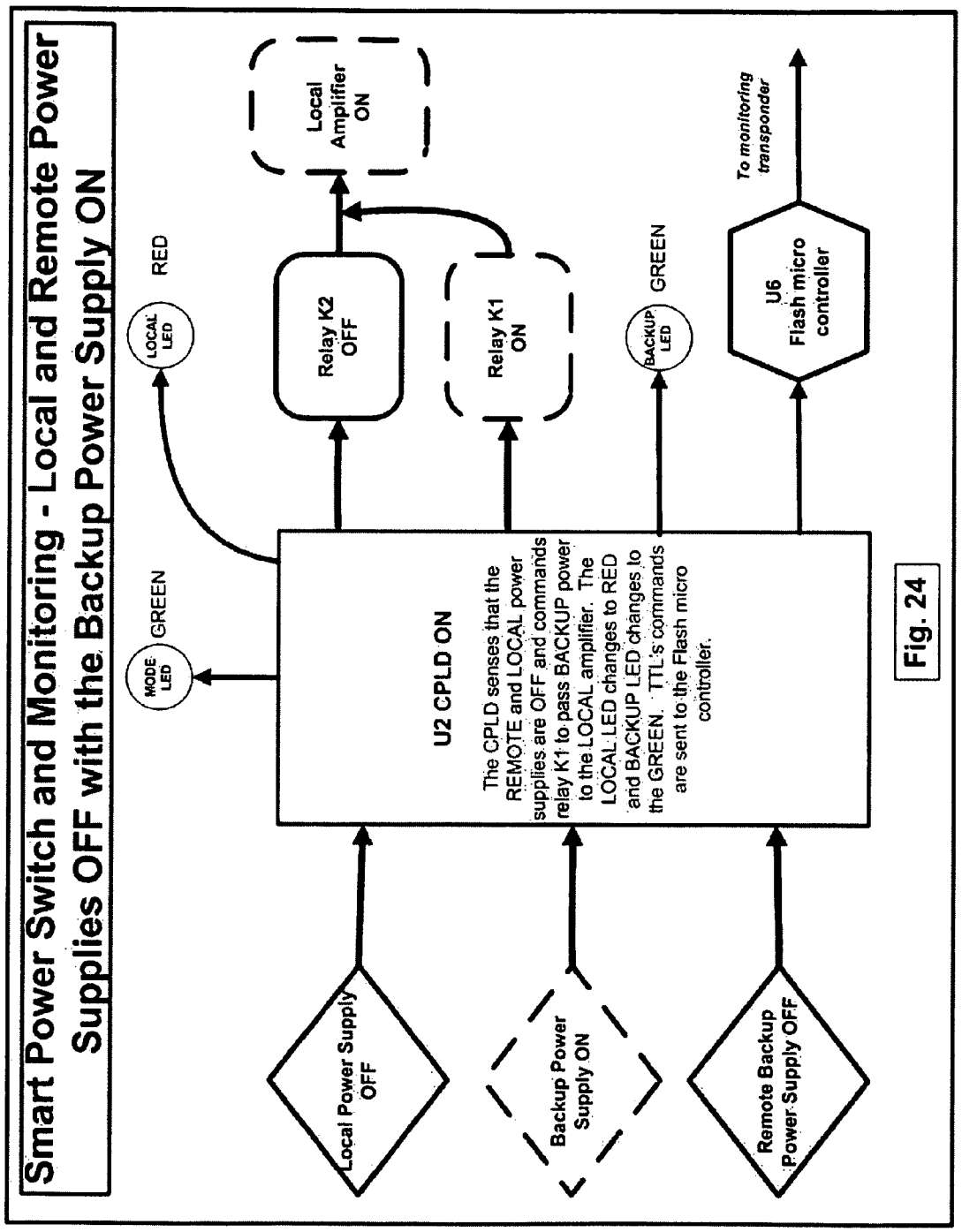

FIG. 24 shows the following inputs to controller U2: local power supply ON, backup power supply ON, and remote backup power supply ON. With these inputs, controller U2 is ON and its outputs include: relay K2 is ON, relay K1 is ON, local LED is green, and backup LED is green. Relay K1 is prepared to switch to remote backup power if necessary. In addition, monitoring commands are sent to monitor circuit U6.

Figure 25:
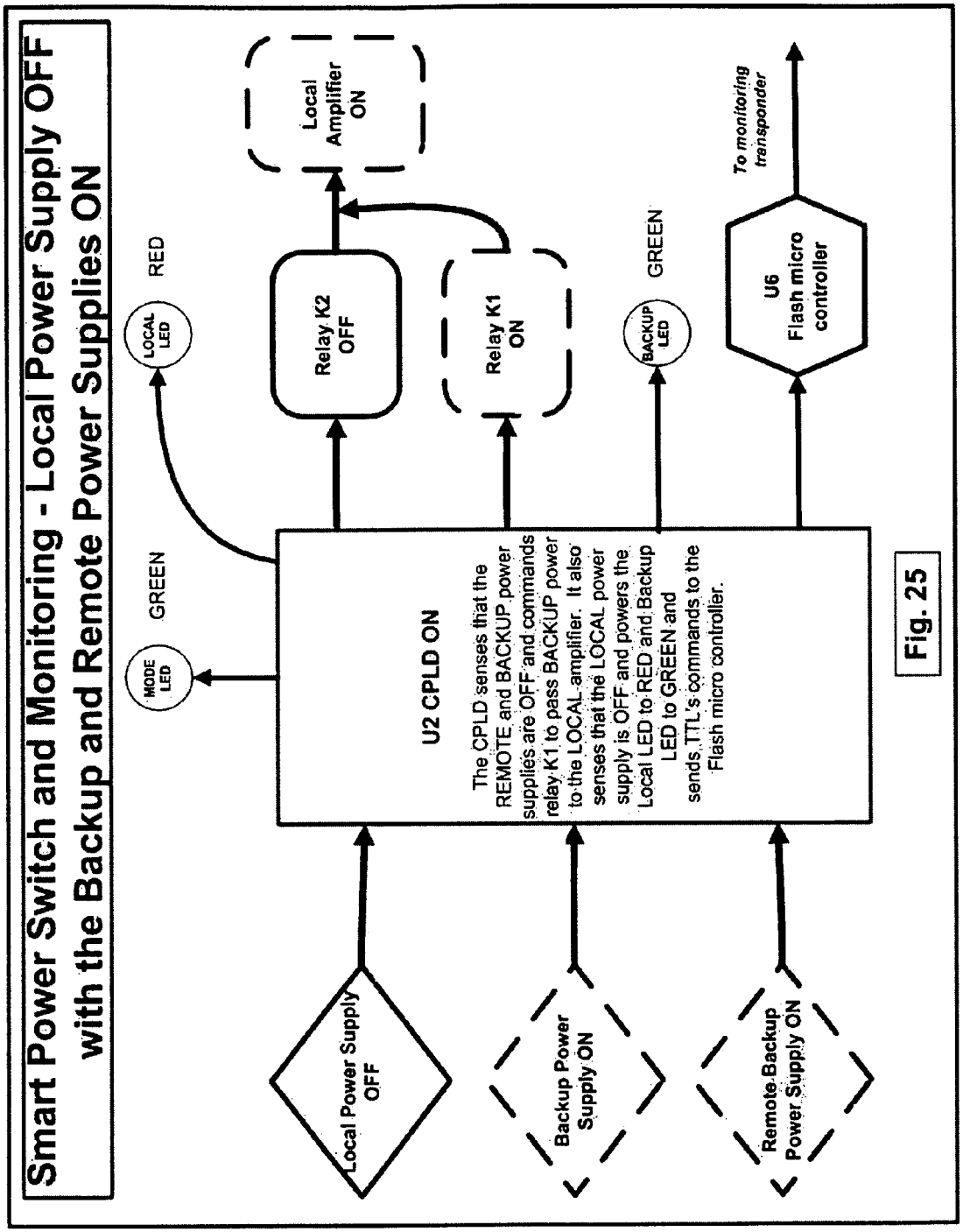

FIG. 25 shows the following inputs to controller U2: local power supply OFF, backup power supply ON, and remote backup power supply OFF. With these inputs, controller U2 is ON and its outputs include: relay K2 is OFF, relay K1 is ON, local LED is red, and backup LED is green. Backup power is provided to the local amplifier. In addition, monitoring commands are sent to monitor circuit U6.

Figure 26:
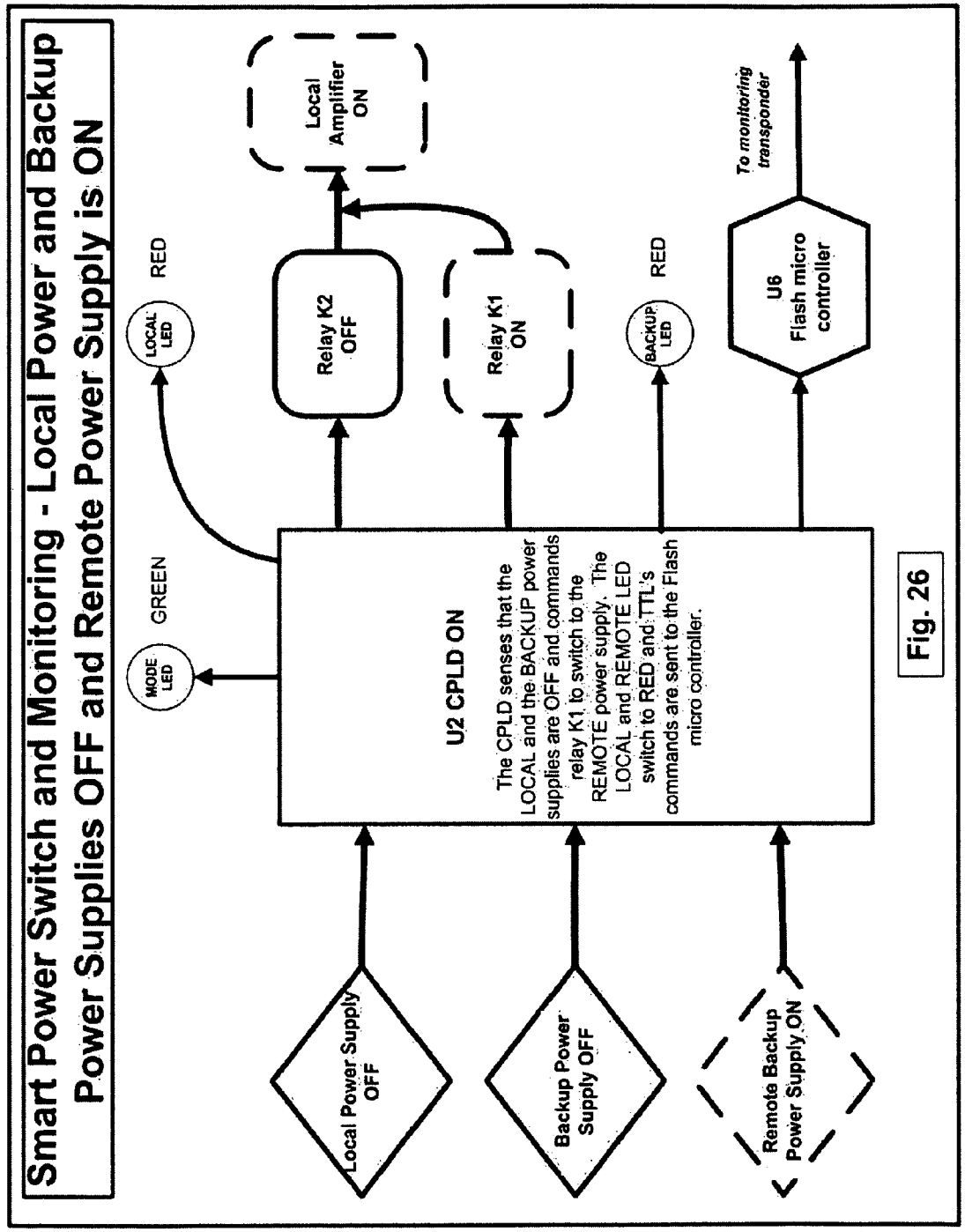

FIG. 26 shows the following inputs to controller U2: local power supply OFF, backup power supply ON, and remote backup power supply ON. With these inputs, controller U2 is ON and its outputs include: relay K2 is OFF, relay K1 is ON, local LED is red, and backup LED is green. Backup power is provided to the local amplifier. In addition, monitoring commands are sent to monitor circuit U6.

Figure 27:
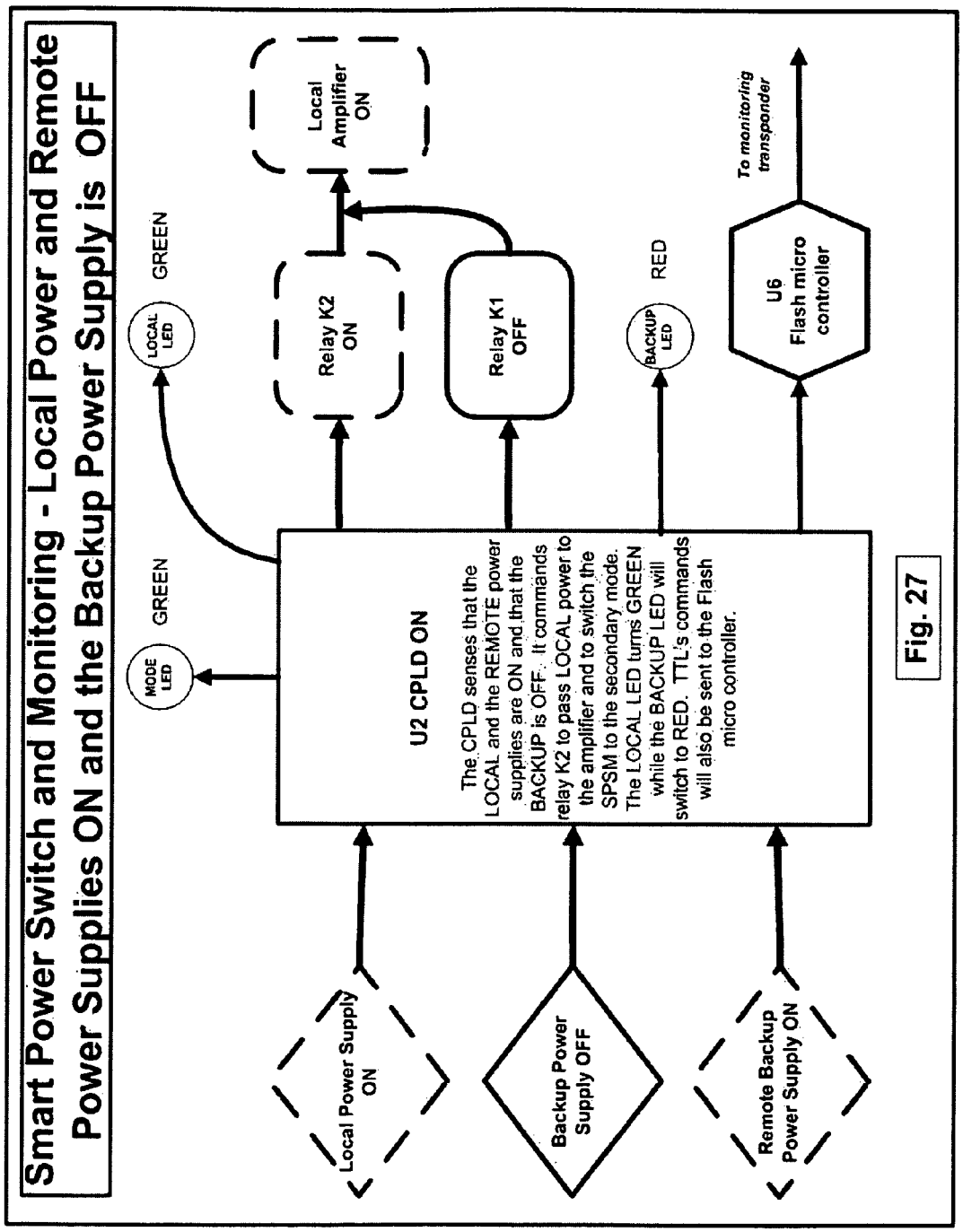

FIG. 27 shows the following inputs to controller U2: local power supply OFF, backup power supply OFF, and remote backup power supply ON. With these inputs, controller U2 is ON and its outputs include: relay K2 is OFF; relay K1 is ON, local LED is red, and backup LED is red. Remote backup power is provided to the local amplifier. In addition, monitoring commands are sent to monitor circuit U6.

Figure 28:
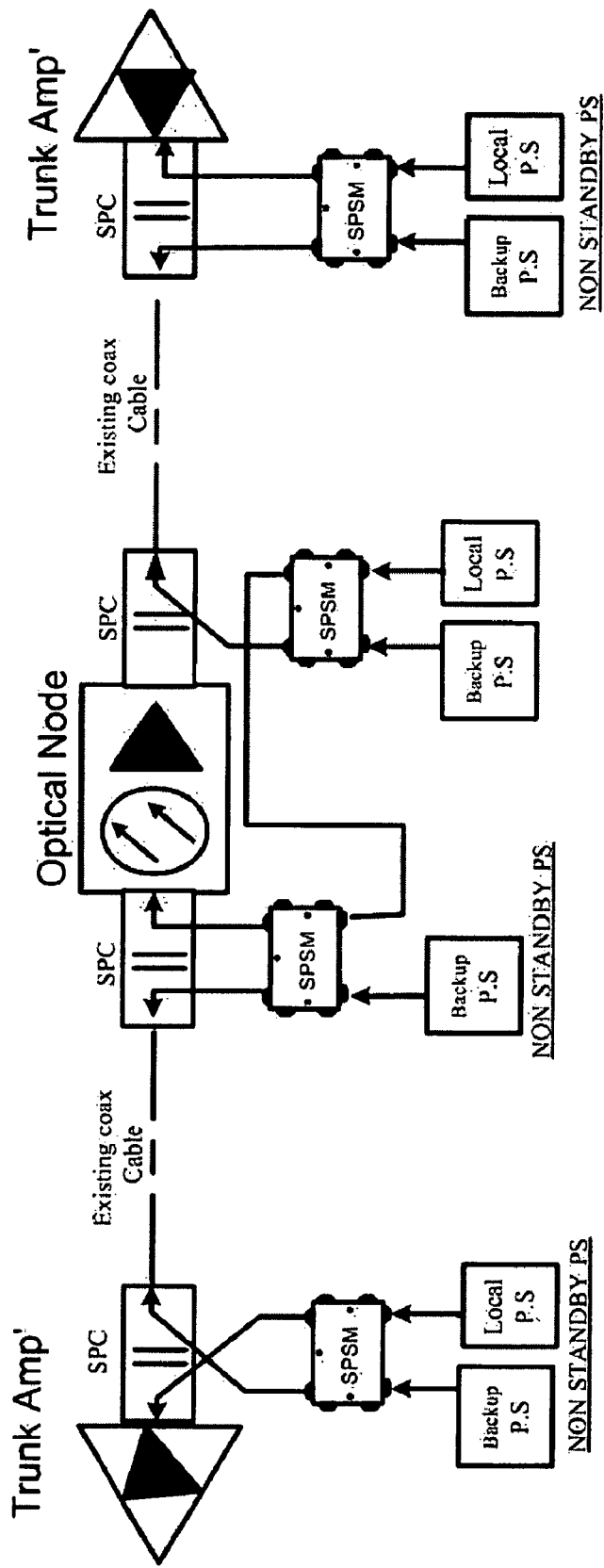

FIG. 28 shows the following inputs to controller U2: local power supply ON, backup power supply OFF, and remote backup power supply ON. With these inputs, controller U2 is ON and its outputs include: relay K2 is ON, relay K1 is OFF local LED is green, and backup LED is red. Local power is provided to the local amplifier. In addition, monitoring commands are sent to monitor circuit U6.

Figure 29:
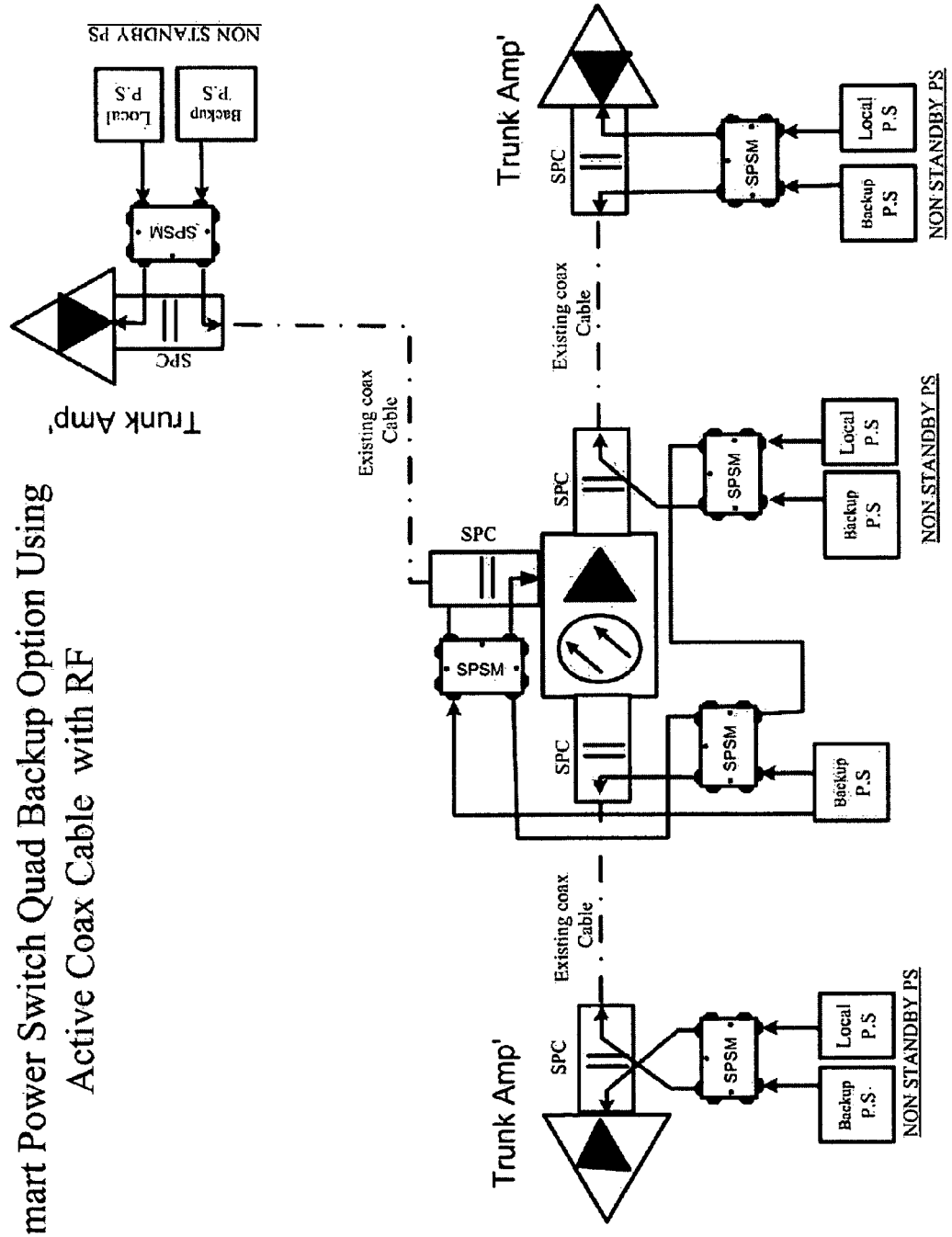
FIG. 29 illustrates an example network configuration in which a triple backup option is provided in an HFC network.
Figure 30:
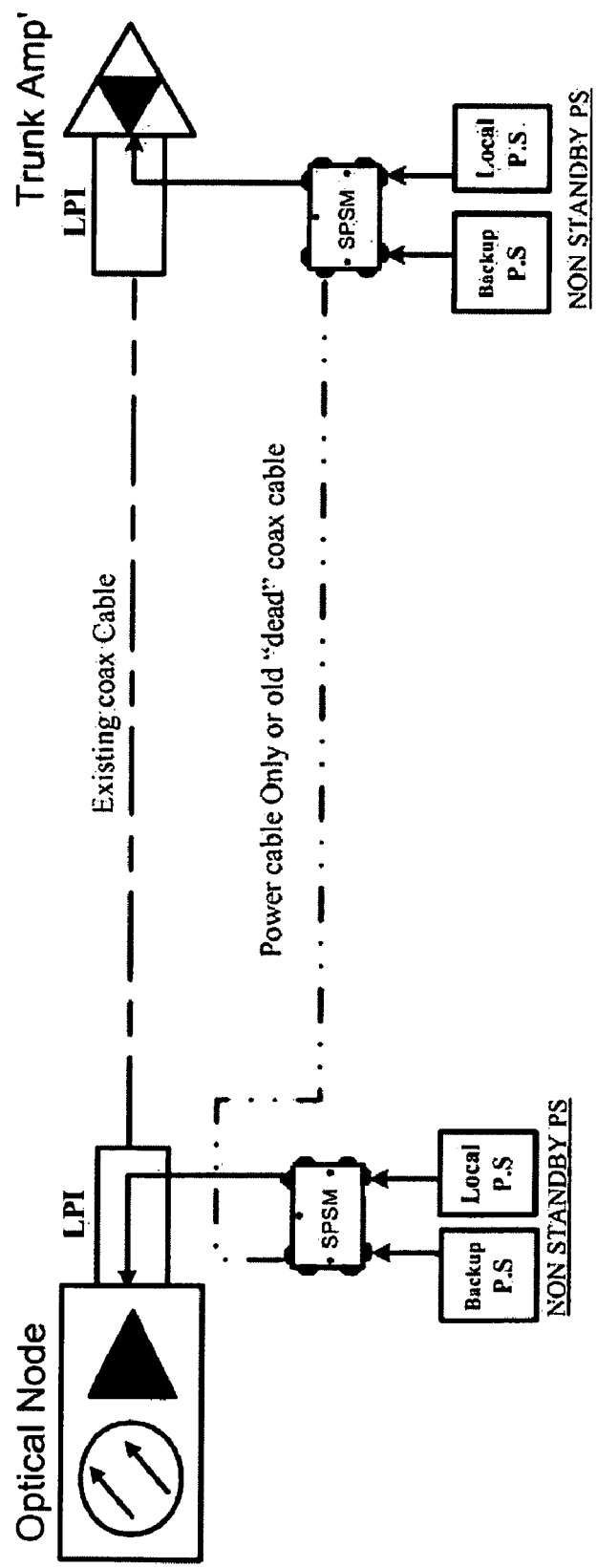
FIG. 30 illustrates an example network configuration in which a quad backup option is provided in an HFC network.
Figure 31:
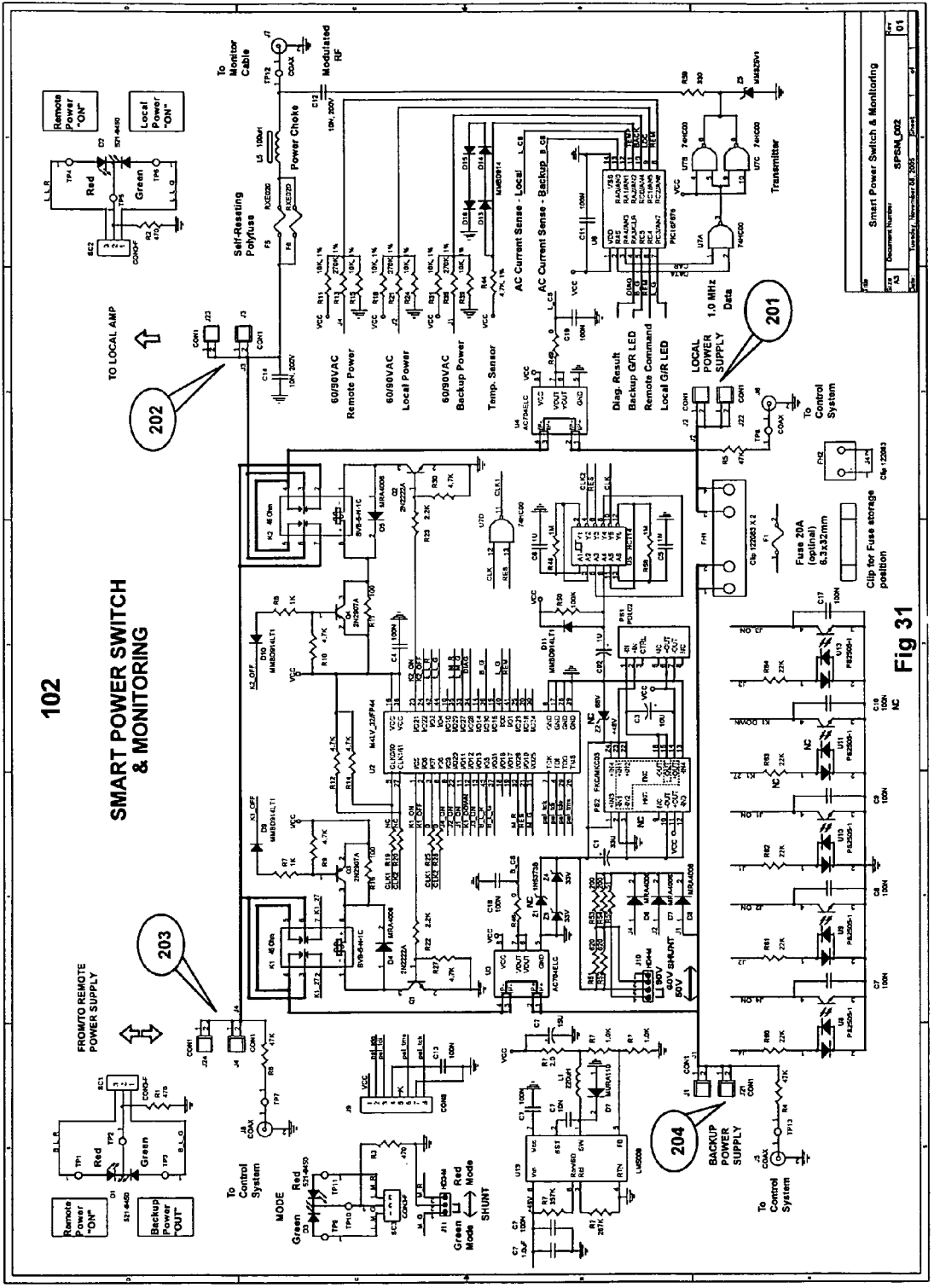
FIG. 31 illustrates an example network configuration in which a power-only cable is used to provide remote backup power to an SPSM.

The SPSM of the invention is described above with reference to FIGS. 1-18 in the environment of an example network in which two SPSMs are used to provide two-way backup power to each of the amplifiers in the network. This is a dual backup system. The SPSM of the invention may be used in a variety of other network configurations and, for example, may be used to achieve three and four-way backup. For example, FIG. 29 illustrates an example network configuration in which a triple backup option is provided in an HFC network. FIG. 30 illustrates an example network configuration in which a quad backup option is provided in an HFC network. FIG. 31 illustrates an example network configuration in which a power-only cable is used to provide remote backup power to an SPSM. That is, instead of the signal-carrying "main" cable being used to transmit power between SPSMs, a dedicated power cable is used. The dedicated power cable may be an existing, unused cable or may be a cable put in place especially to carry power.

Figure 32:
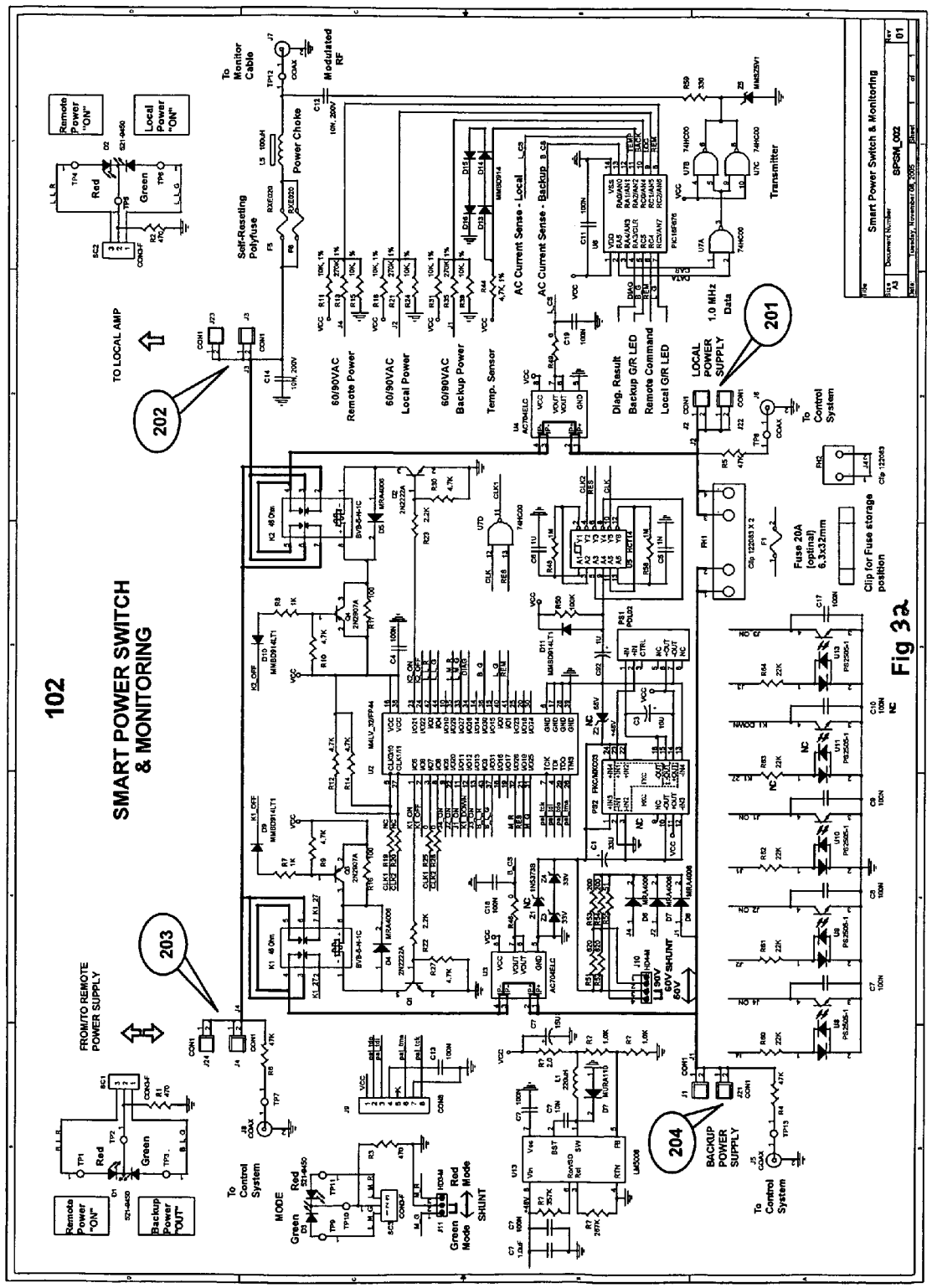
FIG. 32 is a detailed schematic diagram of an example embodiment of an SPSM including temperature sensing.

FIG. 32 is a detailed schematic diagram of an alternate embodiment of SPSM 102. In this embodiment, humidity sensor HS1 has been replaced with resistor R33 and diodes D13-D16, which form a temperature sensing circuit. The temperature sensing circuit feeds the same input of monitor circuit U6 that is fed by humidity sensor HS1 in the embodiment of FIG. 20. In yet another embodiment (not shown), both temperature and humidity sensing functionality may be implemented in SPSM 102.

Figure 33:
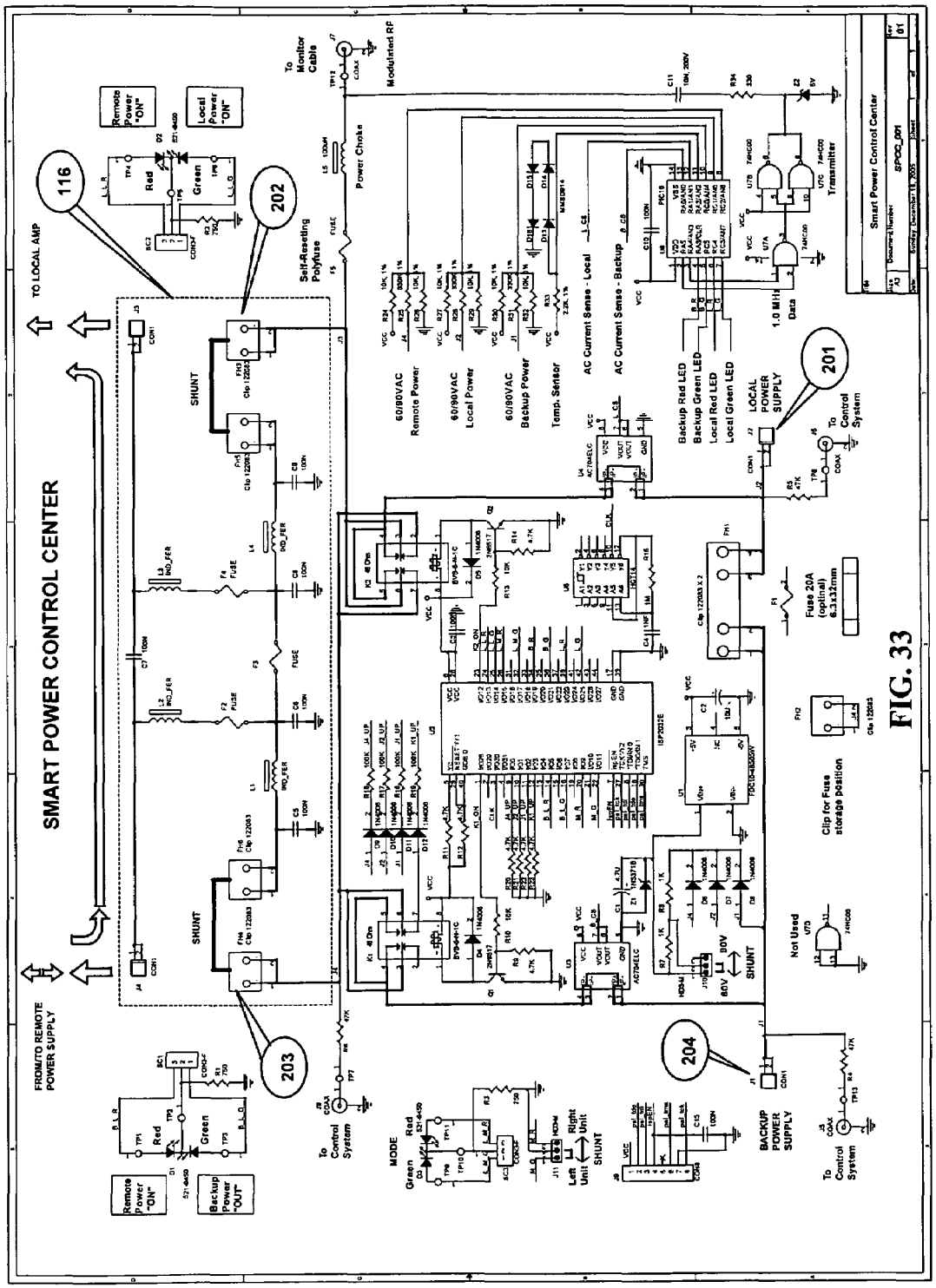
FIG. 33 is a detailed schematic diagram of an example embodiment of an SPSM including a built-in power combiner/inserter.
Figure 2:
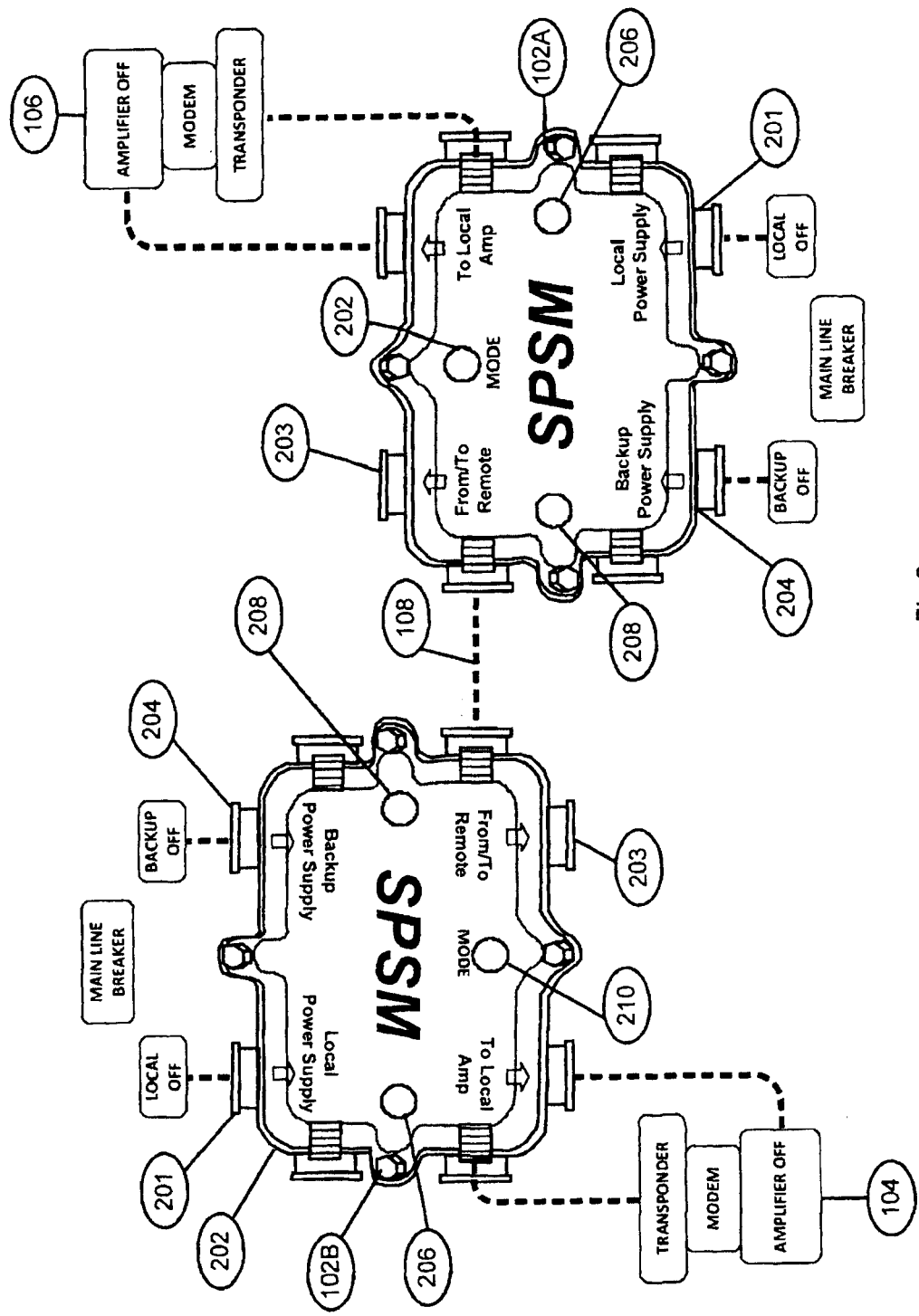
Figure 3:
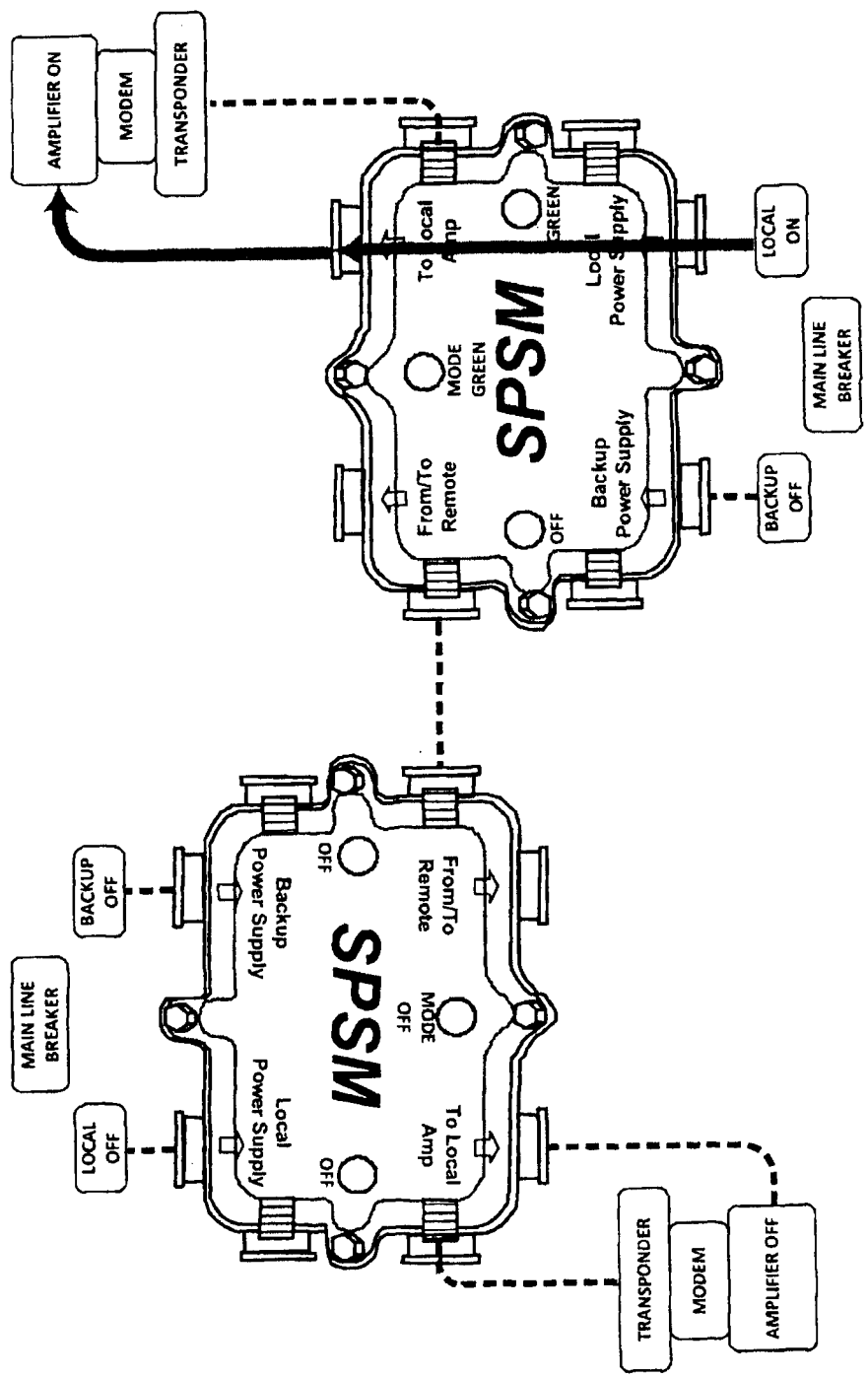
Figure 4:
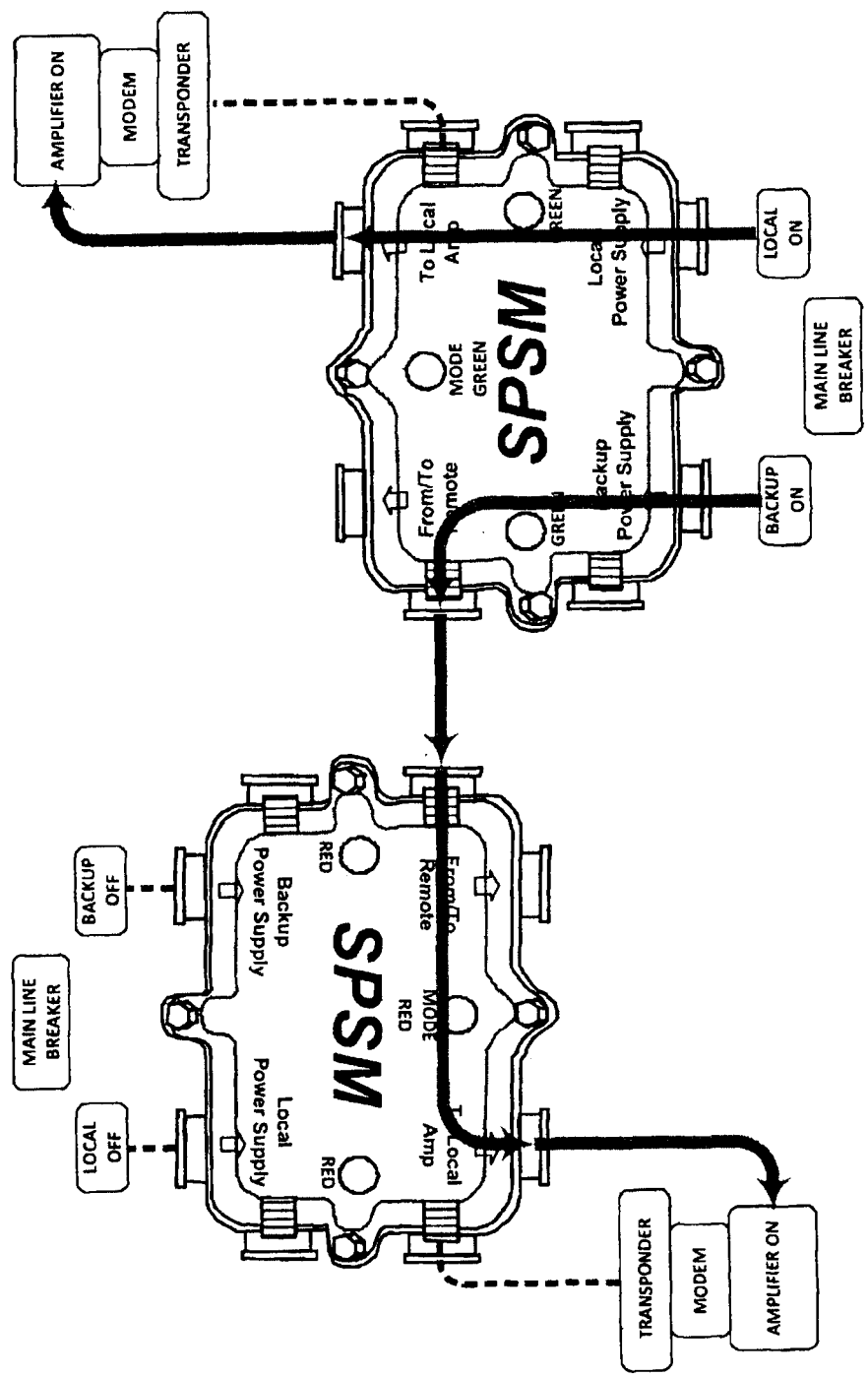
Figure 5:
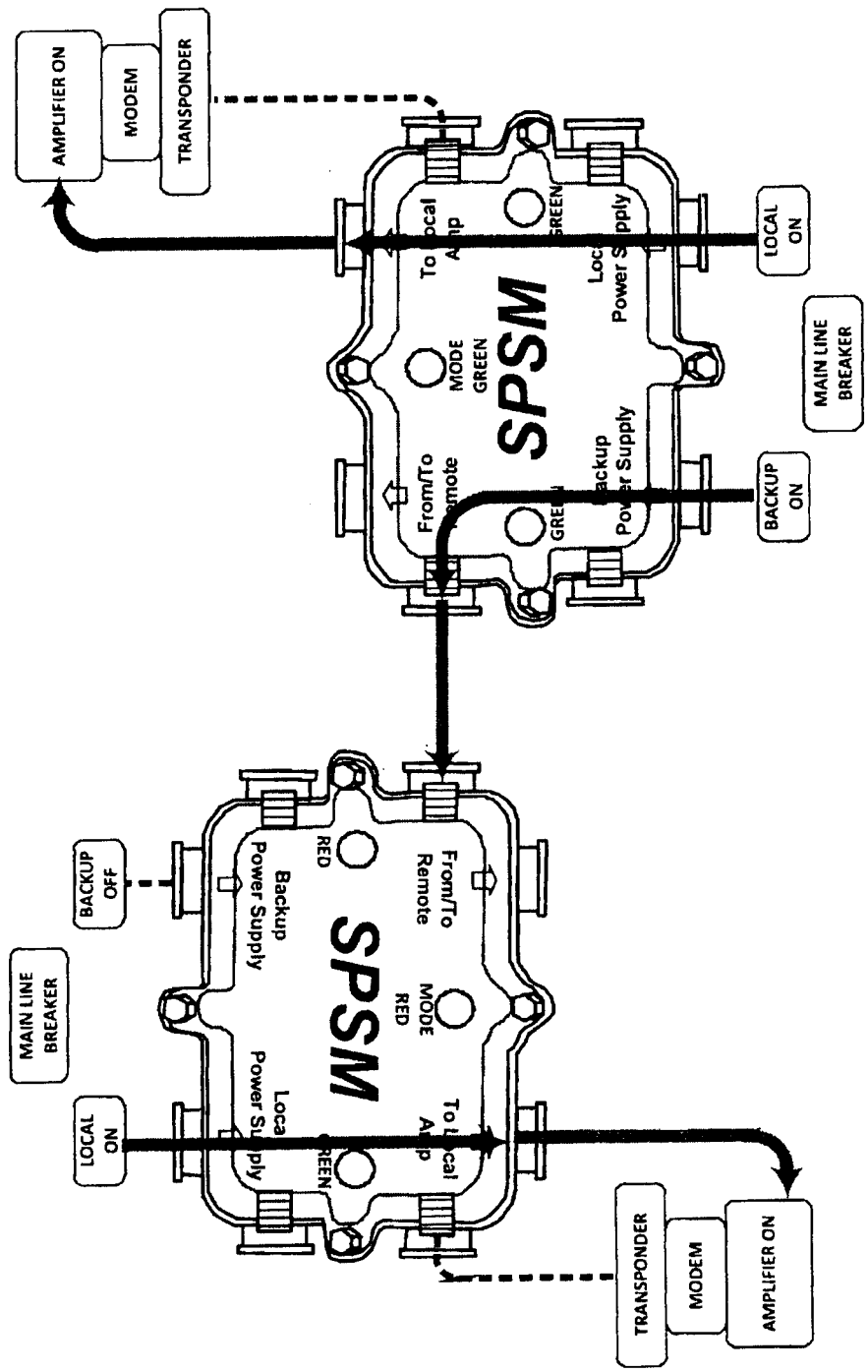
Figure 6:
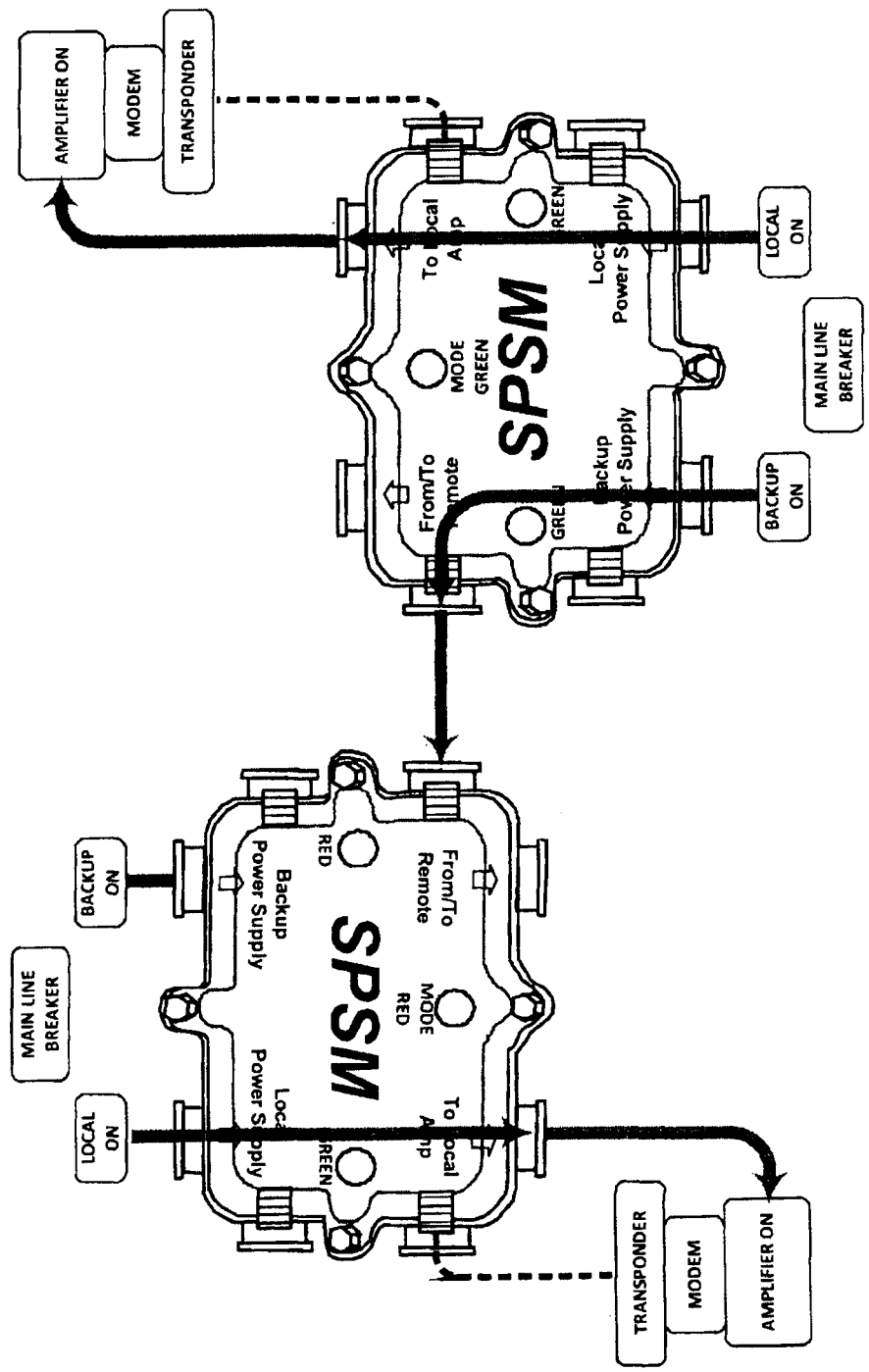
Figure 7:
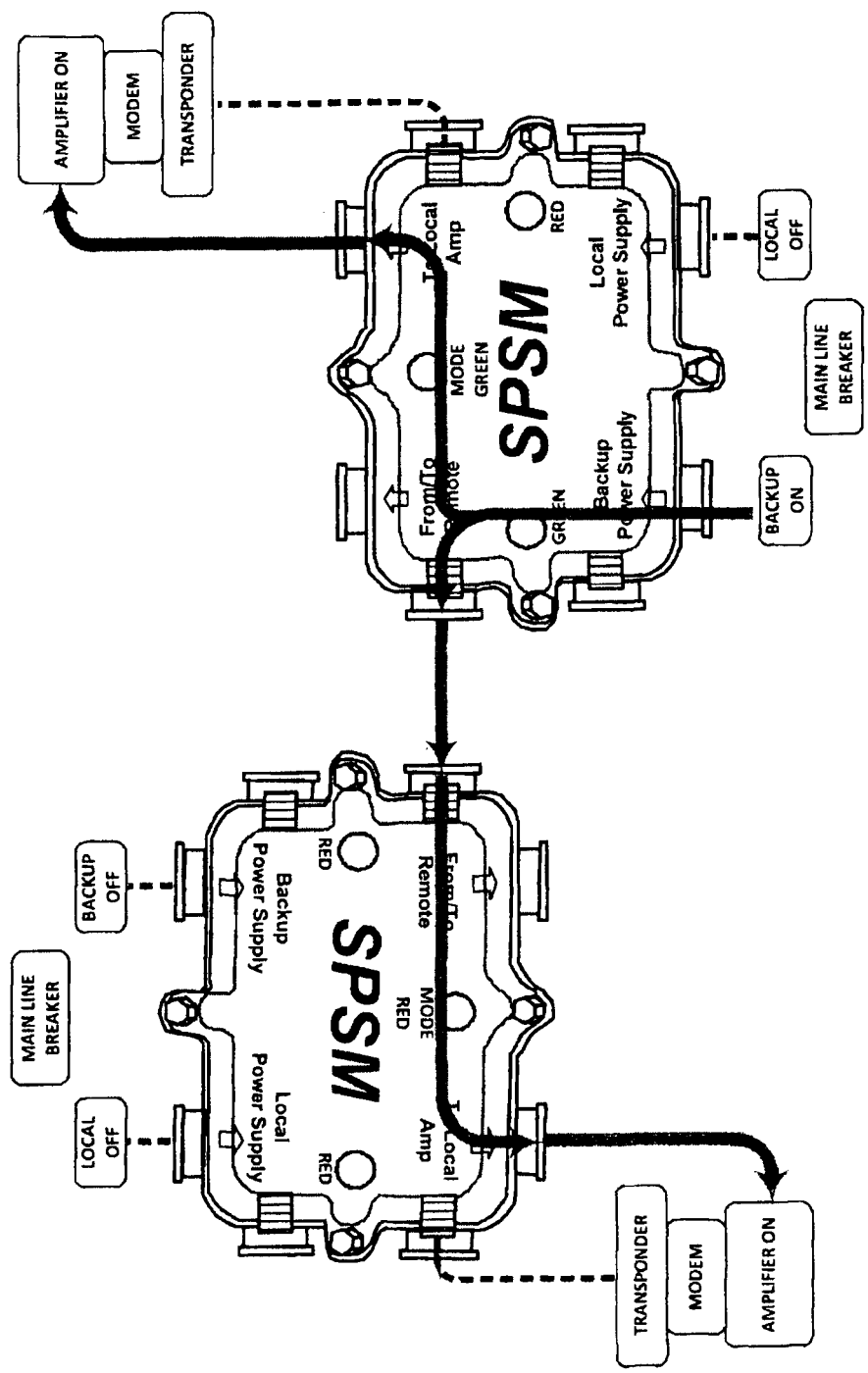
Figure 8:
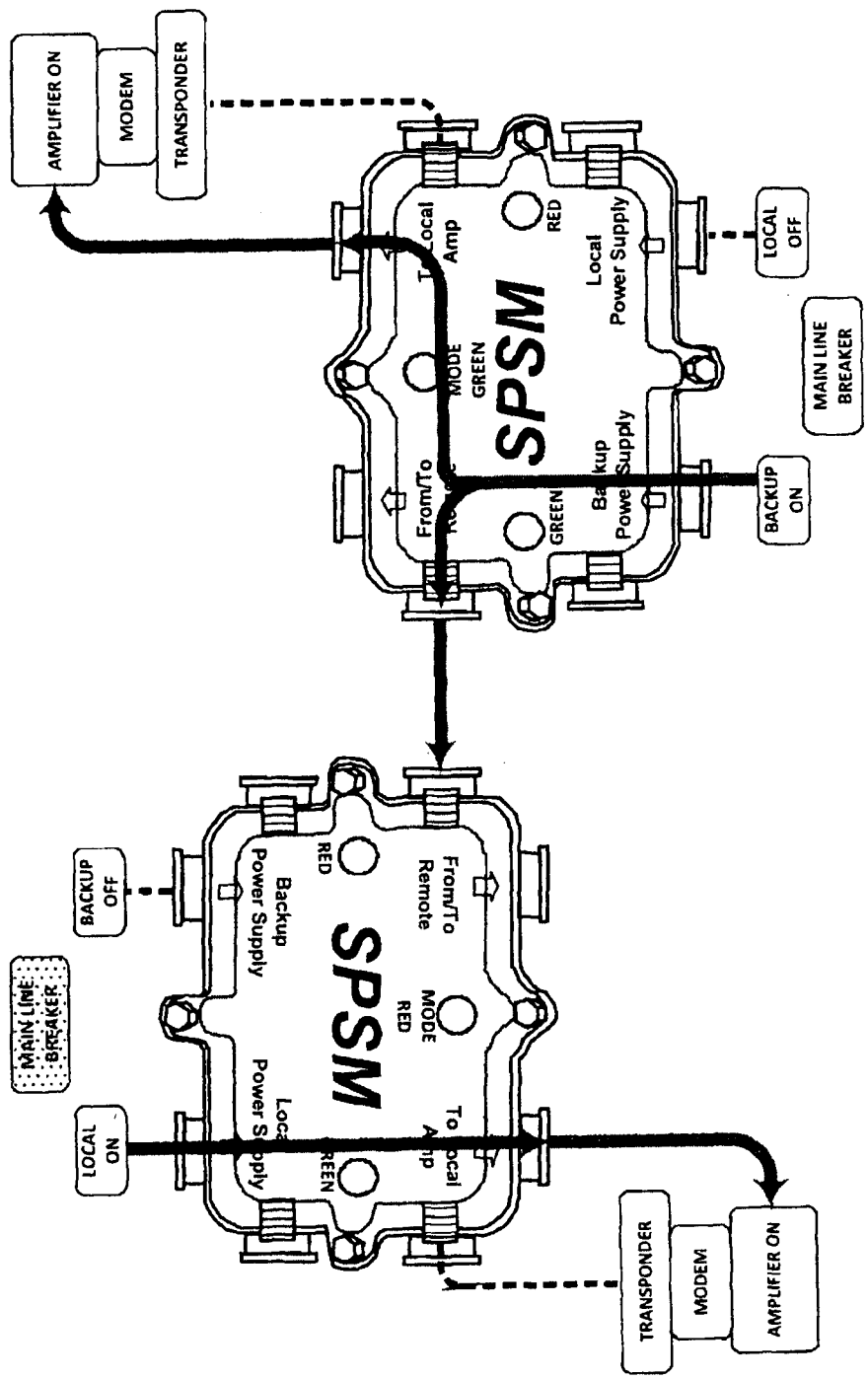
Figure 9:
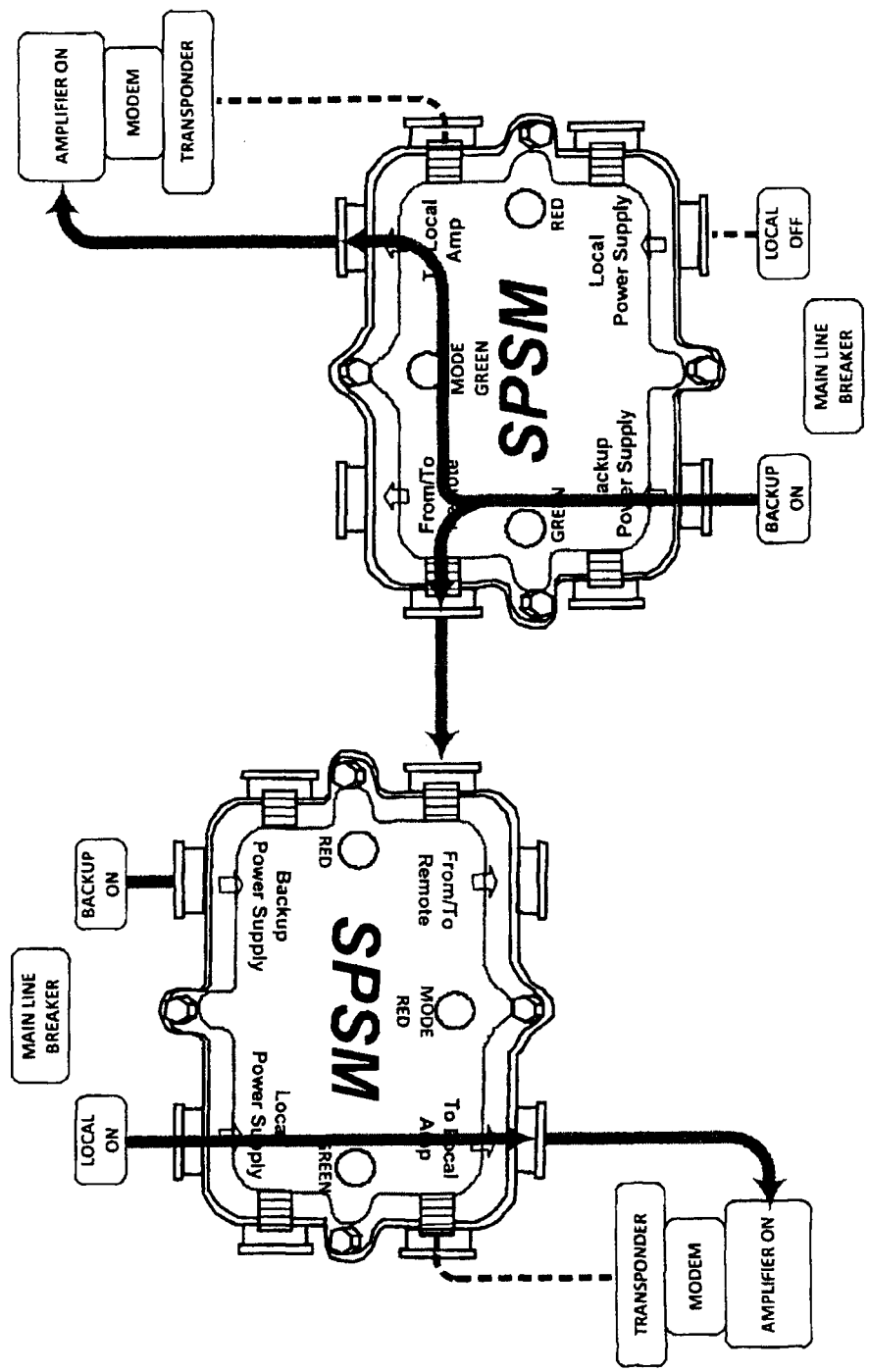
Figure 10:
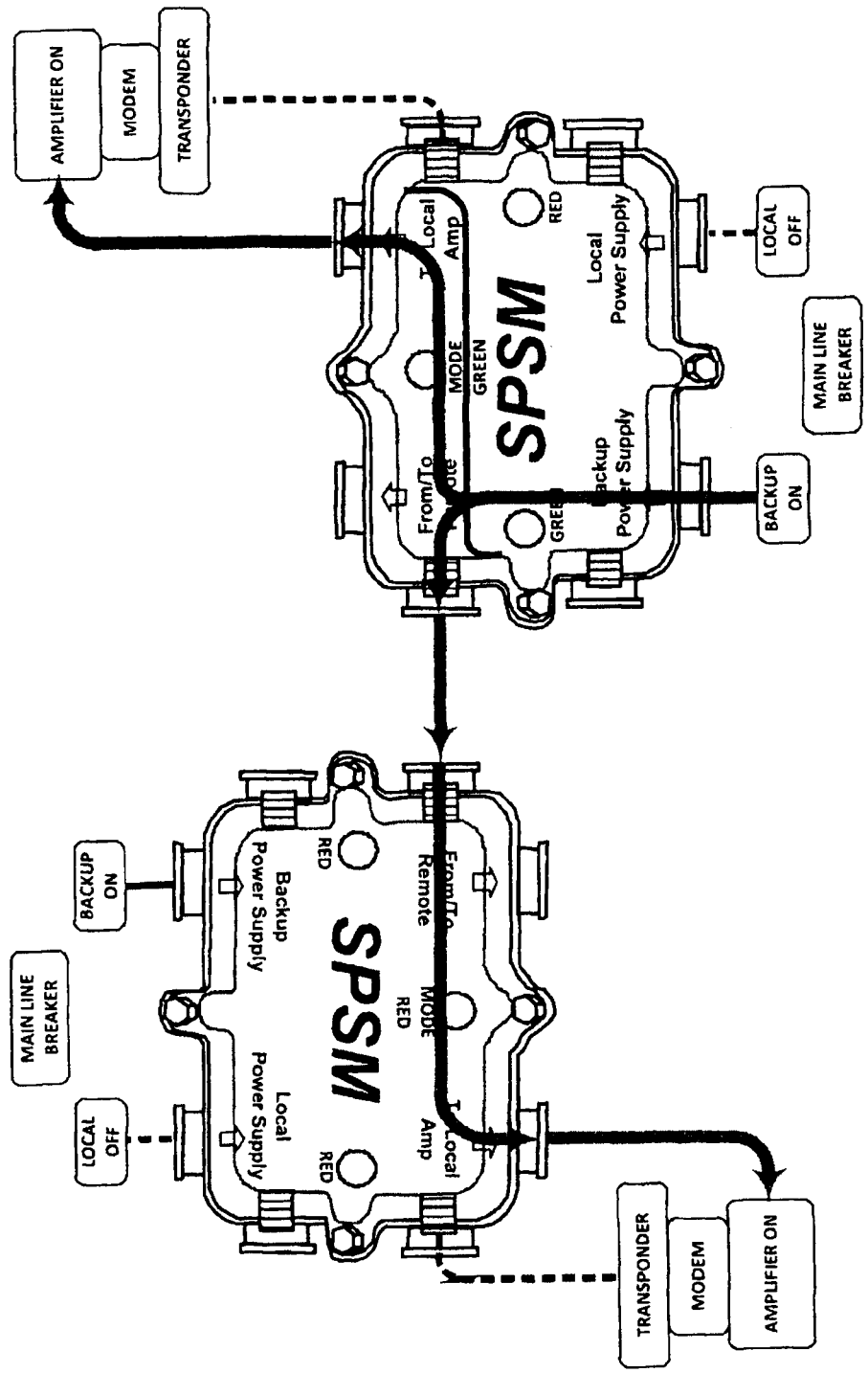
Figure 11:
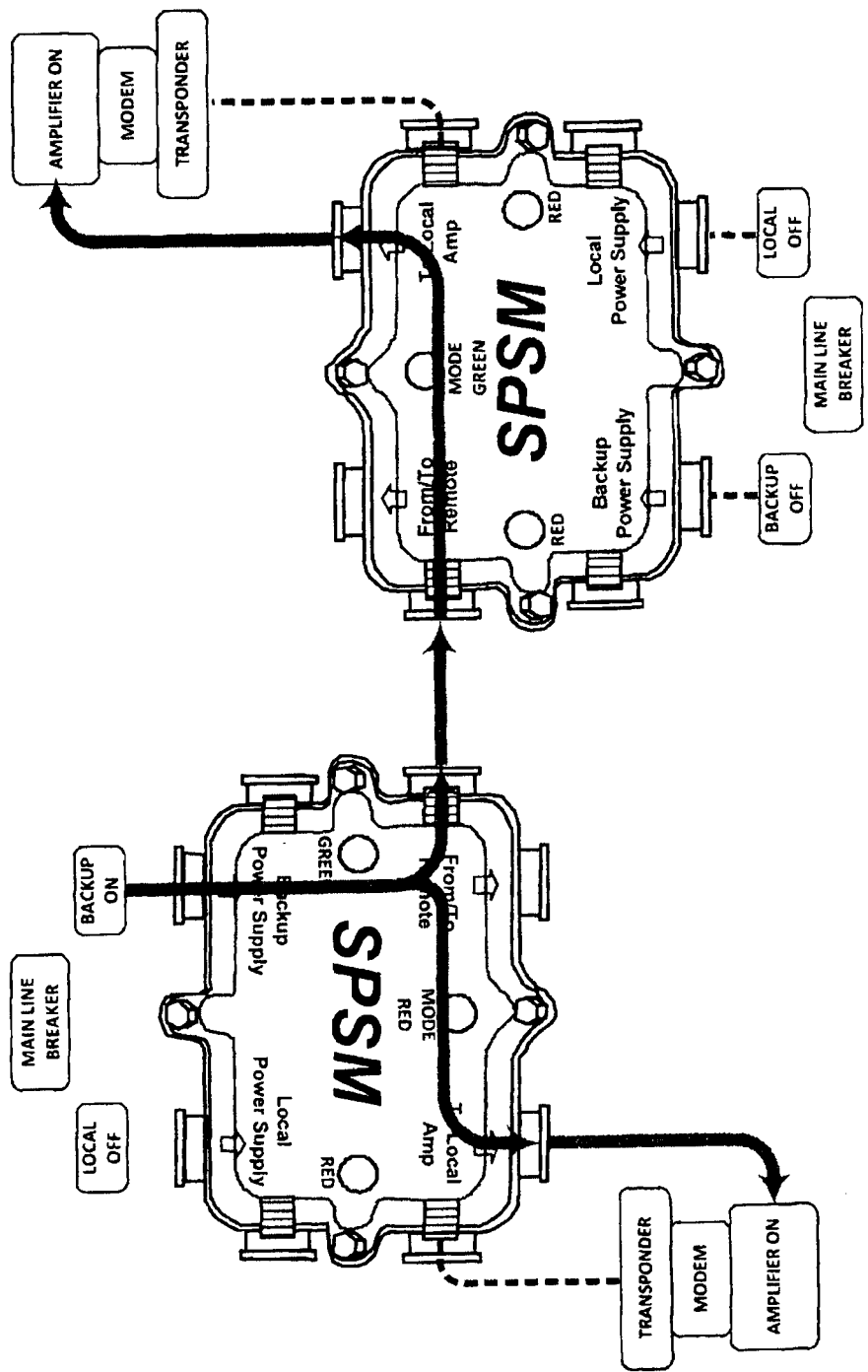
Figure 12:
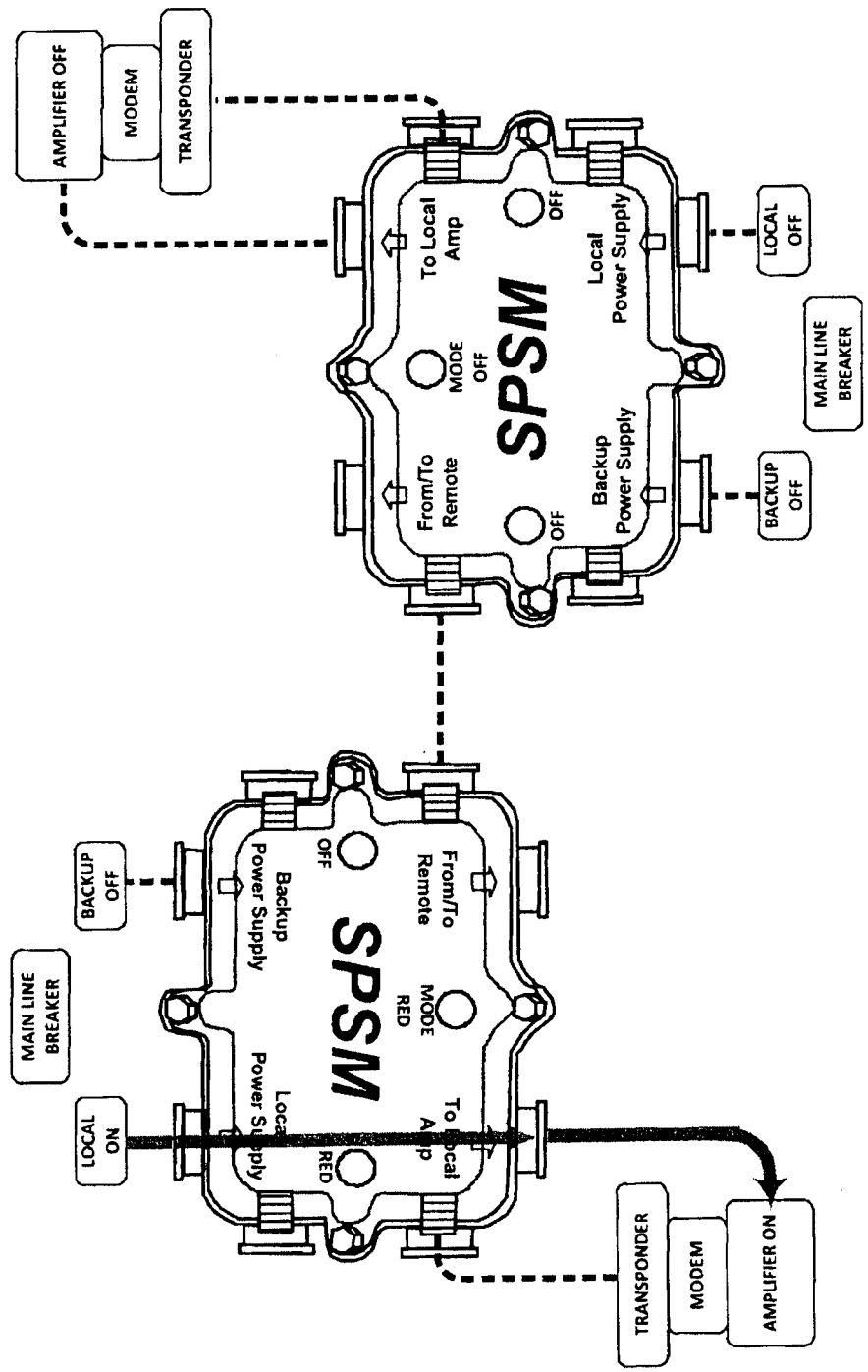
Figure 13:
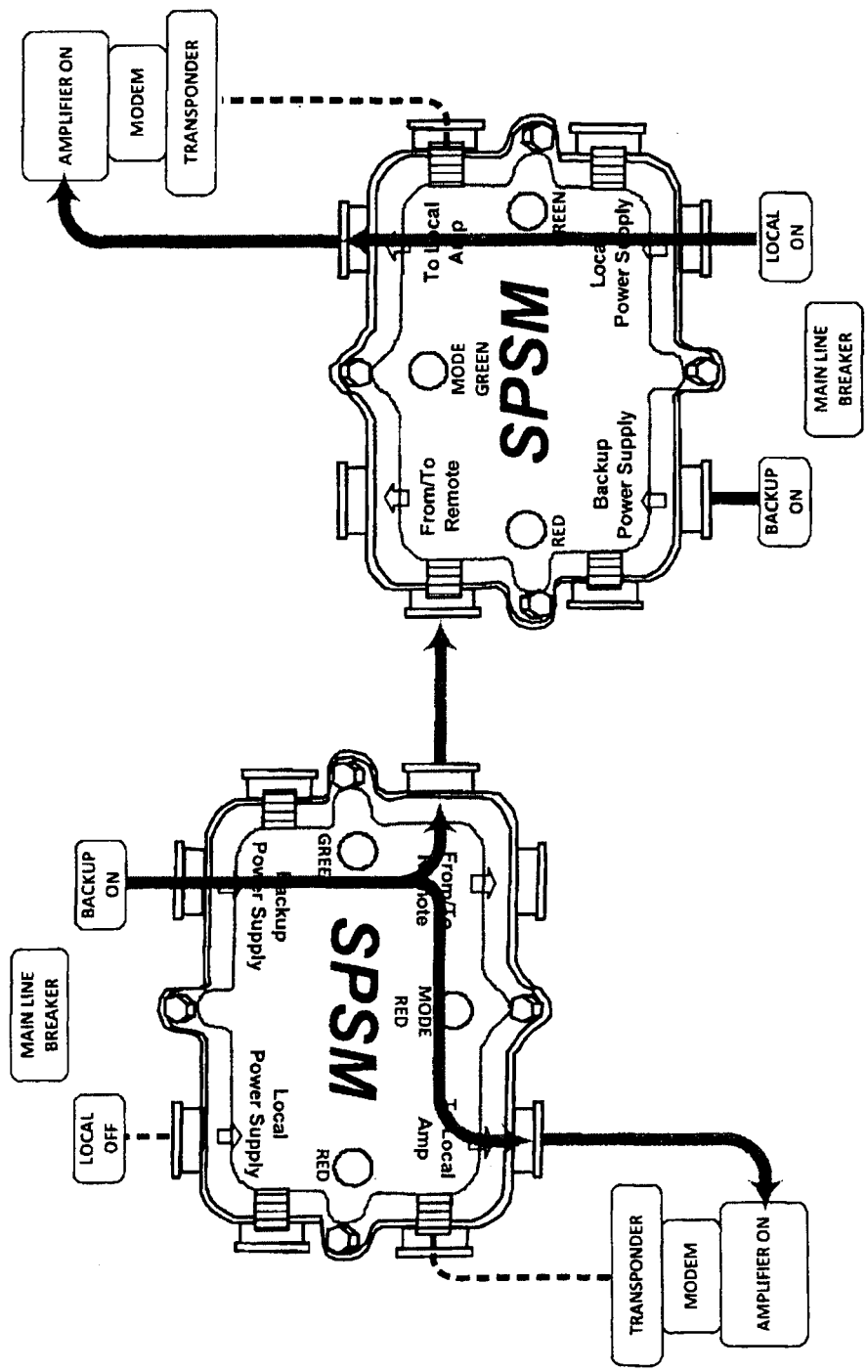
Figure 14:
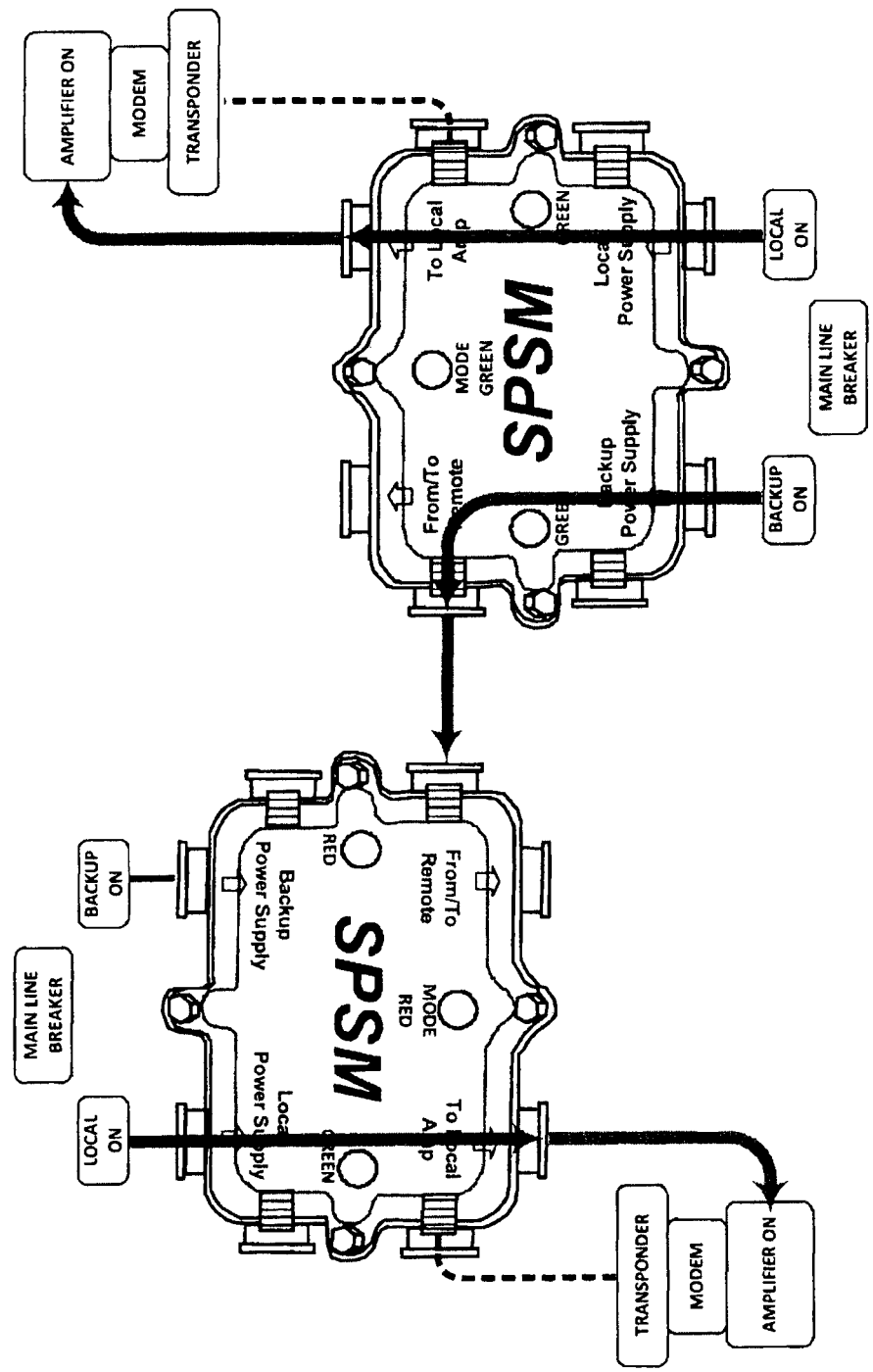
Figure 15:
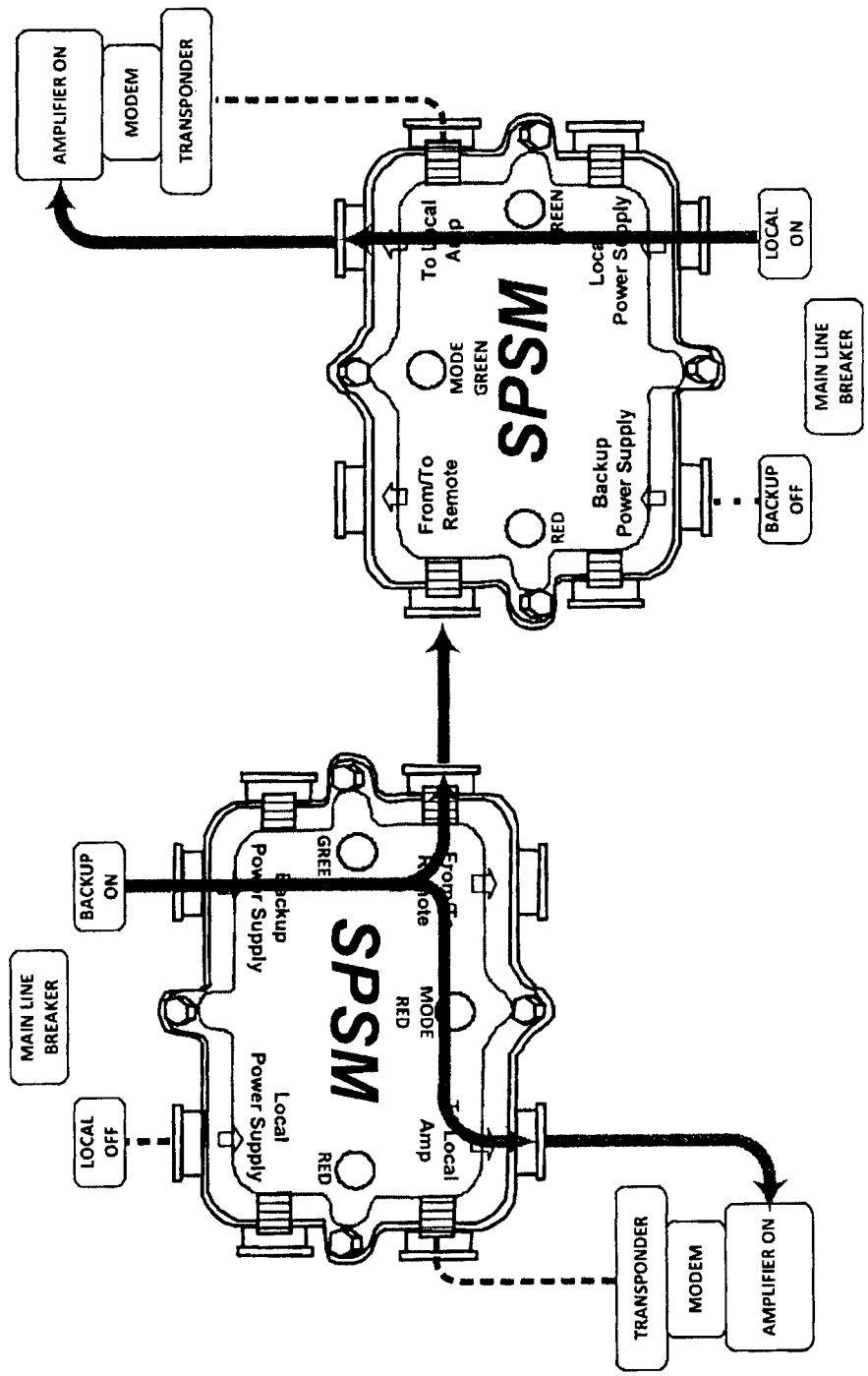
Figure 16:
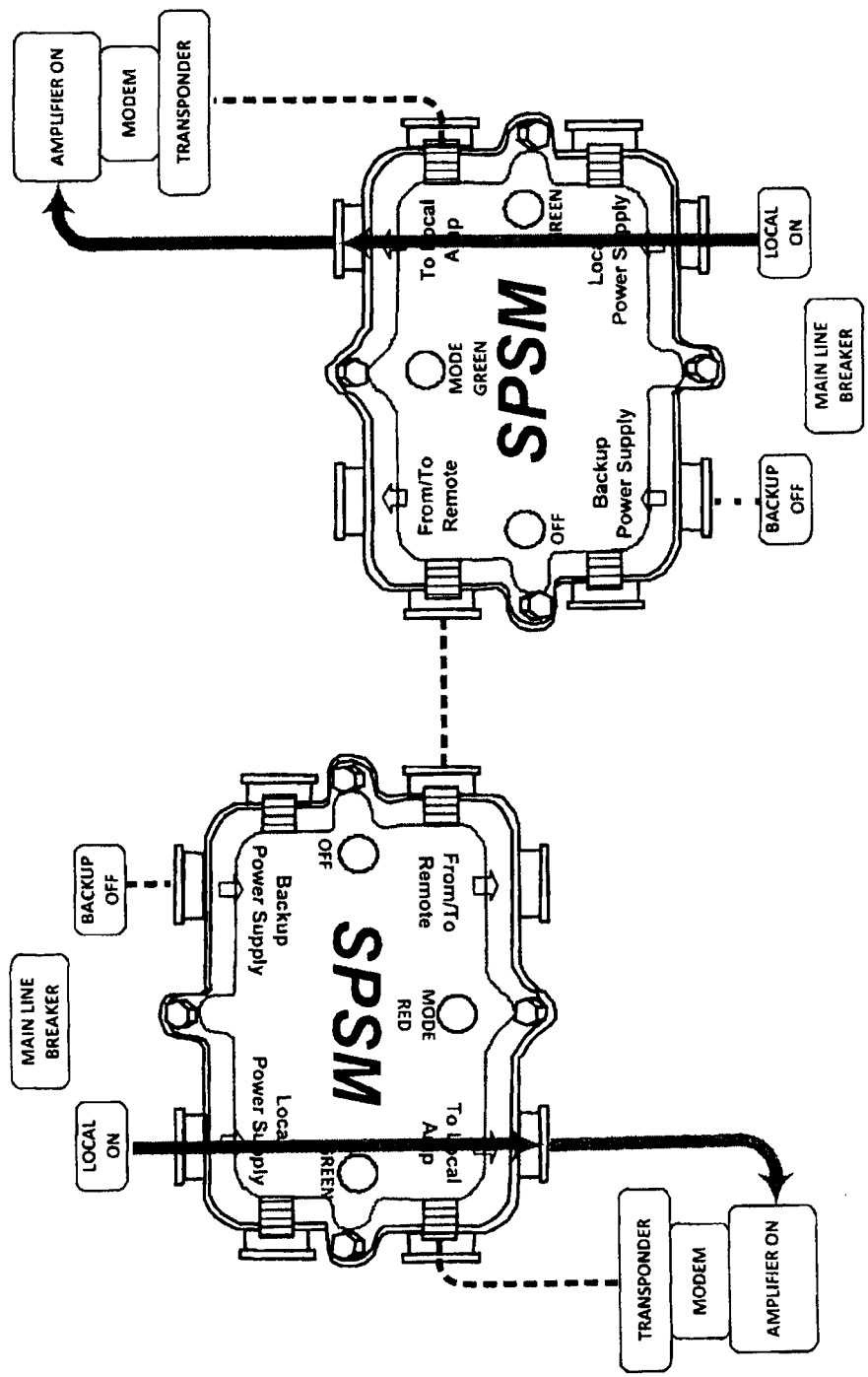
Figure 17:
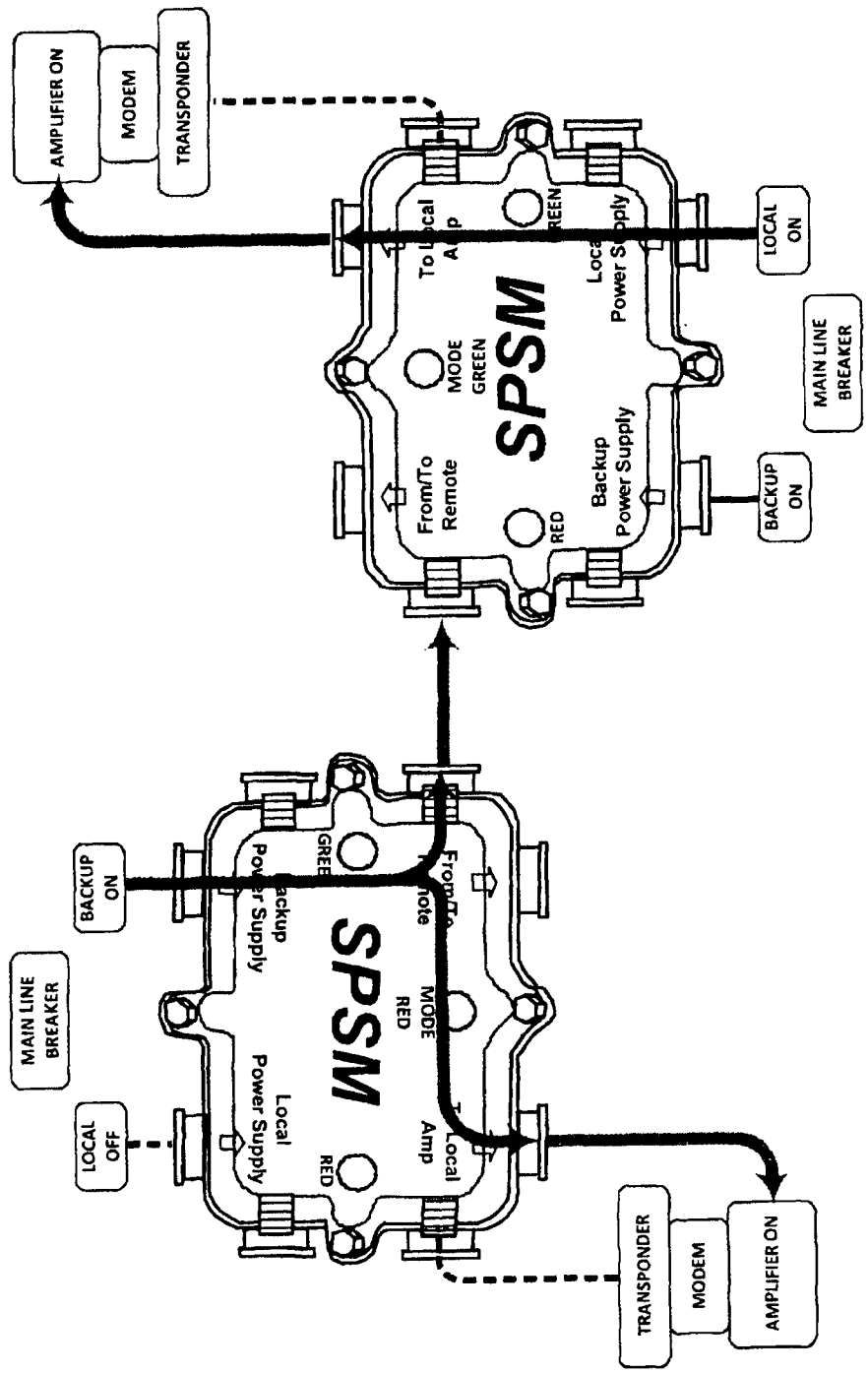
Figure 18:
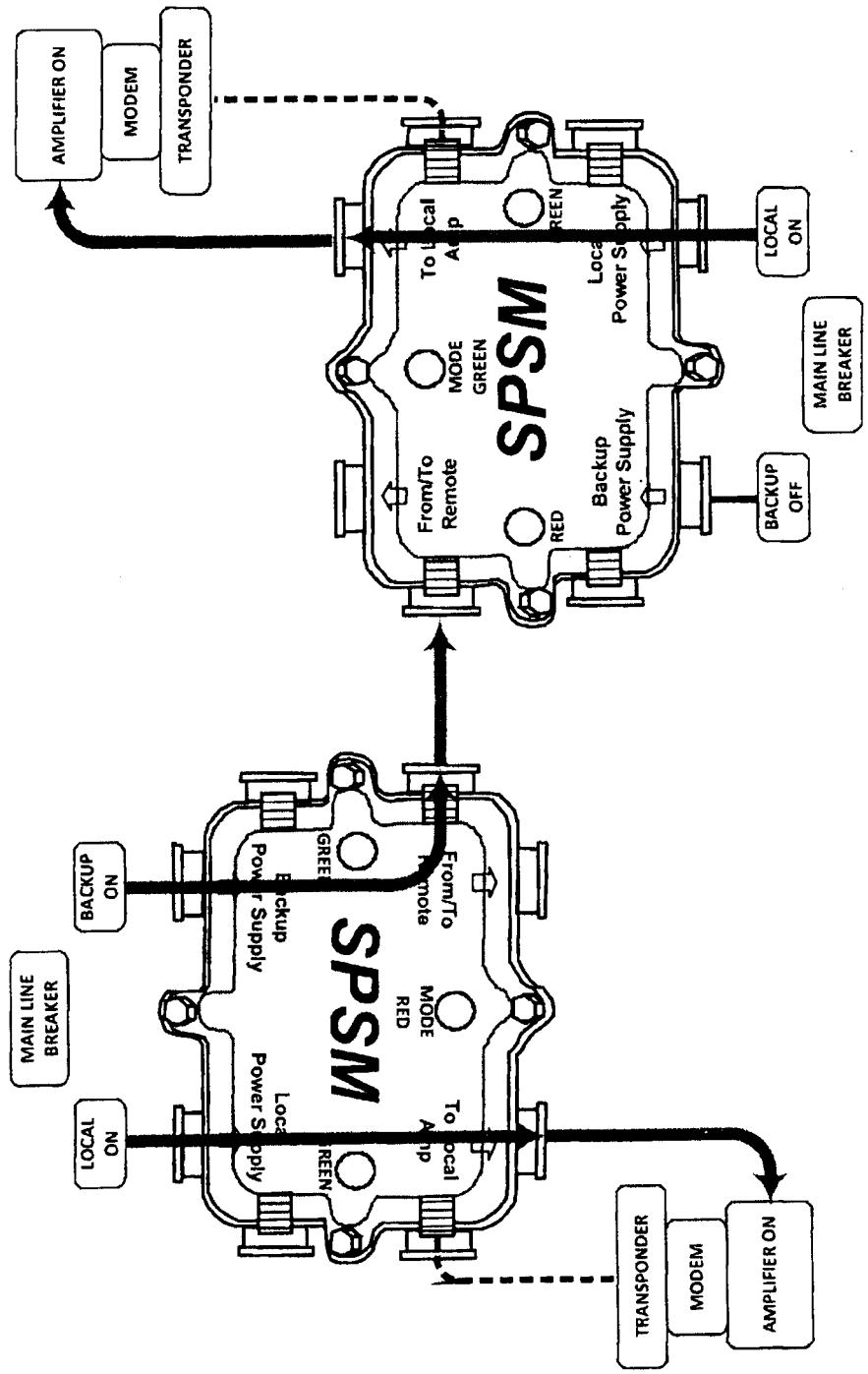
Figure 29:
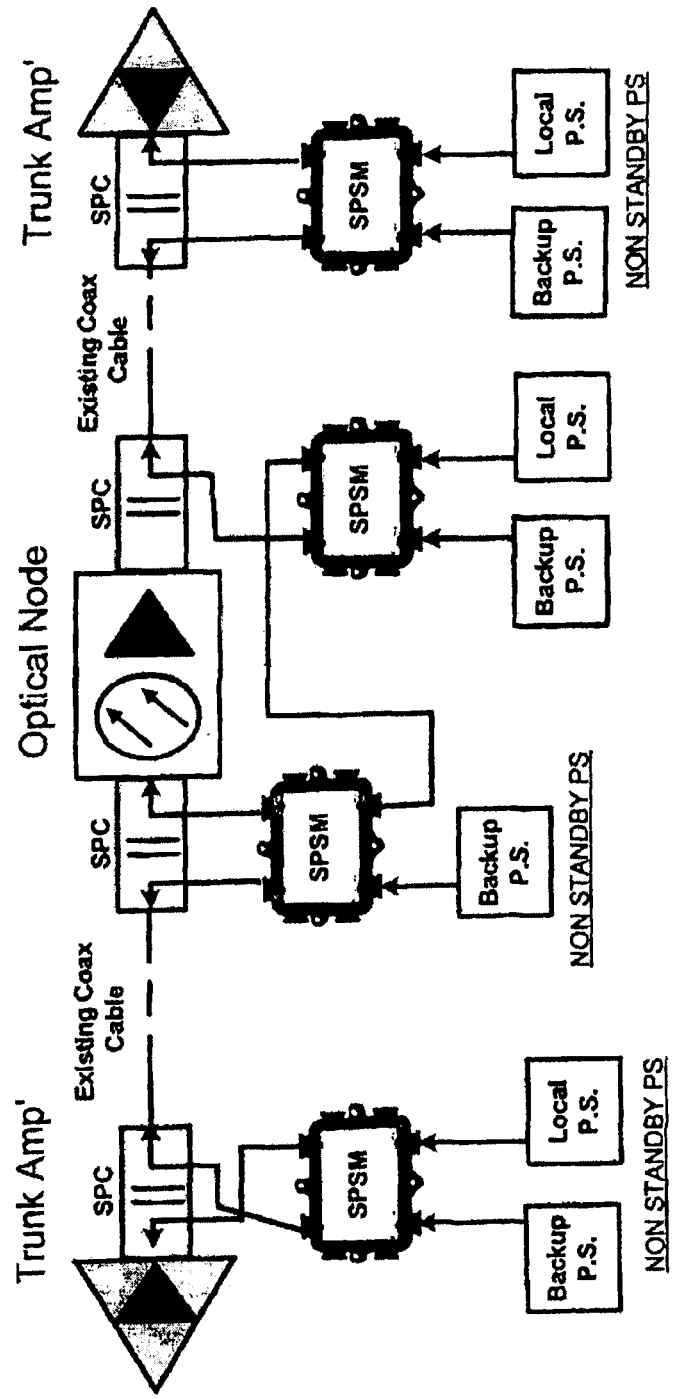
Figure 30:
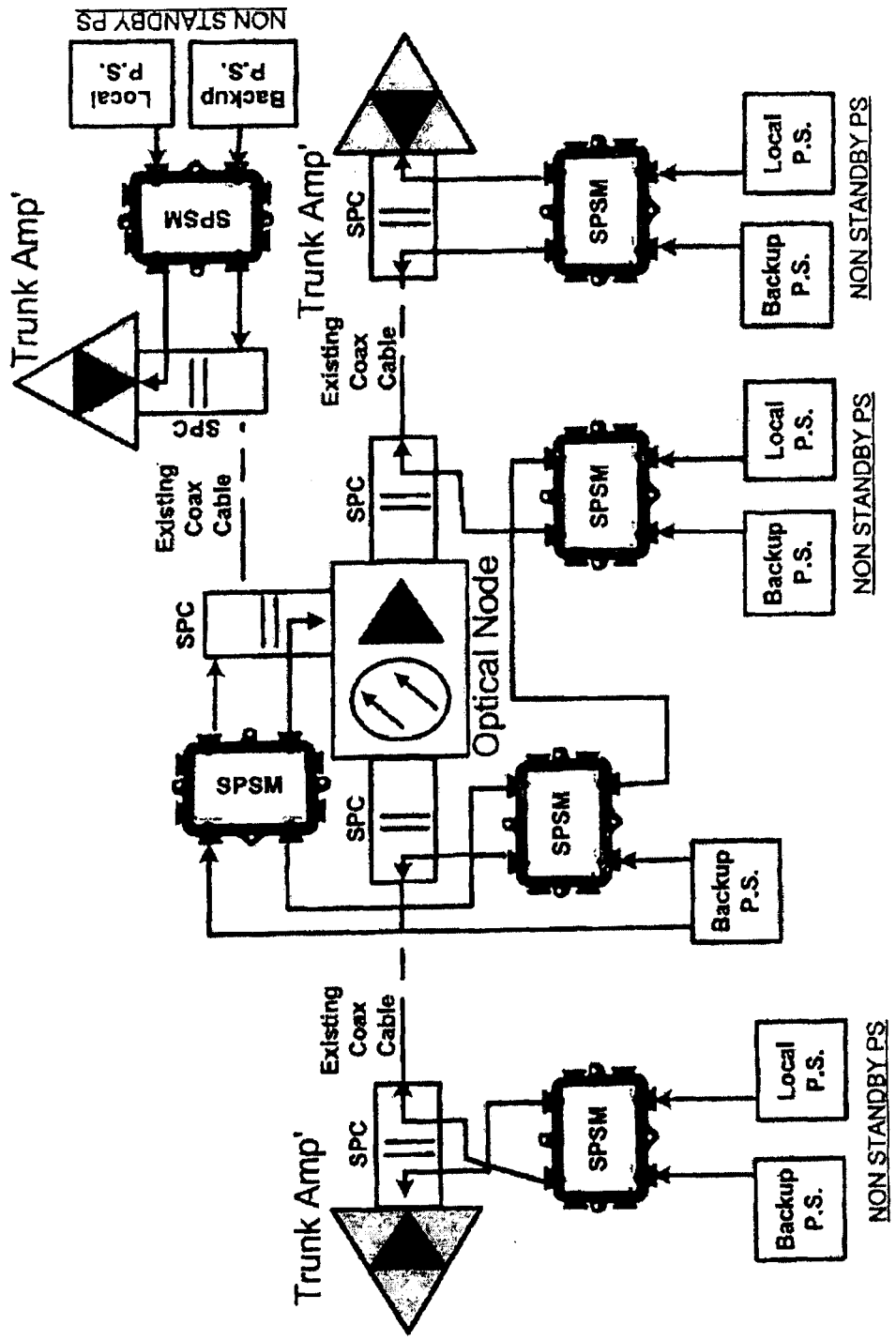
Figure 31:
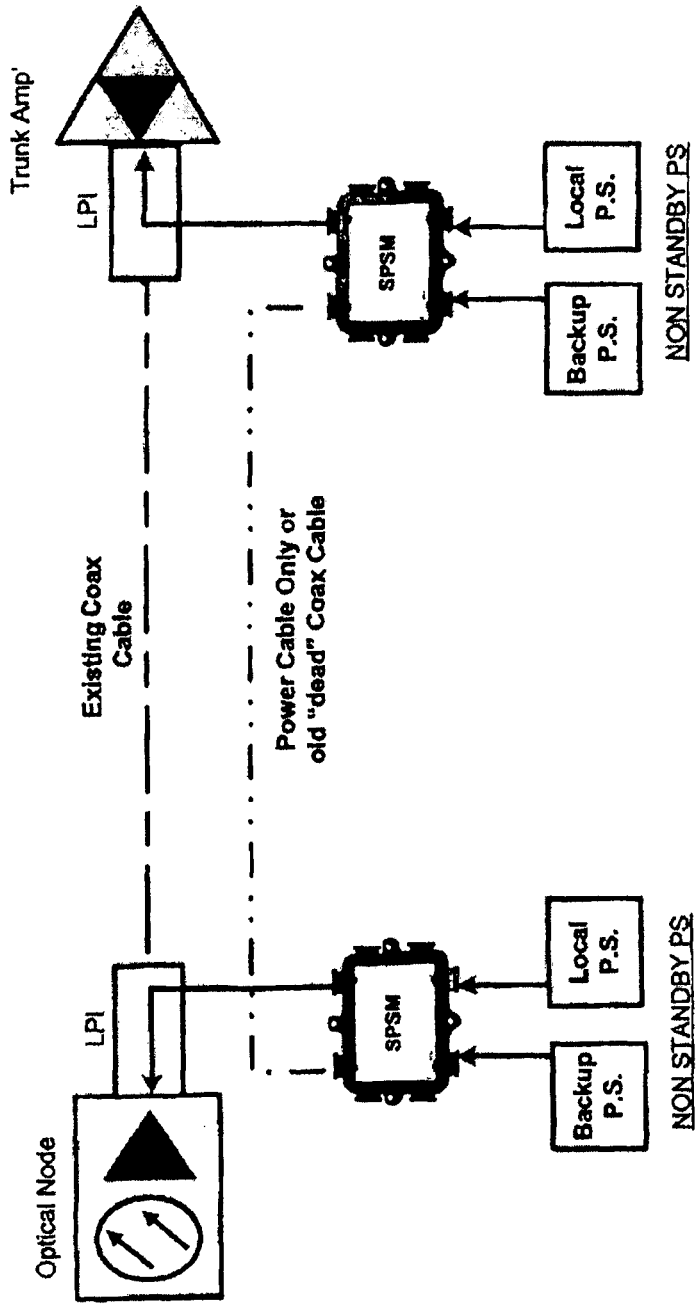

FIG. 33 is a detailed schematic diagram of yet another embodiment of SPSM 102. In this embodiment, however, power coupler/inserter 116 (see FIG. 1) is integrated into SPSM 102.

While exemplary embodiments of the present invention have been described above, it should be understood that these embodiments have been presented by way of example only, and are not meant to limit the scope of the invention. It will be understood by those skilled in the art that various changes in form and detail may be made therein without departing from the spirit and scope of the invention as defined in the appended claims. Thus, the breadth and scope of the present invention should not be limited by the above-described exemplary embodiments, but should be defined only in accordance with the following claims and their equivalents. Each document cited herein is hereby incorporated by reference in its entirety.

What is claimed is:

1. A switching module for providing power to an amplifier in a broadband telecommunications network, comprising:
    (a) a first input port for connection to a first power source;
    (b) a second input port for connection to a second power source;
    (c) an input/output port for connection to a cable connecting the amplifier with a remote amplifier;
    (d) an output port for connection to the amplifier; and
    (e) a controller for
        (i) connecting the first input port to the output port when power is present at the first input port,
        (ii) connecting the second input port to the output port when power is not present at the first input port, power is present at the second input port, and power is not present at the input/output port,
        (iii) connecting the input/output port to the output port when power is not present at the first input port, power is not present at the second input port, and power is present at the input/output port, and
        (iv) connecting the second input port to the input/output port when power is present at the second input port and power is not present at the input/output port,
    wherein the controller comprises a first switch, a second switch, and a microcontroller to control switching of the first and second switches, wherein the first switch has a first state connecting the first input port to the output port and a second state connecting an output of the second switch to the output port, and wherein the second switch has a first state connecting the second input port to an input of the first switch and a second state connecting the input/output port to the input of the first switch.

2. The switching module of claim 1, further comprising:
a switch for selecting a primary mode of operation or a secondary mode of operation.

3. The switching module of claim 1, further comprising:
a switch for selecting a first operating voltage range or a second voltage operating range.

4. The switching module of claim 1, further comprising:
a monitoring circuit for communicating status information about the switching module.

5. The switching module of claim 4, further comprising:
a humidity sensor for sensing humidity within the switching module.

6. The switching module of claim 1, further comprising a mode selection switch to allow user selection between a primary mode of operation and a secondary mode of operation, wherein the secondary mode of operation provides for delayed switching as compared to the primary mode of operation.

7. The switching module of claim 1, further comprising means for monitoring the status of the power sources.

8. The apparatus of claim 7, wherein the monitoring means outputs a radio frequency signal containing status information.

* * * * *

UNITED STATES PATENT AND TRADEMARK OFFICE
CERTIFICATE OF CORRECTION

| | | |
|---|---|---|
| PATENT NO. | : 7,420,294 B2 | Page 1 of 22 |
| APPLICATION NO. | : 11/315625 | |
| DATED | : September 2, 2008 | |
| INVENTOR(S) | : Taylor et al. | |

It is certified that error appears in the above-identified patent and that said Letters Patent is hereby corrected as shown below:

In the Drawings

Replace FIGS. 2-18 and 28-31 with the figures attached therefor.

Signed and Sealed this
Twenty-third Day of September, 2014

Michelle K. Lee
*Deputy Director of the United States Patent and Trademark Office*

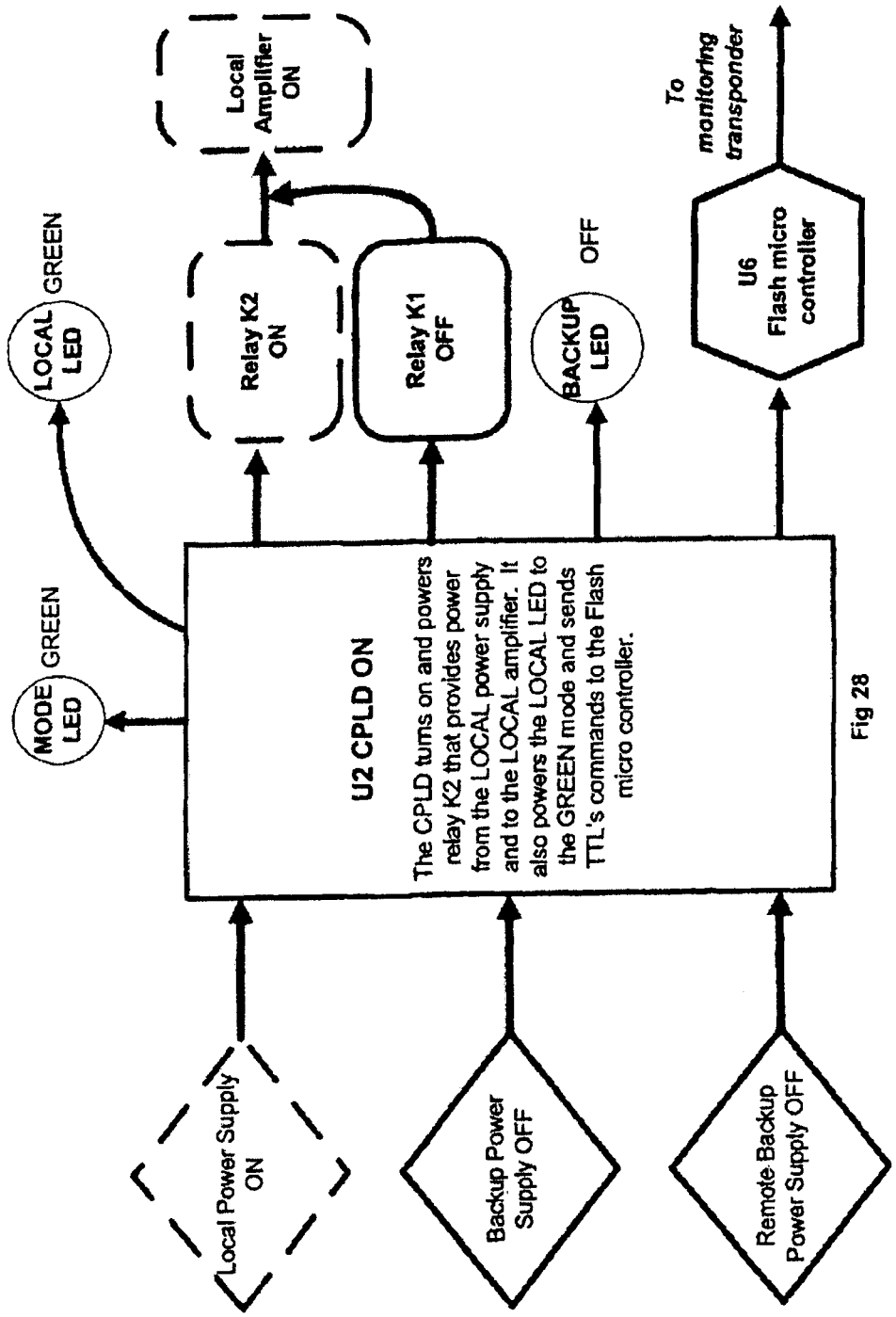

US007420294C1

(12) EX PARTE REEXAMINATION CERTIFICATE (8228th)
United States Patent
Taylor et al.

(10) Number: US 7,420,294 C1
(45) Certificate Issued: May 10, 2011

(54) SMART POWER SWITCH FOR BROADBAND COMMUNICATIONS NETWORK

(75) Inventors: George F. Taylor, Winter Garden, FL (US); Ofer Raviv, Kfar Veradim (IL)

(73) Assignee: MAYA Industries Limited, Nicosia (CY)

Reexamination Request:
No. 90/009,688, Apr. 8, 2010

Reexamination Certificate for:
Patent No.: 7,420,294
Issued: Sep. 2, 2008
Appl. No.: 11/315,625
Filed: Dec. 23, 2005

(51) Int. Cl.
*H02J 7/00* (2006.01)
*H02J 9/00* (2006.01)

(52) U.S. Cl. ............... 307/64; 307/21; 307/22; 307/23; 307/29; 307/43; 307/65; 713/340
(58) Field of Classification Search .......... None
See application file for complete search history.

(56) References Cited

U.S. PATENT DOCUMENTS 5,747,888 A 5/1998 Zilberberg
6,459,175 B1 10/2002 Potega

OTHER PUBLICATIONS

CED reference—"Preventing outages without batteries", by Robert Bridge et al, in CED Magazine, published in Jun. 1999.

Philips management reference—introduction and description, Jun. 1, 1998.
Homepage of Zylec corporation website, http://web.archive.org/web/20050216214757/zylec.com/index.htm, Oct 30, 2004.
DPS power website homepage, http://web.archive.org/web/20041014065416/www.dpspower.net/, snapshot on Oct. 14, 2004.
"Field Monitoring Using Sensor–Nodes with a Web Server", by Fukatsu T et al, Journal of Robotics and Mechatronics, vol. 17 No. 2, Jun. 20, 2005 pp. 164–172.

*Primary Examiner*—My-Trang Nu Ton

(57) ABSTRACT

A power switching module provides power to a line amplifier in a broadband telecommunications network. The switch includes a first input port for connection to a first power source, a second input port for connection to a second power source, an input/output port for connection to a cable connecting the line amplifier with a remote amplifier, and an output port for connection to the line amplifier. A controller controls selection of the power source and provides power to the line amplifier from one the input ports and can provide power to, or receive power from, a power supply associated with the remote amplifier via the input/output port. A switch allows selection of a primary mode of operation or a secondary mode of operation. Another switch allows selection of a first operating voltage range or a second voltage operating range. A monitoring circuit communicates status information about the switching module to a remote location. Monitored parameters include, for example, power supply status, module humidity and temperature.

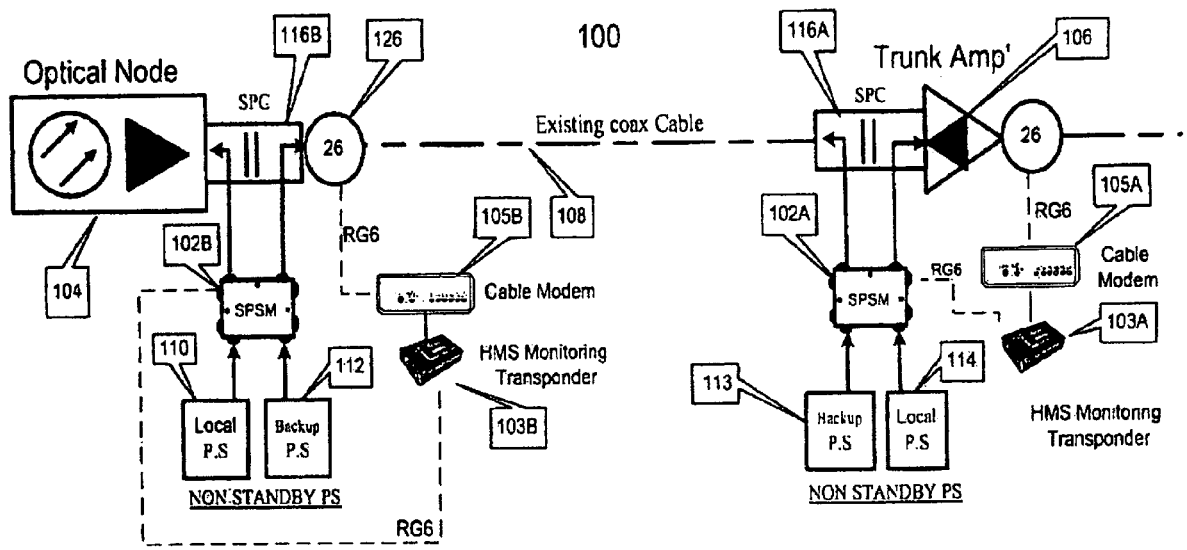

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-8 is confirmed.

* * * * *